United States Patent
Jhang et al.

(10) Patent No.: US 10,451,840 B2
(45) Date of Patent: Oct. 22, 2019

(54) OPTICAL LENS ASSEMBLY

(71) Applicant: Genius Electronic Optical Co., Ltd., Taichung (TW)

(72) Inventors: Jia-Sin Jhang, Taichung (TW); Feng Chen, Fujian (CN); Yanbin Chen, Fujian (CN)

(73) Assignee: GENIUS ELECTRONIC OPTICAL (XIAMEN) CO., LTD., Xiamen, Fujian (CN)

( * ) Notice: Subject to any disclaimer, the term of this patent is extended or adjusted under 35 U.S.C. 154(b) by 0 days.

(21) Appl. No.: 15/144,835

(22) Filed: May 3, 2016

(65) Prior Publication Data
US 2017/0269330 A1 Sep. 21, 2017

(30) Foreign Application Priority Data
Mar. 18, 2016 (CN) .......................... 2016 1 0156925

(51) Int. Cl.
*G02B 13/00* (2006.01)
*G02B 9/34* (2006.01)
*G02B 9/60* (2006.01)

(52) U.S. Cl.
CPC .............. *G02B 13/004* (2013.01); *G02B 9/34* (2013.01); *G02B 9/60* (2013.01); *G02B 13/0045* (2013.01)

(58) Field of Classification Search
CPC .......... G02B 13/004; G02B 9/34; G02B 9/38; G02B 9/56; G02B 13/0045
USPC ....................................................... 359/715
See application file for complete search history.

(56) References Cited

U.S. PATENT DOCUMENTS

| 2011/0013069 A1* | 1/2011 | Chen ........................ G02B 9/60 348/335 |
| 2015/0029601 A1* | 1/2015 | Dror ........................ G02B 9/60 359/764 |
| 2015/0116569 A1* | 4/2015 | Mercado ............ H04N 5/23212 348/335 |

FOREIGN PATENT DOCUMENTS

| TW | I551883 | 10/2016 |
| TW | I564612 | 1/2017 |

OTHER PUBLICATIONS

"Office Action of Taiwan Counterpart Application," dated May 23, 2017, p. 1-p. 11.
"Office Action of Taiwan Counterpart Application," dated Jul. 28, 2017, p. 1-p. 7.

* cited by examiner

*Primary Examiner* — Wen Huang
(74) *Attorney, Agent, or Firm* — JCIPRNET

(57) ABSTRACT

An optical lens assembly includes first, second, third and fourth lens elements arranged in sequence from an object side to an image side along an optical axis, and each lens element has an object-side surface and an image-side surface. The first lens element has positive refracting power, and the object-side surface of the first lens element has a convex portion in a vicinity of the optical axis and a convex portion in a vicinity of a periphery. The second lens element has negative refracting power. The object-side surface of the third lens element has a concave portion in a vicinity of the periphery. The image-side surface of the fourth lens element has a convex portion in a vicinity of the periphery.

18 Claims, 66 Drawing Sheets

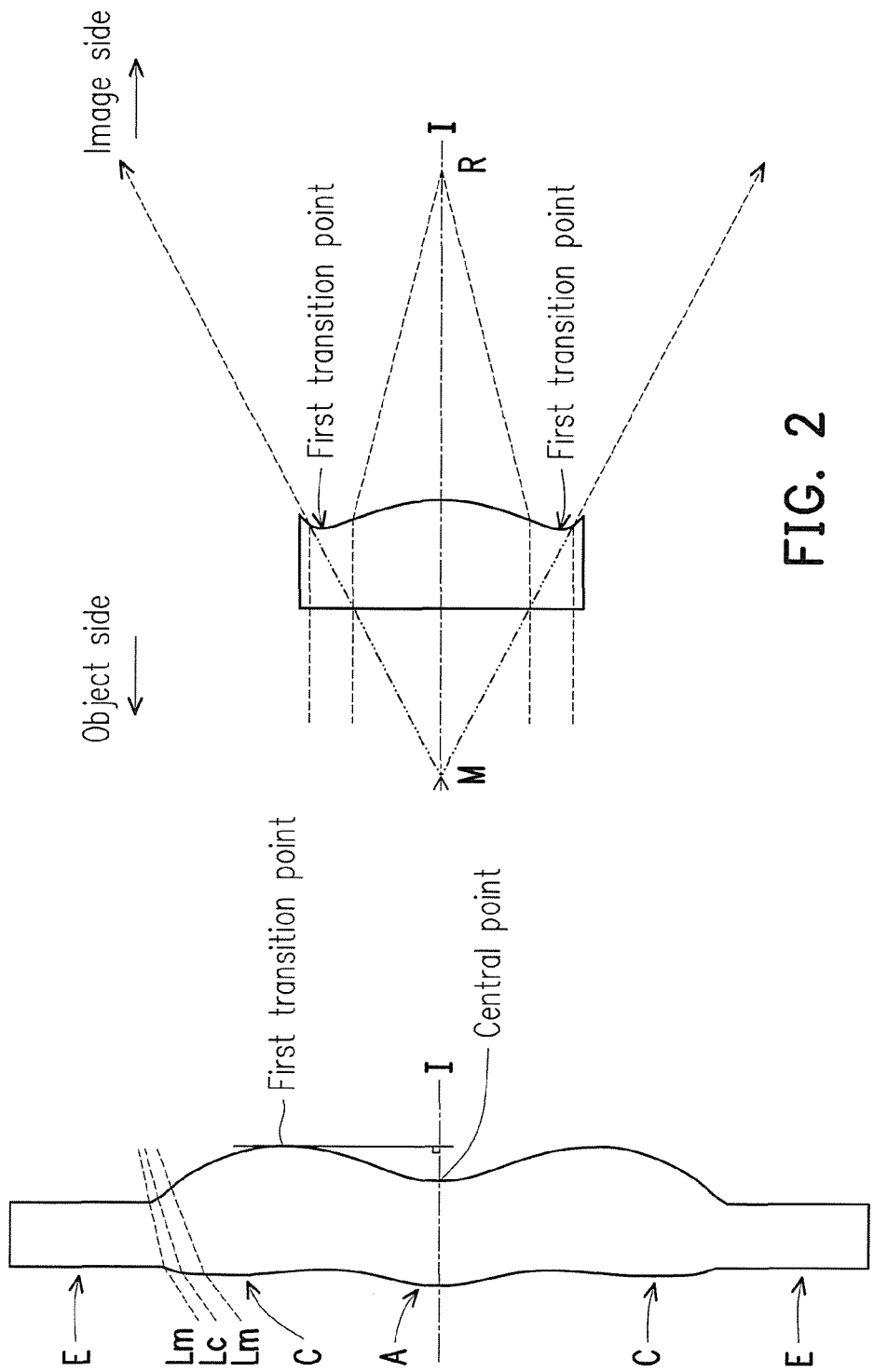

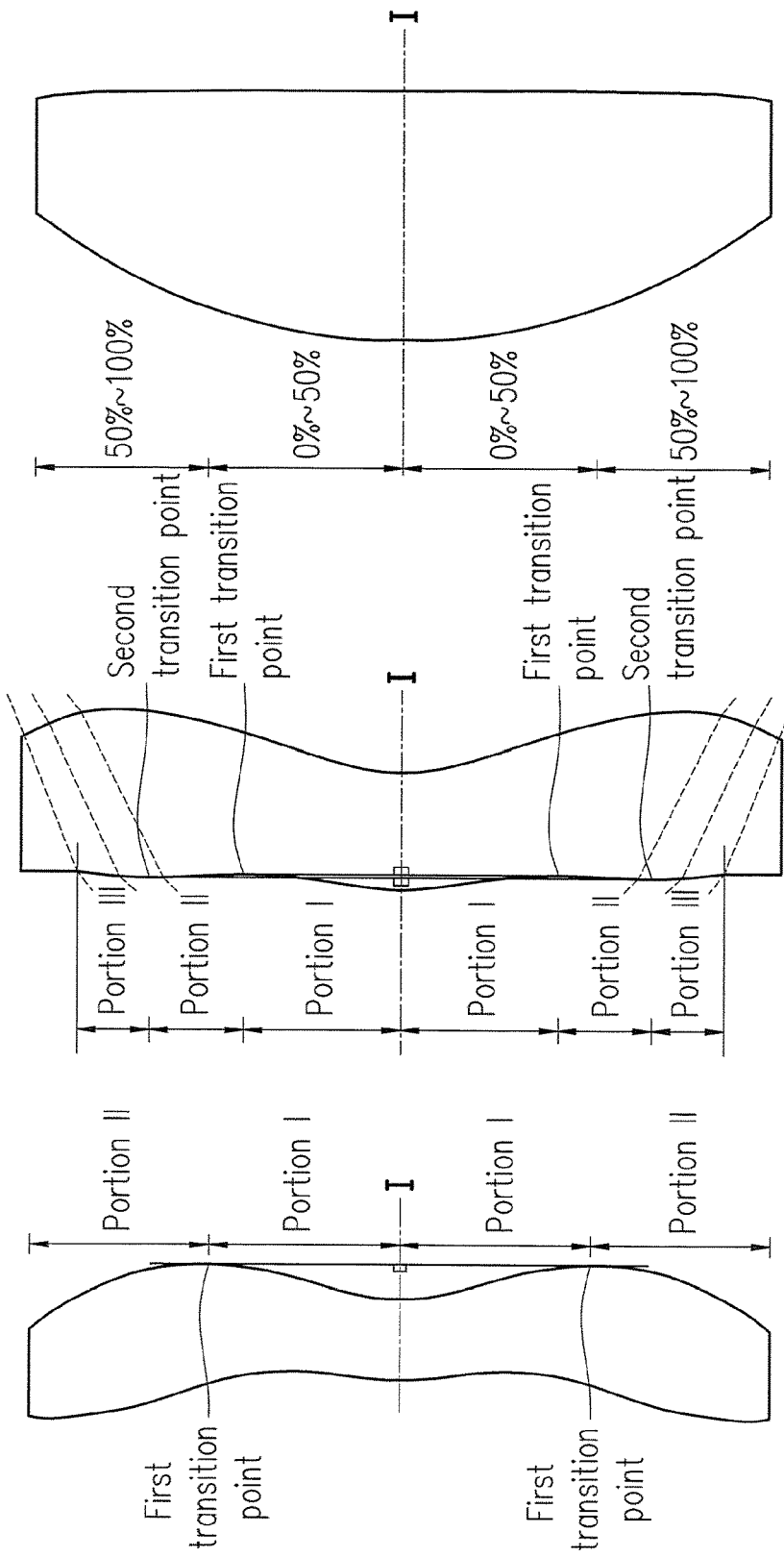

| First embodiment |||||||
|---|---|---|---|---|---|---|
| Effective focal length=7.070 mm , Half field of view (HFOV)=18.594°, Fno=2.390, System length=6.380mm, Image height=2.4mm |||||||
| Lens element | Surface | Radius of curvature(mm) | Thickness(mm) | Refractive index | Dispersion coefficient | Focal length(mm) |
| Object | | Infinity | 1.000E+10 | | | |
| Aperture stop 2 | | Infinity | -0.666 | | | |
| First lens element 3 | Object-side surface 31 | 1.933 | 0.934 | 1.545 | 55.987 | 3.497 |
| | Image-side surface 32 | -131.098 | 0.049 | | | |
| Second lens element 4 | Object-side surface 41 | 11.872 | 0.399 | 1.642 | 22.409 | -5.686 |
| | Image-side surface 42 | 2.773 | 0.874 | | | |
| Third lens element 5 | Object-side surface 51 | 1.622 | 0.280 | 1.535 | 55.690 | -48.593 |
| | Image-side surface 52 | 1.435 | 2.197 | | | |
| Fourth lens element 6 | Object-side surface 61 | -6.792 | 0.649 | 1.642 | 22.409 | -12.445 |
| | Image-side surface 62 | -44.928 | 0.400 | | | |
| Light filter 9 | Object-side surface 91 | Infinity | 0.210 | 1.517 | 64.167 | |
| | Image-side surface 92 | Infinity | 0.390 | | | |
| | Image plane 100 | Infinity | | | | |

FIG. 8

| Surface | K | $a_4$ | $a_6$ | $a_8$ | $a_{10}$ |
|---|---|---|---|---|---|
| 31 | 0.000000E+00 | -5.615020E-03 | 5.112483E-03 | -2.360137E-03 | 4.869976E-04 |
| 32 | 0.000000E+00 | -2.986185E-03 | 9.074404E-03 | -3.887666E-03 | 4.680344E-04 |
| 41 | 0.000000E+00 | -4.989752E-02 | 2.899496E-02 | -9.313862E-03 | 1.182514E-03 |
| 42 | 0.000000E+00 | -7.796031E-02 | 4.067829E-02 | -1.479135E-02 | 2.948439E-03 |
| 51 | 0.000000E+00 | -8.306535E-02 | -1.308368E-01 | 4.351345E-02 | 9.370950E-03 |
| 52 | 0.000000E+00 | -5.417911E-02 | -1.530297E-01 | 9.334558E-02 | -2.384063E-02 |
| 61 | 0.000000E+00 | -4.596779E-02 | 1.087727E-02 | -2.348372E-03 | 5.492145E-04 |
| 62 | 0.000000E+00 | -5.788669E-02 | 9.791915E-03 | -1.348538E-03 | 6.948387E-05 |
| Surface | $a_{12}$ | $a_{14}$ | $a_{16}$ | $a_{18}$ | $a_{20}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | -1.167363E-02 | 0.000000E+00 | 0.000000E+00 | 0.000000E+00 | 0.000000E+00 |
| 52 | -2.613741E-04 | 0.000000E+00 | 0.000000E+00 | 0.000000E+00 | 0.000000E+00 |
| 61 | -4.071919E-05 | 0.000000E+00 | 0.000000E+00 | 0.000000E+00 | 0.000000E+00 |
| 62 | 7.771300E-06 | 0.000000E+00 | 0.000000E+00 | 0.000000E+00 | 0.000000E+00 |

FIG. 9

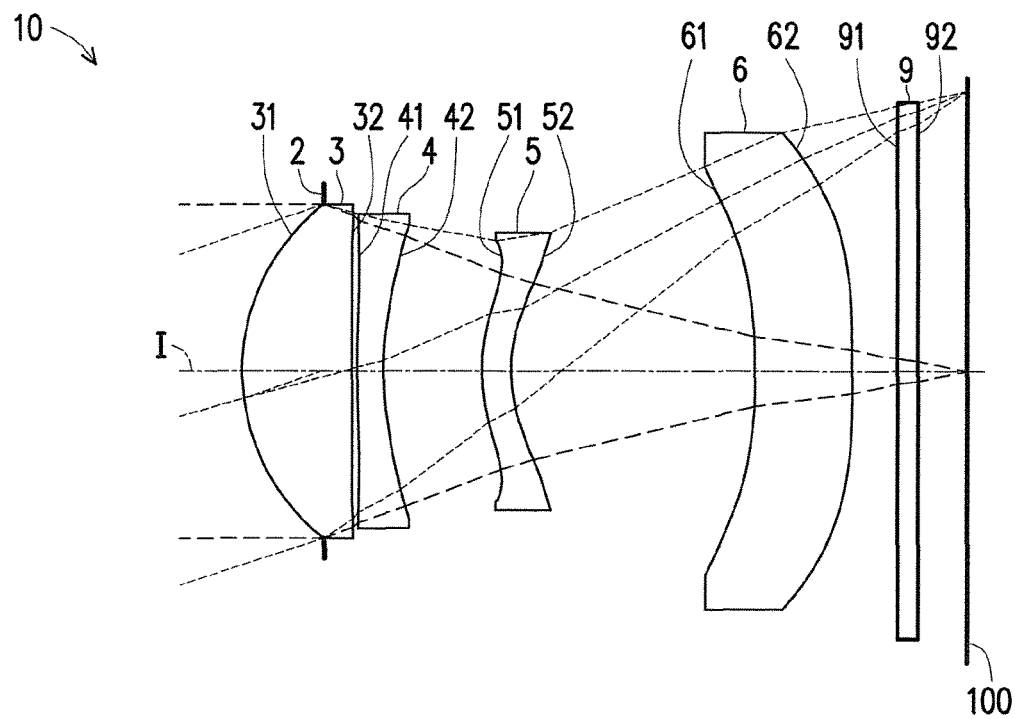
FIG. 10
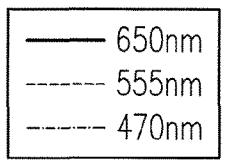
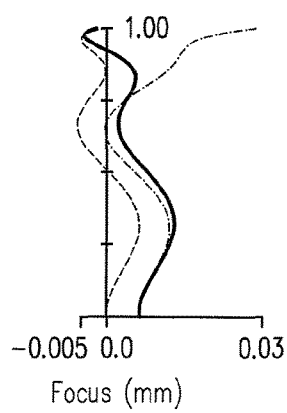
Longitudinal spherical aberration
Field of view
FIG. 11A
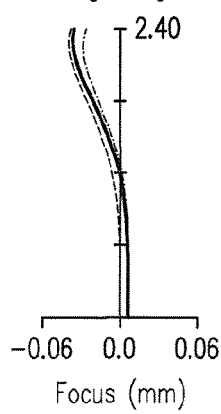
Field curvature (sagittal direction)
Image height
FIG. 11B
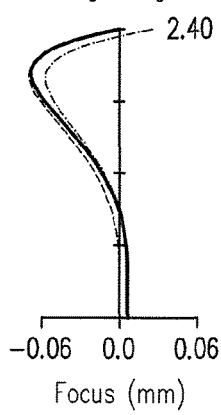
Field curvature (tangential direction)
Image height
FIG. 11C
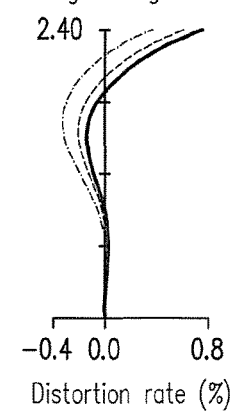
Distortion
Image height
FIG. 11D

| Second embodiment ||||||
|---|---|---|---|---|---|
| Effective focal length=7.070 mm , Half field of view (HFOV)=18.649°, Fno=2.390, System length=6.380mm, Image height=2.4mm ||||||
| Lens element | Surface | Radius of curvature(mm) | Thickness(mm) | Refractive index | Dispersion coefficient | Focal length(mm) |
| Object | | Infinity | 1.000E+10 | | | |
| Aperture stop 2 | | Infinity | -0.705 | | | |
| First lens element 3 | Object-side surface 31 | 1.855 | 0.969 | 1.545 | 55.987 | 3.384 |
| | Image-side surface 32 | -432.983 | 0.049 | | | |
| Second lens element 4 | Object-side surface 41 | 9.381 | 0.228 | 1.642 | 22.409 | -5.725 |
| | Image-side surface 42 | 2.631 | 0.874 | | | |
| Third lens element 5 | Object-side surface 51 | 1.577 | 0.256 | 1.535 | 55.690 | -36.828 |
| | Image-side surface 52 | 1.378 | 2.141 | | | |
| Fourth lens element 6 | Object-side surface 61 | -5.788 | 0.863 | 1.642 | 22.409 | -12.892 |
| | Image-side surface 62 | -19.997 | 0.400 | | | |
| Light filter 9 | Object-side surface 91 | Infinity | 0.210 | 1.517 | 64.167 | |
| | Image-side surface 92 | Infinity | 0.390 | | | |
| | Image plane 100 | Infinity | | | | |

FIG. 12

| Sur-face | K | $a_4$ | $a_6$ | $a_8$ | $a_{10}$ |
|---|---|---|---|---|---|
| 31 | 0.000000E+00 | -7.264561E-03 | 5.257795E-03 | -2.205939E-03 | 3.633999E-04 |
| 32 | 0.000000E+00 | 3.724699E-03 | 8.479880E-04 | -1.124998E-03 | 2.761894E-04 |
| 41 | 0.000000E+00 | -5.950026E-02 | 2.875618E-02 | -7.304425E-03 | 8.704162E-04 |
| 42 | 0.000000E+00 | -8.841130E-02 | 4.156095E-02 | -1.108729E-02 | 1.653419E-03 |
| 51 | 0.000000E+00 | -7.528376E-02 | -1.552433E-01 | 4.322769E-02 | 2.182326E-02 |
| 52 | 0.000000E+00 | -4.904816E-02 | -1.847858E-01 | 1.064495E-01 | -2.238131E-02 |
| 61 | 0.000000E+00 | -2.993580E-02 | 4.415009E-03 | 4.821476E-04 | -2.494609E-04 |
| 62 | 0.000000E+00 | -3.888830E-02 | 3.212540E-03 | 4.296519E-04 | -2.079502E-04 |
| Sur-face | $a_{12}$ | $a_{14}$ | $a_{16}$ | $a_{18}$ | $a_{20}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | -1.843722E-02 | 0.000000E+00 | 0.000000E+00 | 0.000000E+00 | 0.000000E+00 |
| 52 | -3.137736E-03 | 0.000000E+00 | 0.000000E+00 | 0.000000E+00 | 0.000000E+00 |
| 61 | 4.512619E-05 | 0.000000E+00 | 0.000000E+00 | 0.000000E+00 | 0.000000E+00 |
| 62 | 2.271677E-05 | 0.000000E+00 | 0.000000E+00 | 0.000000E+00 | 0.000000E+00 |

FIG. 13

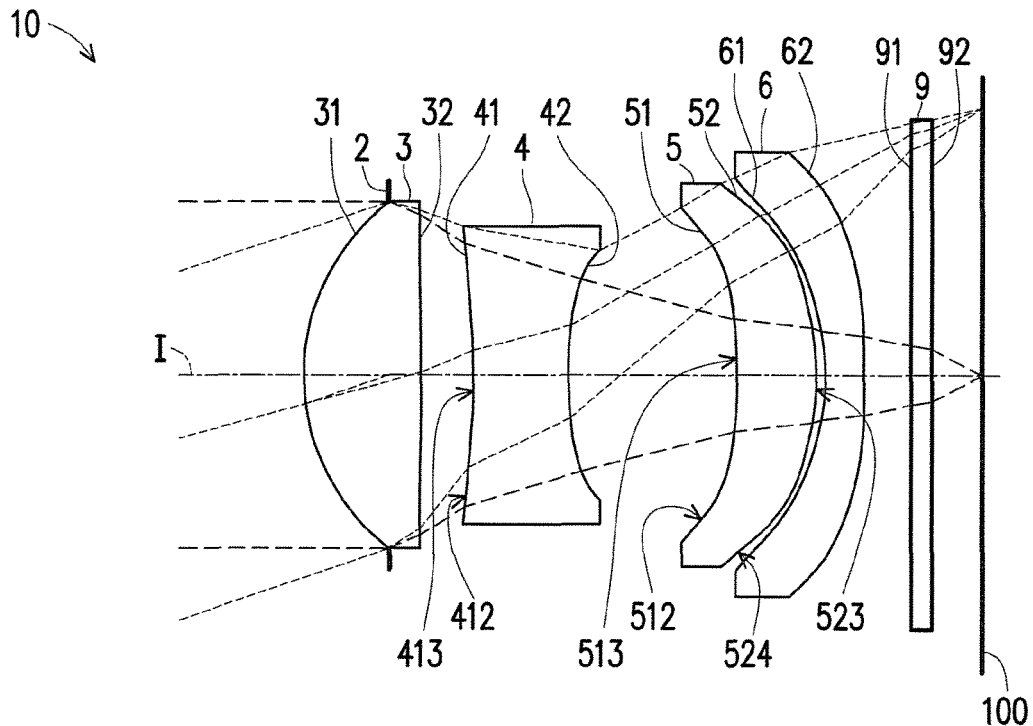
FIG. 14
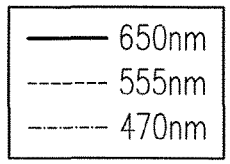
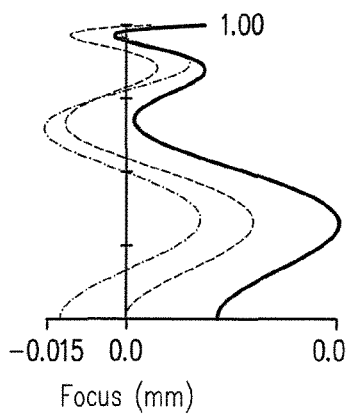
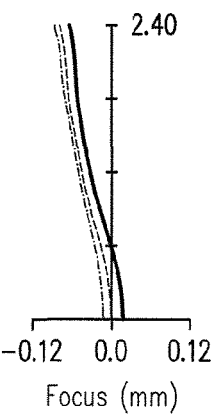
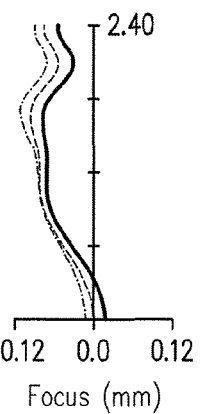
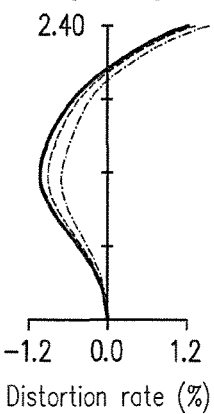
FIG. 15A  FIG. 15B  FIG. 15C  FIG. 15D

| Third embodiment | | | | | | |
|---|---|---|---|---|---|---|
| Effective focal length=7.070 mm , Half field of view (HFOV)=18.545°, Fno=2.386, System length=6.381mm, Image height=2.4mm | | | | | | |
| Lens element | Surface | Radius of curvature(mm) | Thickness(mm) | Refractive index | Dispersion coefficient | Focal length(mm) |
| Object | | Infinity | 1.000E+10 | | | |
| Aperture stop 2 | | Infinity | -0.711 | | | |
| First lens element 3 | Object-side surface 31 | 1.811 | 0.994 | 1.545 | 55.987 | 3.159 |
| | Image-side surface 32 | -29.483 | 0.444 | | | |
| Second lens element 4 | Object-side surface 41 | -5.912 | 0.812 | 1.642 | 22.409 | -3.745 |
| | Image-side surface 42 | 4.330 | 1.425 | | | |
| Third lens element 5 | Object-side surface 51 | -5.109 | 0.680 | 1.642 | 22.409 | 4.675 |
| | Image-side surface 52 | -2.000 | 0.078 | | | |
| Fourth lens element 6 | Object-side surface 61 | -1.801 | 0.326 | 1.535 | 55.690 | -3.824 |
| | Image-side surface 62 | -15.616 | 0.400 | | | |
| Light filter 9 | Object-side surface 91 | Infinity | 0.210 | 1.517 | 64.167 | |
| | Image-side surface 92 | Infinity | 1.014 | | | |
| | Image plane 100 | Infinity | | | | |

FIG. 16

| Surface | K | $a_4$ | $a_6$ | $a_8$ | $a_{10}$ |
|---|---|---|---|---|---|
| 31 | 0.000000E+00 | -9.518495E-03 | 6.270615E-03 | -3.866340E-03 | 6.417194E-04 |
| 32 | 0.000000E+00 | 6.173363E-03 | -1.350472E-03 | 9.775887E-04 | -1.369687E-04 |
| 41 | 0.000000E+00 | 3.424443E-02 | -1.978194E-02 | 1.403153E-02 | -4.513063E-03 |
| 42 | 0.000000E+00 | 3.960840E-02 | 8.308528E-02 | -8.553389E-02 | 5.649070E-02 |
| 51 | 0.000000E+00 | -9.067461E-03 | -4.753997E-02 | -4.284978E-03 | 7.170876E-03 |
| 52 | 0.000000E+00 | 1.531976E-01 | -1.267889E-01 | 2.878495E-02 | -8.032347E-04 |
| 61 | 0.000000E+00 | 1.176969E-01 | -9.030986E-02 | 4.378836E-02 | -1.411203E-02 |
| 62 | 0.000000E+00 | -1.029628E-01 | 5.196404E-02 | -1.280669E-02 | 1.610382E-04 |
| Surface | $a_{12}$ | $a_{14}$ | $a_{16}$ | $a_{18}$ | $a_{20}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | 2.407371E-03 | 0.000000E+00 | 0.000000E+00 | 0.000000E+00 | 0.000000E+00 |
| 62 | 2.002553E-04 | 0.000000E+00 | 0.000000E+00 | 0.000000E+00 | 0.000000E+00 |

FIG. 17

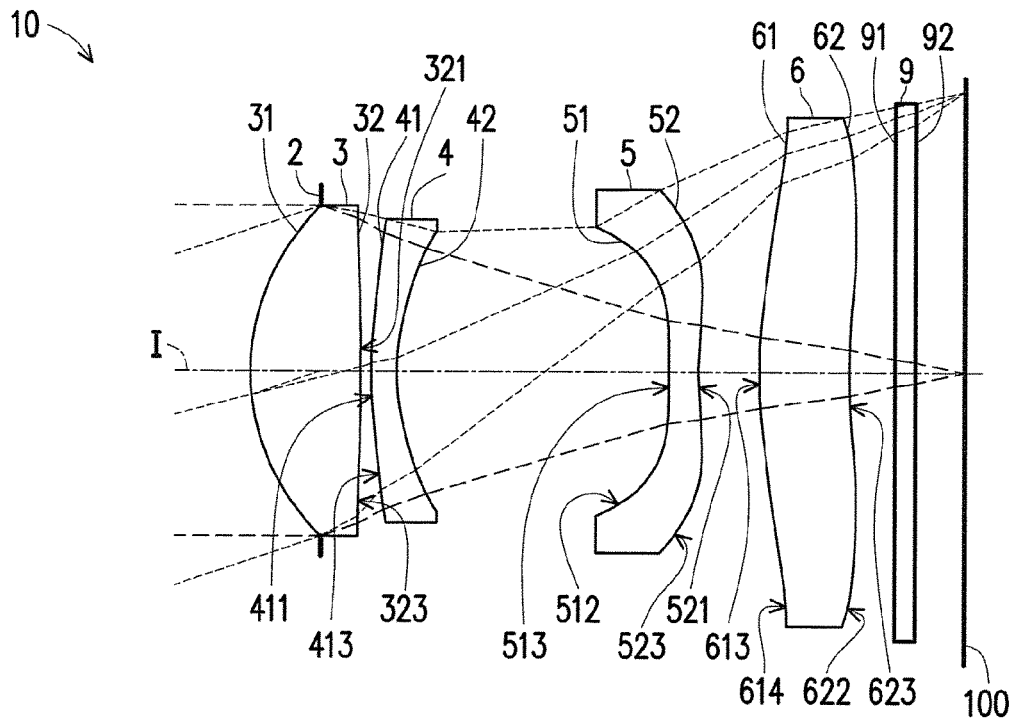
FIG. 18
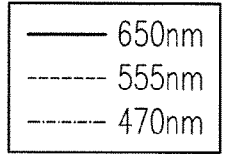
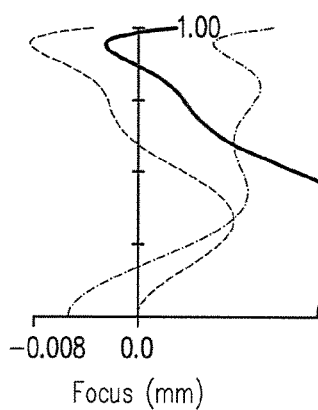
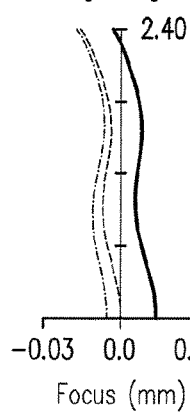
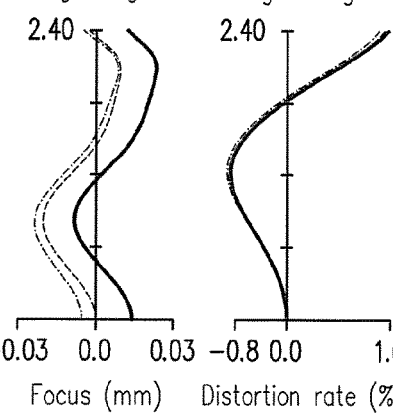
FIG. 19A    FIG. 19B  FIG. 19C  FIG. 19D

| Fourth embodiment ||||||
|---|---|---|---|---|---|
| Effective focal length=7.070 mm , Half field of view (HFOV)=18.498°, Fno=2.395, System length=6.380mm, Image height=2.4mm ||||||
| Lens element | Surface | Radius of curvature(mm) | Thickness(mm) | Refractive index | Dispersion coefficient | Focal length(mm) |
| Object | | Infinity | 1.000E+10 | | | |
| Aperture stop 2 | | Infinity | -0.611 | | | |
| First lens element 3 | Object-side surface 31 | 2.019 | 0.979 | 1.545 | 55.987 | 3.469 |
| | Image-side surface 32 | -25.566 | 0.093 | | | |
| Second lens element 4 | Object-side surface 41 | 3.781 | 0.228 | 1.661 | 20.401 | -6.492 |
| | Image-side surface 42 | 1.969 | 2.422 | | | |
| Third lens element 5 | Object-side surface 51 | -22.235 | 0.259 | 1.545 | 55.987 | -5.207 |
| | Image-side surface 52 | 3.275 | 0.535 | | | |
| Fourth lens element 6 | Object-side surface 61 | 3.854 | 0.807 | 1.661 | 20.401 | 21.822 |
| | Image-side surface 62 | 4.805 | 0.400 | | | |
| Light filter 9 | Object-side surface 91 | Infinity | 0.210 | 1.517 | 64.167 | |
| | Image-side surface 92 | Infinity | 0.447 | | | |
| | Image plane 100 | Infinity | | | | |

FIG. 20

| Sur-face | K | $a_4$ | $a_6$ | $a_8$ | $a_{10}$ |
|---|---|---|---|---|---|
| 31 | 0.000000E+00 | -3.823532E-04 | -8.664486E-04 | -1.577200E-04 | 0.000000E+00 |
| 32 | 0.000000E+00 | -5.177402E-03 | 5.744770E-03 | -9.147514E-04 | 0.000000E+00 |
| 41 | 0.000000E+00 | -9.179098E-02 | 4.491919E-02 | -7.803475E-03 | 0.000000E+00 |
| 42 | 0.000000E+00 | -9.339022E-02 | 4.354623E-02 | -5.940437E-03 | 0.000000E+00 |
| 51 | 0.000000E+00 | -2.030660E-01 | 3.452306E-03 | 9.684649E-03 | -9.805600E-03 |
| 52 | 0.000000E+00 | -2.040488E-01 | 6.513900E-02 | -1.761336E-02 | 2.365385E-03 |
| 61 | 0.000000E+00 | -5.338823E-02 | 1.985043E-02 | -4.894343E-03 | 6.617616E-04 |
| 62 | 0.000000E+00 | -7.284489E-02 | 2.517630E-02 | -5.319787E-03 | 5.995995E-04 |
| Sur-face | $a_{12}$ | $a_{14}$ | $a_{16}$ | $a_{18}$ | $a_{20}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | -3.949579E-05 | 0.000000E+00 | 0.000000E+00 | 0.000000E+00 | 0.000000E+00 |
| 62 | -3.026420E-05 | 0.000000E+00 | 0.000000E+00 | 0.000000E+00 | 0.000000E+00 |

FIG. 21

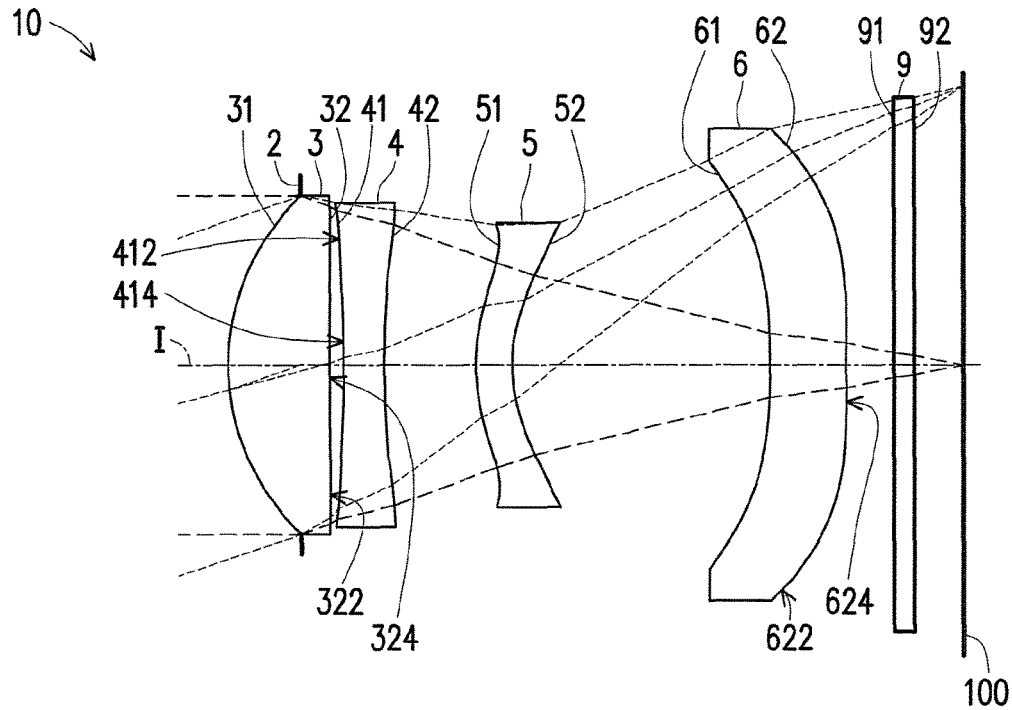
FIG. 22
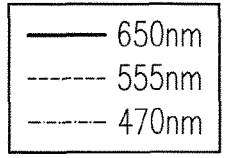
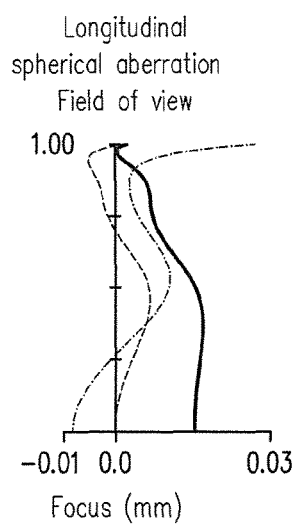
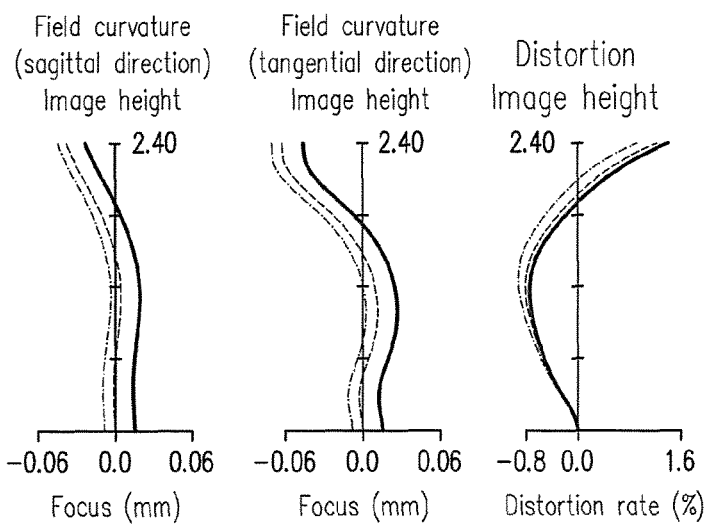
FIG. 23A   FIG. 23B   FIG. 23C   FIG. 23D

| Fifth embodiment ||||||
|---|---|---|---|---|---|
| Effective focal length=7.070 mm , Half field of view (HFOV)=18.555°, Fno=2.395, System length=6.381mm, Image height=2.4mm ||||||
| Lens element | Surface | Radius of curvature(mm) | Thickness(mm) | Refractive index | Dispersion coefficient | Focal length(mm) |
| Object | | Infinity | 1.000E+10 | | | |
| Aperture stop 2 | | Infinity | -0.619 | | | |
| First lens element 3 | Object-side surface 31 | 1.951 | 0.885 | 1.545 | 55.987 | 3.834 |
| | Image-side surface 32 | 23.817 | 0.122 | | | |
| Second lens element 4 | Object-side surface 41 | -11.213 | 0.355 | 1.661 | 20.401 | -8.934 |
| | Image-side surface 42 | 12.852 | 0.802 | | | |
| Third lens element 5 | Object-side surface 51 | 1.837 | 0.316 | 1.545 | 55.987 | -25.397 |
| | Image-side surface 52 | 1.524 | 2.240 | | | |
| Fourth lens element 6 | Object-side surface 61 | -7.606 | 0.660 | 1.661 | 20.401 | -8.738 |
| | Image-side surface 62 | 25.687 | 0.400 | | | |
| Light filter 9 | Object-side surface 91 | Infinity | 0.210 | 1.517 | 64.167 | |
| | Image-side surface 92 | Infinity | 0.391 | | | |
| | Image plane 100 | Infinity | | | | |

FIG. 24

| Sur-face | K | $a_4$ | $a_6$ | $a_8$ | $a_{10}$ |
|---|---|---|---|---|---|
| 31 | 0.000000E+00 | -8.316210E-03 | 1.077458E-04 | -8.257876E-05 | 0.000000E+00 |
| 32 | 0.000000E+00 | -2.819454E-02 | 1.919361E-02 | -4.777802E-03 | 0.000000E+00 |
| 41 | 0.000000E+00 | 1.650000E-02 | -1.830785E-03 | -1.738348E-03 | 0.000000E+00 |
| 42 | 0.000000E+00 | 3.872215E-02 | -2.492952E-02 | 3.981823E-03 | 0.000000E+00 |
| 51 | 0.000000E+00 | -2.051438E-02 | -8.287340E-02 | 8.244067E-03 | 0.000000E+00 |
| 52 | 0.000000E+00 | 1.285496E-03 | -9.995288E-02 | 2.457332E-02 | 0.000000E+00 |
| 61 | 1.346713E+01 | -6.957223E-02 | 3.068232E-02 | -9.487915E-03 | 1.367584E-03 |
| 62 | -6.724280E+03 | -7.528336E-02 | 2.084322E-02 | -4.428325E-03 | 3.821169E-04 |
| Sur-face | $a_{12}$ | $a_{14}$ | $a_{16}$ | $a_{18}$ | $a_{20}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | 0.000000E+00 | 0.000000E+00 | 0.000000E+00 | 0.000000E+00 | 0.000000E+00 |
| 62 | 0.000000E+00 | 0.000000E+00 | 0.000000E+00 | 0.000000E+00 | 0.000000E+00 |

FIG. 25

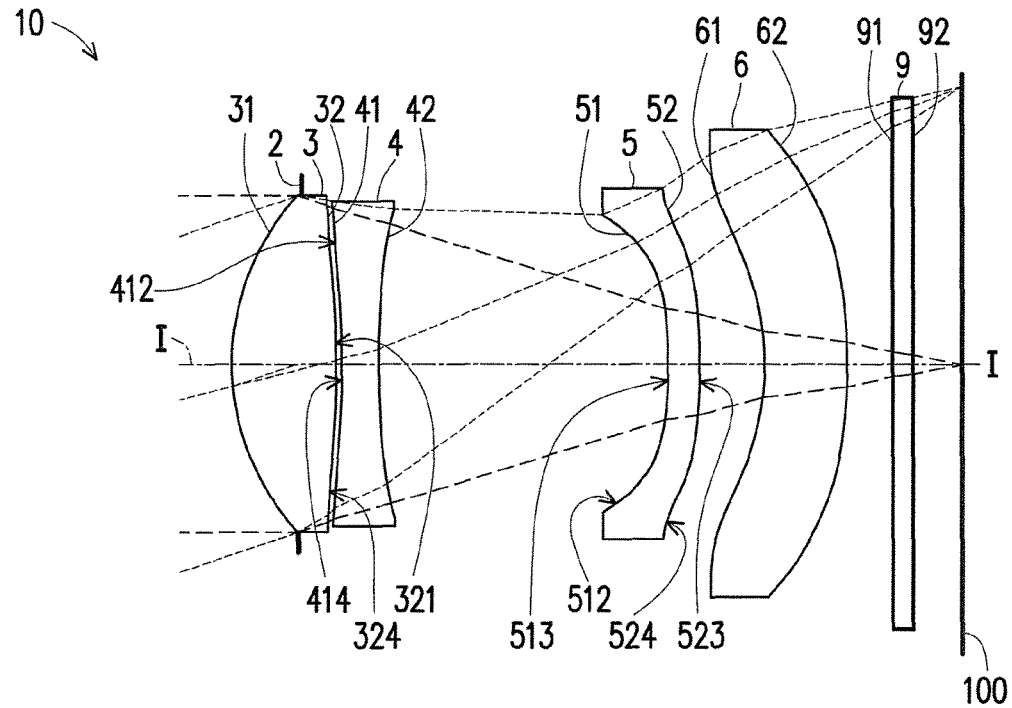
FIG. 26
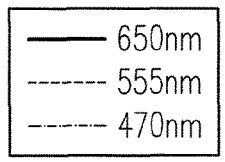
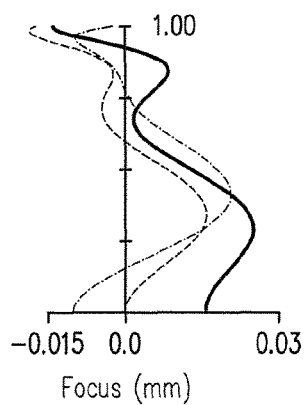
Longitudinal
spherical aberration
Field of view
-0.015  0.0  0.03
Focus (mm)
FIG. 27A
Field curvature
(sagittal direction)
Image height
-0.03  0.0  0.03
Focus (mm)
FIG. 27B
Field curvature
(tangential direction)
Image height
-0.03  0.0  0.04
Focus (mm)
FIG. 27C
Distortion
Image height
-0.6  0.0  0.6
Distortion rate (%)
FIG. 27D

| Sixth embodiment | | | | | | |
|---|---|---|---|---|---|---|
| Effective focal length=7.070 mm, Half field of view (HFOV)=18.728°, Fno=2.376, System length=6.381mm, Image height=2.4mm | | | | | | |
| Lens element | Surface | Radius of curvature(mm) | Thickness(mm) | Refractive index | Dispersion coefficient | Focal length(mm) |
| Object | | Infinity | 1.000E+10 | | | |
| Aperture stop 2 | | Infinity | -0.558 | | | |
| First lens element 3 | Object-side surface 31 | 2.127 | 0.910 | 1.545 | 55.987 | 3.412 |
| | Image-side surface 32 | -12.804 | 0.050 | | | |
| Second lens element 4 | Object-side surface 41 | -10.019 | 0.322 | 1.642 | 22.409 | -7.450 |
| | Image-side surface 42 | 9.416 | 2.529 | | | |
| Third lens element 5 | Object-side surface 51 | -5.099 | 0.277 | 1.545 | 55.987 | -63.034 |
| | Image-side surface 52 | -6.100 | 0.568 | | | |
| Fourth lens element 6 | Object-side surface 61 | -2.209 | 0.725 | 1.545 | 55.987 | -6.860 |
| | Image-side surface 62 | -6.003 | 0.400 | | | |
| Light filter 9 | Object-side surface 91 | Infinity | 0.210 | 1.517 | 64.167 | |
| | Image-side surface 92 | Infinity | 0.390 | | | |
| | Image plane 100 | Infinity | | | | |

FIG. 28

| Surface | K | $a_4$ | $a_6$ | $a_8$ | $a_{10}$ |
|---|---|---|---|---|---|
| 31 | 0.000000E+00 | -1.001744E-02 | 6.350689E-03 | -3.486950E-03 | 7.912575E-04 |
| 32 | 0.000000E+00 | -5.747598E-02 | 6.886902E-02 | -2.770743E-02 | 3.868195E-03 |
| 41 | 0.000000E+00 | -4.819233E-02 | 7.312328E-02 | -3.302426E-02 | 4.930730E-03 |
| 42 | 0.000000E+00 | -5.645031E-03 | 3.039568E-02 | -1.948196E-02 | 4.270535E-03 |
| 51 | 0.000000E+00 | -3.893072E-02 | -1.349911E-01 | 6.965292E-02 | -1.421834E-02 |
| 52 | 0.000000E+00 | 5.866992E-03 | -1.063815E-01 | 6.314730E-02 | -9.780832E-03 |
| 61 | 0.000000E+00 | 2.741092E-02 | -1.418084E-02 | 1.306874E-02 | -3.055087E-03 |
| 62 | 0.000000E+00 | -3.313690E-02 | 7.569214E-03 | -1.132913E-03 | -9.385151E-05 |
| Surface | $a_{12}$ | $a_{14}$ | $a_{16}$ | $a_{18}$ | $a_{20}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | 2.578657E-04 | 0.000000E+00 | 0.000000E+00 | 0.000000E+00 | 0.000000E+00 |
| 62 | 3.032312E-05 | 0.000000E+00 | 0.000000E+00 | 0.000000E+00 | 0.000000E+00 |

FIG. 29

| Seventh embodiment ||||||
|---|---|---|---|---|---|
| Effective focal length=5.149 mm , Half field of view (HFOV)=24.839°, Fno=2.403, System length=5.698mm, Image height=2.4mm ||||||
| Lens element | Surface | Radius of curvature(mm) | Thickness(mm) | Refractive index | Dispersion coefficient | Focal length(mm) |
| Object | | Infinity | 1.000E+10 | | | |
| Aperture stop 2 | | Infinity | -0.319 | | | |
| First lens element 3 | Object-side surface 31 | 1.875 | 0.593 | 1.545 | 55.987 | 3.917 |
| | Image-side surface 32 | 13.482 | 0.198 | | | |
| Second lens element 4 | Object-side surface 41 | -5.682 | 0.366 | 1.642 | 22.409 | -7.071 |
| | Image-side surface 42 | 24.146 | 0.631 | | | |
| Third lens element 5 | Object-side surface 51 | 1.356 | 0.285 | 1.535 | 55.690 | 13.893 |
| | Image-side surface 52 | 1.535 | 1.390 | | | |
| Fourth lens element 6 | Object-side surface 61 | 7.072 | 1.116 | 1.642 | 22.409 | -12.231 |
| | Image-side surface 62 | 3.504 | 0.400 | | | |
| Light filter 9 | Object-side surface 91 | Infinity | 0.210 | 1.517 | 64.167 | |
| | Image-side surface 92 | Infinity | 0.509 | | | |
| | Image plane 100 | Infinity | | | | |

FIG. 32

| Surface | K | $a_4$ | $a_6$ | $a_8$ | $a_{10}$ |
|---|---|---|---|---|---|
| 31 | 0.000000E+00 | -1.346204E-03 | 5.111012E-04 | -1.156364E-03 | -8.578924E-04 |
| 32 | 0.000000E+00 | -1.305874E-02 | -9.956939E-03 | -7.486497E-03 | 2.709168E-03 |
| 41 | 0.000000E+00 | -4.296082E-02 | 2.330747E-02 | -1.711533E-02 | 4.857191E-03 |
| 42 | 0.000000E+00 | -7.718509E-02 | 5.339302E-02 | -2.137145E-02 | 2.513716E-03 |
| 51 | 0.000000E+00 | -1.134142E-01 | -1.168793E-01 | 2.197176E-02 | -8.118949E-04 |
| 52 | 0.000000E+00 | -4.126923E-02 | -1.490190E-01 | 7.171720E-02 | -3.082139E-02 |
| 61 | 0.000000E+00 | -5.887460E-02 | 1.238736E-02 | -2.527880E-03 | 1.110176E-04 |
| 62 | 0.000000E+00 | -5.941783E-02 | 1.064892E-02 | -2.133165E-03 | 2.256441E-04 |
| Surface | $a_{12}$ | $a_{14}$ | $a_{16}$ | $a_{18}$ | $a_{20}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | -1.339531E-02 | 0.000000E+00 | 0.000000E+00 | 0.000000E+00 | 0.000000E+00 |
| 52 | 6.675136E-03 | 0.000000E+00 | 0.000000E+00 | 0.000000E+00 | 0.000000E+00 |
| 61 | 7.498690E-05 | 0.000000E+00 | 0.000000E+00 | 0.000000E+00 | 0.000000E+00 |
| 62 | -3.159948E-06 | 0.000000E+00 | 0.000000E+00 | 0.000000E+00 | 0.000000E+00 |

FIG. 33

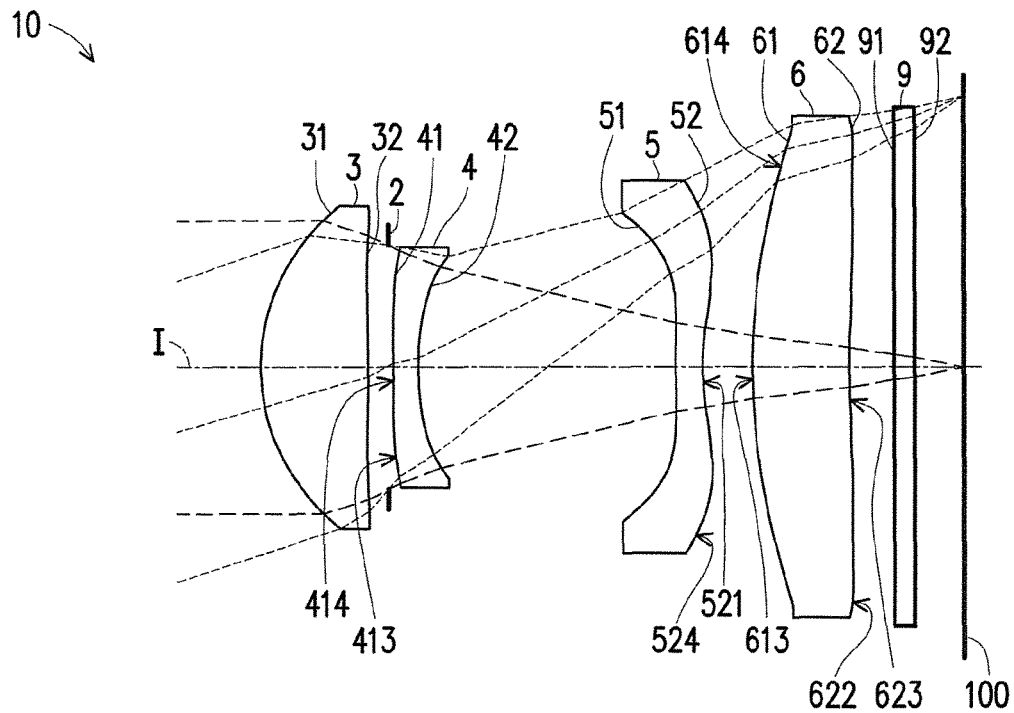
FIG. 34
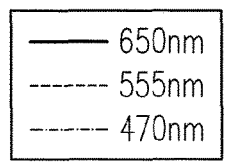
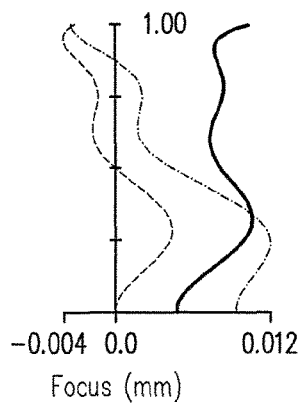
Longitudinal
spherical aberration
Field of view
-0.004  0.0   0.012
Focus (mm)
FIG. 35A
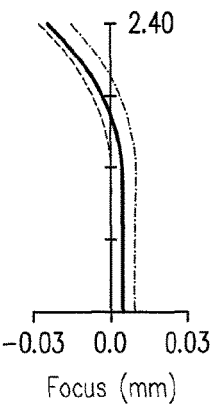
Field curvature
(sagittal direction)
Image height
-0.03  0.0  0.03
Focus (mm)
FIG. 35B
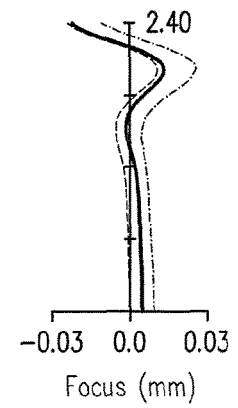
Field curvature
(tangential direction)
Image height
-0.03  0.0  0.03
Focus (mm)
FIG. 35C
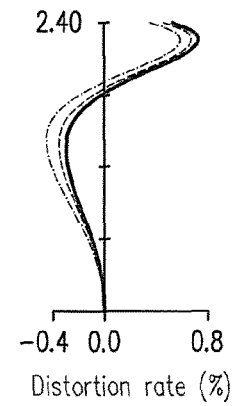
Distortion
Image height
-0.4  0.0  0.8
Distortion rate (%)
FIG. 35D

| Eighth embodiment ||||||
|---|---|---|---|---|---|
| Effective focal length=7.070 mm , Half field of view (HFOV)=18.661°, Fno=2.663, System length=6.330mm, Image height=2.4mm ||||||
| Lens element | Surface | Radius of curvature(mm) | Thickness(mm) | Refractive index | Dispersion coefficient | Focal length(mm) |
| Object |  | Infinity | 1.000E+10 |  |  |  |
| First lens element 3 | Object-side surface 31 | 1.791 | 0.969 | 1.545 | 55.987 | 3.061 |
|  | Image-side surface 32 | -20.410 | 0.179 |  |  |  |
| Aperture stop 2 |  | Infinity | 0.049 |  |  |  |
| Second lens element 4 | Object-side surface 41 | -20.026 | 0.225 | 1.642 | 22.409 | -4.420 |
|  | Image-side surface 42 | 3.353 | 2.313 |  |  |  |
| Third lens element 5 | Object-side surface 51 | 9.054 | 0.243 | 1.535 | 55.690 | -6.239 |
|  | Image-side surface 52 | 2.421 | 0.450 |  |  |  |
| Fourth lens element 6 | Object-side surface 61 | 5.977 | 0.875 | 1.642 | 22.409 | 20.838 |
|  | Image-side surface 62 | 10.115 | 0.400 |  |  |  |
| Light filter 9 | Object-side surface 91 | Infinity | 0.210 | 1.517 | 64.167 |  |
|  | Image-side surface 92 | Infinity | 0.417 |  |  |  |
|  | Image plane 100 | Infinity |  |  |  |  |

FIG. 36

| Surface | K | $a_4$ | $a_6$ | $a_8$ | $a_{10}$ |
|---|---|---|---|---|---|
| 31 | 0.000000E+00 | -3.057043E-03 | 6.863028E-04 | -1.404964E-03 | -2.708284E-05 |
| 32 | 0.000000E+00 | 3.976080E-02 | -2.800930E-02 | 1.150455E-02 | -1.705104E-03 |
| 41 | 0.000000E+00 | 1.350190E-01 | -1.104530E-01 | 6.123315E-02 | -1.300733E-02 |
| 42 | 0.000000E+00 | 1.301339E-01 | -4.897096E-02 | 2.049312E-02 | 1.306178E-02 |
| 51 | 0.000000E+00 | -1.853436E-01 | 2.788986E-02 | -1.611315E-02 | 5.204282E-03 |
| 52 | 0.000000E+00 | -1.603280E-01 | 2.916861E-02 | -5.452202E-03 | 7.443533E-04 |
| 61 | 0.000000E+00 | 6.789365E-04 | -2.254937E-03 | 7.542721E-04 | -9.012263E-05 |
| 62 | 0.000000E+00 | -3.438080E-02 | 9.815116E-03 | -1.001299E-03 | 1.889124E-06 |
| Surface | $a_{12}$ | $a_{14}$ | $a_{16}$ | $a_{18}$ | $a_{20}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | 1.233430E-06 | 0.000000E+00 | 0.000000E+00 | 0.000000E+00 | 0.000000E+00 |
| 62 | 7.516400E-07 | 0.000000E+00 | 0.000000E+00 | 0.000000E+00 | 0.000000E+00 |

FIG. 37

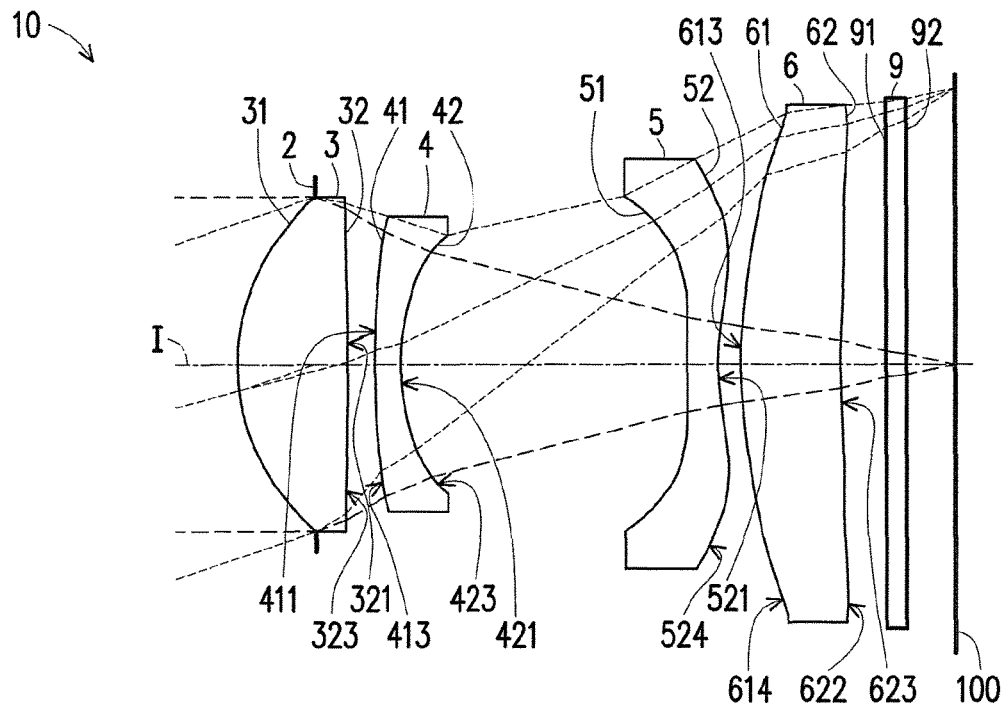
FIG. 38
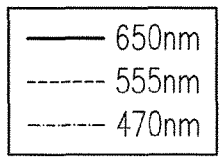
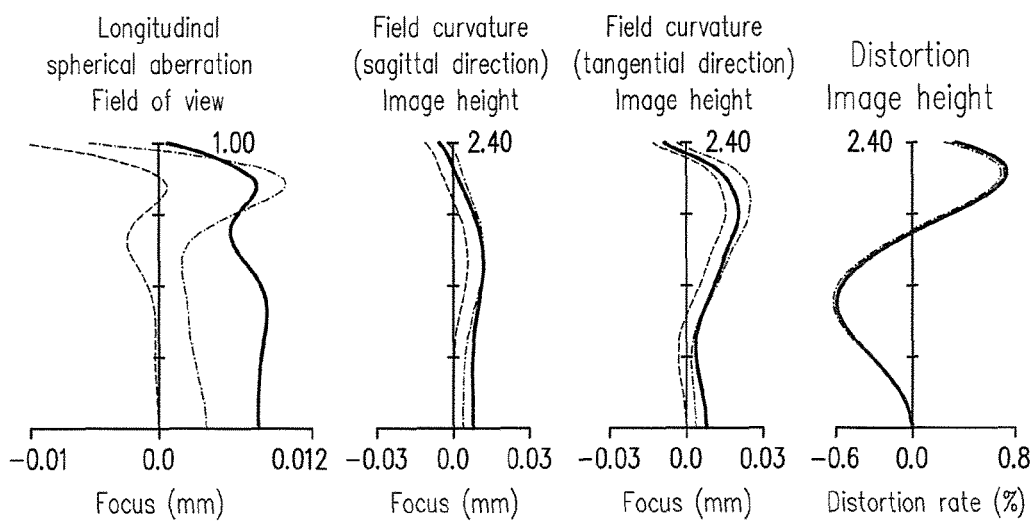
FIG. 39A  FIG. 39B  FIG. 39C  FIG. 39D

| Ninth embodiment | | | | | | |
|---|---|---|---|---|---|---|
| Effective focal length=7.070 mm , Half field of view (HFOV)=18.681°, Fno=2.391, System length=6.380mm, Image height=2.4mm | | | | | | |
| Lens element | Surface | Radius of curvature(mm) | Thickness(mm) | Refractive index | Dispersion coefficient | Focal length(mm) |
| Object | | Infinity | 1.000E+10 | | | |
| Aperture stop 2 | | Infinity | -0.675 | | | |
| First lens element 3 | Object-side surface 31 | 1.855 | 0.971 | 1.545 | 55.987 | 3.159 |
| | Image-side surface 32 | -20.214 | 0.239 | | | |
| Second lens element 4 | Object-side surface 41 | 9.646 | 0.229 | 1.642 | 22.409 | -4.434 |
| | Image-side surface 42 | 2.192 | 2.518 | | | |
| Third lens element 5 | Object-side surface 51 | 10.965 | 0.275 | 1.535 | 55.690 | -5.240 |
| | Image-side surface 52 | 2.218 | 0.197 | | | |
| Fourth lens element 6 | Object-side surface 61 | 3.822 | 0.886 | 1.642 | 22.409 | 11.963 |
| | Image-side surface 62 | 6.859 | 0.400 | | | |
| Light filter 9 | Object-side surface 91 | Infinity | 0.210 | 1.517 | 64.167 | |
| | Image-side surface 92 | Infinity | 0.455 | | | |
| | Image plane 100 | Infinity | | | | |

FIG. 40

| Surface | K | $a_4$ | $a_6$ | $a_8$ | $a_{10}$ |
|---|---|---|---|---|---|
| 31 | 0.000000E+00 | -4.227141E-03 | 2.056061E-03 | -1.614331E-03 | -1.189528E-04 |
| 32 | 0.000000E+00 | 2.026816E-02 | -1.480973E-02 | 5.327210E-03 | -6.181787E-04 |
| 41 | 0.000000E+00 | 2.037983E-02 | -3.689766E-02 | 2.963122E-02 | -6.486110E-03 |
| 42 | 0.000000E+00 | 1.732735E-02 | 3.364214E-03 | 6.294160E-03 | 9.701926E-03 |
| 51 | 0.000000E+00 | -1.631262E-01 | 9.716846E-03 | -9.904720E-05 | 8.682542E-04 |
| 52 | 0.000000E+00 | -1.816870E-01 | 3.451953E-02 | -3.885264E-03 | 1.432428E-04 |
| 61 | 0.000000E+00 | -5.685056E-02 | 2.649709E-02 | -6.572434E-03 | 8.392301E-04 |
| 62 | 0.000000E+00 | -7.420189E-02 | 3.569271E-02 | -8.312197E-03 | 9.562279E-04 |
| Surface | $a_{12}$ | $a_{14}$ | $a_{16}$ | $a_{18}$ | $a_{20}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | -4.511135E-05 | 0.000000E+00 | 0.000000E+00 | 0.000000E+00 | 0.000000E+00 |
| 62 | -4.615740E-05 | 0.000000E+00 | 0.000000E+00 | 0.000000E+00 | 0.000000E+00 |

FIG. 41

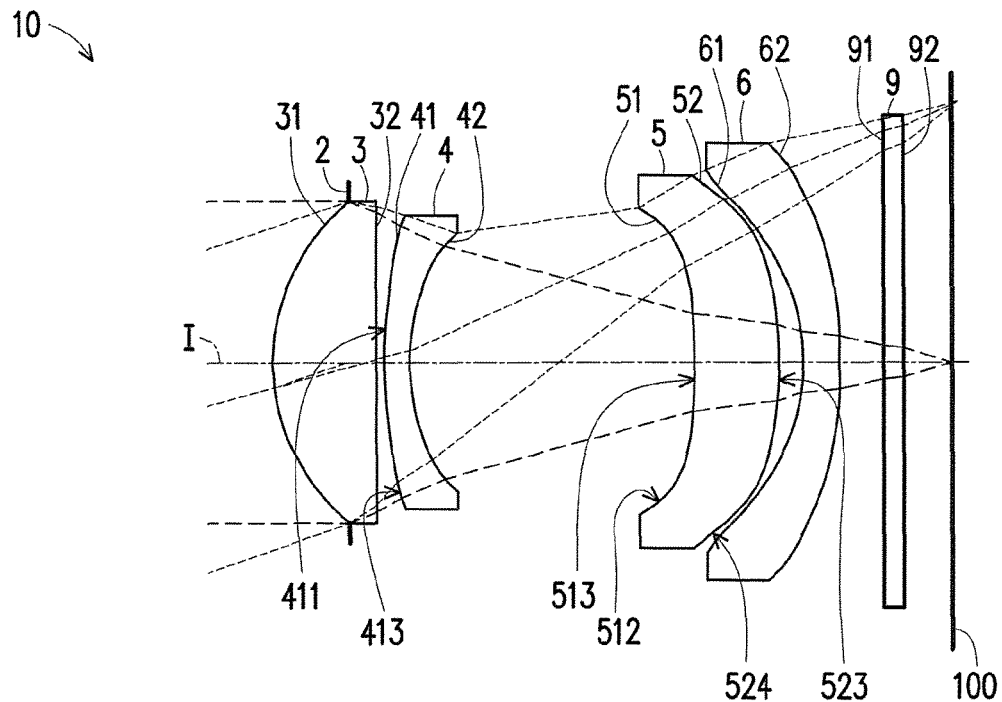
FIG. 42
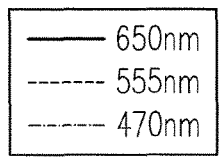
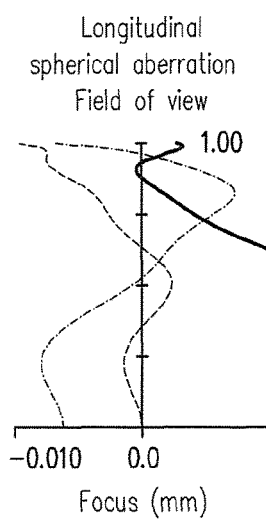
FIG. 43A
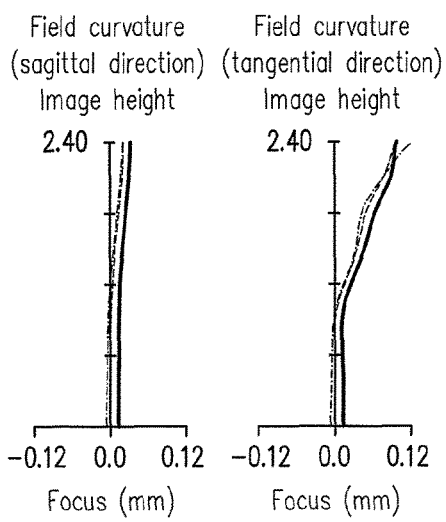
FIG. 43B    FIG. 43C
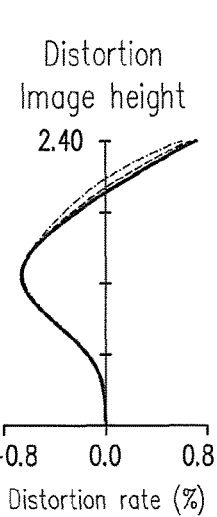
FIG. 43D

| Tenth embodiment | | | | | | |
|---|---|---|---|---|---|---|
| Effective focal length=7.070 mm, Half field of view (HFOV)=18.639°, Fno=2.389, System length=6.381mm, Image height=2.4mm | | | | | | |
| Lens element | Surface | Radius of curvature(mm) | Thickness(mm) | Refractive index | Dispersion coefficient | Focal length(mm) |
| Object | | Infinity | 1.000E+10 | | | |
| Aperture stop 2 | | Infinity | -0.675 | | | |
| First lens element 3 | Object-side surface 31 | 1.865 | 0.945 | 1.545 | 55.987 | 3.393 |
| | Image-side surface 32 | -244.336 | 0.074 | | | |
| Second lens element 4 | Object-side surface 41 | 4.344 | 0.230 | 1.642 | 22.409 | -5.837 |
| | Image-side surface 42 | 1.979 | 2.605 | | | |
| Third lens element 5 | Object-side surface 51 | -7.053 | 0.774 | 1.642 | 22.409 | 13.358 |
| | Image-side surface 52 | -4.052 | 0.219 | | | |
| Fourth lens element 6 | Object-side surface 61 | -2.004 | 0.329 | 1.535 | 55.690 | -5.178 |
| | Image-side surface 62 | -7.597 | 0.400 | | | |
| Light filter 9 | Object-side surface 91 | Infinity | 0.210 | 1.517 | 64.167 | |
| | Image-side surface 92 | Infinity | 0.595 | | | |
| | Image plane 100 | Infinity | | | | |

FIG. 44

| Sur-face | K | $a_4$ | $a_6$ | $a_8$ | $a_{10}$ |
|---|---|---|---|---|---|
| 31 | 0.000000E+00 | -6.052359E-03 | 5.241369E-03 | -2.792160E-03 | 7.148732E-05 |
| 32 | 0.000000E+00 | 1.306624E-02 | -1.784194E-02 | 8.840408E-03 | -1.336890E-03 |
| 41 | 0.000000E+00 | -8.569650E-03 | -3.413382E-02 | 3.108993E-02 | -6.457273E-03 |
| 42 | 0.000000E+00 | -1.731886E-02 | 6.022578E-03 | 8.108906E-03 | 5.332736E-03 |
| 51 | 0.000000E+00 | -2.940641E-02 | -2.596258E-02 | 4.250759E-03 | -3.621599E-03 |
| 52 | 0.000000E+00 | -1.052025E-02 | -5.060116E-03 | -1.221251E-02 | 3.313909E-03 |
| 61 | 0.000000E+00 | -4.714068E-02 | 6.510647E-02 | -3.820589E-02 | 1.027177E-02 |
| 62 | 0.000000E+00 | -7.689061E-02 | 3.487936E-02 | -6.029243E-03 | -1.649637E-04 |
| Sur-face | $a_{12}$ | $a_{14}$ | $a_{16}$ | $a_{18}$ | $a_{20}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | -8.278239E-04 | 0.000000E+00 | 0.000000E+00 | 0.000000E+00 | 0.000000E+00 |
| 62 | 8.505611E-05 | 0.000000E+00 | 0.000000E+00 | 0.000000E+00 | 0.000000E+00 |

FIG. 45

| Eleventh embodiment |||||||
|---|---|---|---|---|---|---|
| Effective focal length=9.000 mm , Half field of view (HFOV)=17.948°, Fno=2.401, System length=7.953mm, Image height=2.944mm |||||||
| Lens element | Surface | Radius of curvature(mm) | Thickness(mm) | Refractive index | Dispersion coefficient | Focal length(mm) |
| Object | | Infinity | 1.000E+10 | | | |
| Aperture stop 2 | | Infinity | -0.797 | | | |
| First lens element 3 | Object-side surface 31 | 2.560 | 1.299 | 1.545 | 55.987 | 3.944 |
| | Image-side surface 32 | -11.164 | 0.050 | | | |
| Second lens element 4 | Object-side surface 41 | 192.487 | 0.287 | 1.642 | 22.409 | -7.336 |
| | Image-side surface 42 | 4.632 | 2.659 | | | |
| Third lens element 5 | Object-side surface 51 | -12.765 | 0.298 | 1.545 | 55.987 | -15.310 |
| | Image-side surface 52 | 24.451 | 1.091 | | | |
| Fourth lens element 6 | Object-side surface 61 | -12.742 | 0.580 | 1.661 | 20.401 | -616.306 |
| | Image-side surface 62 | -13.389 | 0.059 | | | |
| Fifth Lens element 7 | Object-side surface 71 | -9.332 | 0.511 | 1.535 | 55.690 | -11.037 |
| | Image-side surface 72 | 16.519 | 0.400 | | | |
| Light filter 9 | Object-side surface 91 | Infinity | 0.210 | 1.517 | 64.167 | |
| | Image-side surface 92 | Infinity | 0.510 | | | |
| | Image plane 100 | Infinity | | | | |

FIG. 48

| Surface | K | $a_4$ | $a_6$ | $a_8$ | $a_{10}$ |
|---|---|---|---|---|---|
| 31 | 0.000000E+00 | -2.351287E-03 | 1.084370E-03 | -2.711235E-04 | 2.916700E-05 |
| 32 | 0.000000E+00 | 9.624205E-03 | -1.827185E-03 | 3.239658E-04 | -1.292017E-05 |
| 41 | 0.000000E+00 | -7.636016E-03 | 1.660563E-03 | 1.784648E-04 | -1.867533E-05 |
| 42 | 0.000000E+00 | -1.632786E-02 | 7.115803E-03 | -1.499906E-03 | 3.426087E-04 |
| 51 | 5.676803E+01 | -6.586693E-02 | -1.821630E-02 | 1.730840E-02 | -3.105826E-03 |
| 52 | 1.154923E+01 | -7.026315E-02 | 1.588342E-04 | 8.862363E-03 | -1.308221E-03 |
| 61 | 2.384863E+01 | -5.569685E-02 | 5.999588E-03 | 4.306380E-04 | -3.204632E-05 |
| 62 | 2.695388E+01 | -7.167138E-02 | 9.638402E-03 | -4.145079E-04 | 4.602755E-05 |
| 71 | 1.021094E+01 | -6.002439E-02 | 5.210218E-03 | 5.171172E-04 | -1.400300E-05 |
| 72 | 3.523715E+01 | -4.502853E-02 | 6.200079E-03 | -9.849109E-04 | 1.131711E-04 |
| Surface | $a_{12}$ | $a_{14}$ | $a_{16}$ | $a_{18}$ | $a_{20}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | 0.000000E+00 | 0.000000E+00 | 0.000000E+00 | 0.000000E+00 | 0.000000E+00 |
| 62 | 0.000000E+00 | 0.000000E+00 | 0.000000E+00 | 0.000000E+00 | 0.000000E+00 |
| 71 | -2.255598E-06 | 0.000000E+00 | 0.000000E+00 | 0.000000E+00 | 0.000000E+00 |
| 72 | -6.761112E-06 | 0.000000E+00 | 0.000000E+00 | 0.000000E+00 | 0.000000E+00 |

FIG. 49

| Twelfth embodiment ||||||
|---|---|---|---|---|---|
| Effective focal length=9.000 mm , Half field of view (HFOV)=18.027°, Fno=2.394, System length=7.953mm, Image height=2.944mm ||||||
| Lens element | Surface | Radius of curvature(mm) | Thickness(mm) | Refractive index | Dispersion coefficient | Focal length(mm) |
| Object | | Infinity | 1.000E+10 | | | |
| Aperture stop 2 | | Infinity | -0.866 | | | |
| First lens element 3 | Object-side surface 31 | 2.350 | 1.364 | 1.545 | 55.987 | 3.745 |
| | Image-side surface 32 | -12.572 | 0.457 | | | |
| Second lens element 4 | Object-side surface 41 | -3.519 | 0.289 | 1.642 | 22.409 | -5.012 |
| | Image-side surface 42 | 42.917 | 2.536 | | | |
| Third lens element 5 | Object-side surface 51 | 45.000 | 0.292 | 1.545 | 55.987 | -25.341 |
| | Image-side surface 52 | 10.562 | 0.634 | | | |
| Fourth lens element 6 | Object-side surface 61 | -10.433 | 0.873 | 1.661 | 20.401 | 7.794 |
| | Image-side surface 62 | -3.583 | 0.060 | | | |
| Fifth Lens element 7 | Object-side surface 71 | -3.273 | 0.336 | 1.535 | 55.690 | -5.282 |
| | Image-side surface 72 | 21.883 | 0.400 | | | |
| Light filter 9 | Object-side surface 91 | Infinity | 0.210 | 1.517 | 64.167 | |
| | Image-side surface 92 | Infinity | 0.503 | | | |
| | Image plane 100 | Infinity | | | | |

FIG. 52

| Surface | K | $a_4$ | $a_6$ | $a_8$ | $a_{10}$ |
|---|---|---|---|---|---|
| 31 | 0.000000E+00 | -3.028239E-03 | -2.519953E-05 | 3.919481E-05 | -4.296529E-05 |
| 32 | 0.000000E+00 | 6.325788E-03 | 2.392069E-03 | -1.087095E-03 | 1.379552E-04 |
| 41 | 0.000000E+00 | 1.139913E-01 | -4.211841E-02 | 1.005074E-02 | -9.978409E-04 |
| 42 | 0.000000E+00 | 1.083095E-01 | -2.285126E-02 | -3.555034E-04 | 2.349002E-03 |
| 51 | -8.247962E+01 | -3.856816E-02 | -2.409093E-02 | 6.135860E-03 | -2.148310E-04 |
| 52 | 2.325667E+01 | -3.725511E-02 | -1.772768E-02 | 7.489188E-03 | -7.373513E-04 |
| 61 | 1.332942E+01 | -2.959465E-02 | 1.165703E-02 | -1.636825E-03 | 8.932249E-05 |
| 62 | 5.910066E-01 | -1.131147E-02 | 4.712124E-03 | -6.741799E-04 | 6.168407E-05 |
| 71 | -1.128902E+00 | -8.242041E-03 | 1.252554E-03 | 4.079165E-05 | 7.426365E-06 |
| 72 | 5.262838E+01 | -4.530830E-02 | 1.043551E-02 | -1.361611E-03 | 9.158082E-05 |
| Surface | $a_{12}$ | $a_{14}$ | $a_{16}$ | $a_{18}$ | $a_{20}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | 0.000000E+00 | 0.000000E+00 | 0.000000E+00 | 0.000000E+00 | 0.000000E+00 |
| 62 | 0.000000E+00 | 0.000000E+00 | 0.000000E+00 | 0.000000E+00 | 0.000000E+00 |
| 71 | -8.462016E-07 | 0.000000E+00 | 0.000000E+00 | 0.000000E+00 | 0.000000E+00 |
| 72 | -3.138643E-06 | 0.000000E+00 | 0.000000E+00 | 0.000000E+00 | 0.000000E+00 |

FIG. 53

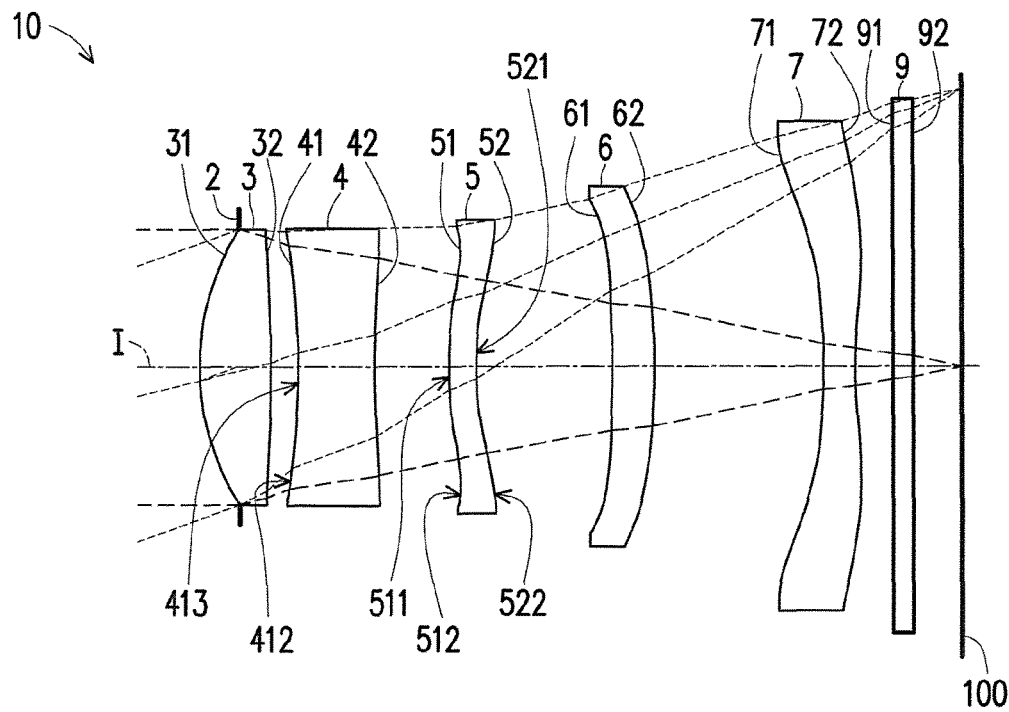
FIG. 54
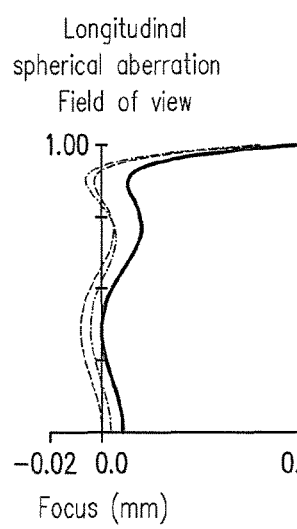
Longitudinal
spherical aberration
Field of view
FIG. 55A
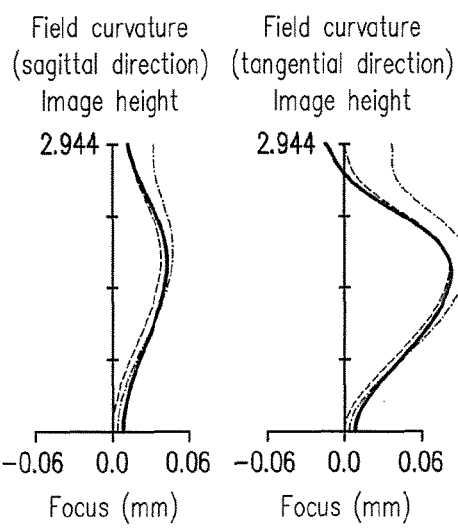
Field curvature
(sagittal direction)
Image height
FIG. 55B
Field curvature
(tangential direction)
Image height
FIG. 55C
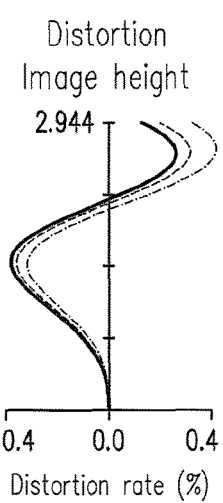
Distortion
Image height
FIG. 55D

| Thirteenth embodiment ||||||
|---|---|---|---|---|---|
| Effective focal length=8.137 mm , Half field of view (HFOV)=19.854°, Fno=2.860, System length=8.095mm, Image height=2.944mm ||||||
| Lens element | Surface | Radius of curvature(mm) | Thickness(mm) | Refractive index | Dispersion coefficient | Focal length(mm) |
| Object | | Infinity | 1.000E+10 | | | |
| Aperture stop 2 | | Infinity | -0.390 | | | |
| First lens element 3 | Object-side surface 31 | 2.816 | 0.748 | 1.545 | 55.987 | 4.331 |
| | Image-side surface 32 | -13.412 | 0.289 | | | |
| Second lens element 4 | Object-side surface 41 | -7.184 | 0.810 | 1.642 | 22.409 | -7.602 |
| | Image-side surface 42 | 16.312 | 0.786 | | | |
| Third lens element 5 | Object-side surface 51 | 4.816 | 0.297 | 1.545 | 55.987 | -123.485 |
| | Image-side surface 52 | 4.397 | 1.430 | | | |
| Fourth lens element 6 | Object-side surface 61 | -15.804 | 0.447 | 1.642 | 22.409 | 17.637 |
| | Image-side surface 62 | -6.702 | 1.786 | | | |
| Fifth Lens element 7 | Object-side surface 71 | -10.637 | 0.336 | 1.545 | 55.987 | -6.516 |
| | Image-side surface 72 | 5.409 | 0.400 | | | |
| Light filter 9 | Object-side surface 91 | Infinity | 0.210 | 1.517 | 64.167 | |
| | Image-side surface 92 | Infinity | 0.556 | | | |
| | Image plane 100 | Infinity | | | | |

FIG. 56

| Surface | K | $a_4$ | $a_6$ | $a_8$ | $a_{10}$ |
|---|---|---|---|---|---|
| 31 | 0.000000E+00 | 5.407790E-04 | -5.915191E-04 | 6.907364E-04 | 0.000000E+00 |
| 32 | 0.000000E+00 | 4.613315E-03 | 2.962352E-03 | -8.330754E-04 | 0.000000E+00 |
| 41 | 0.000000E+00 | 1.262967E-02 | -6.003590E-04 | -1.371664E-03 | 0.000000E+00 |
| 42 | 0.000000E+00 | 1.067673E-02 | -7.385971E-03 | 3.072912E-04 | 0.000000E+00 |
| 51 | 0.000000E+00 | 2.407344E-02 | -2.918095E-02 | 2.238141E-03 | 0.000000E+00 |
| 52 | 0.000000E+00 | 3.876589E-02 | -3.428213E-02 | 5.071856E-03 | 0.000000E+00 |
| 61 | 0.000000E+00 | 1.482958E-02 | -1.201028E-02 | 9.189870E-04 | 0.000000E+00 |
| 62 | 0.000000E+00 | 2.349610E-02 | -1.322697E-02 | 1.638806E-03 | 0.000000E+00 |
| 71 | 0.000000E+00 | -2.527517E-02 | 3.554521E-03 | 2.803630E-05 | -1.023037E-05 |
| 72 | 0.000000E+00 | -4.895102E-02 | 8.864633E-03 | -9.100570E-04 | 4.235342E-05 |
| Surface | $a_{12}$ | $a_{14}$ | $a_{16}$ | $a_{18}$ | $a_{20}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | 0.000000E+00 | 0.000000E+00 | 0.000000E+00 | 0.000000E+00 | 0.000000E+00 |
| 62 | 0.000000E+00 | 0.000000E+00 | 0.000000E+00 | 0.000000E+00 | 0.000000E+00 |
| 71 | 0.000000E+00 | 0.000000E+00 | 0.000000E+00 | 0.000000E+00 | 0.000000E+00 |
| 72 | 0.000000E+00 | 0.000000E+00 | 0.000000E+00 | 0.000000E+00 | 0.000000E+00 |

FIG. 57

| Fourteenth embodiment ||||||
|---|---|---|---|---|---|
| Effective focal length=8.160 mm, Half field of view (HFOV)=19.836°, Fno=2.801, System length=8.098mm, Image height=2.944mm ||||||
| Lens element | Surface | Radius of curvature(mm) | Thickness(mm) | Refractive index | Dispersion coefficient | Focal length(mm) |
| Object | | Infinity | 1.000E+10 | | | |
| Aperture stop 2 | | Infinity | -0.434 | | | |
| First lens element 3 | Object-side surface 31 | 2.588 | 0.819 | 1.545 | 55.987 | 3.938 |
| | Image-side surface 32 | -11.327 | 0.192 | | | |
| Second lens element 4 | Object-side surface 41 | -6.690 | 0.927 | 1.642 | 22.409 | -8.820 |
| | Image-side surface 42 | 41.072 | 0.882 | | | |
| Third lens element 5 | Object-side surface 51 | -22.279 | 1.460 | 1.545 | 55.987 | -41.445 |
| | Image-side surface 52 | -1426.325 | 0.825 | | | |
| Fourth lens element 6 | Object-side surface 61 | -7.974 | 0.485 | 1.642 | 22.409 | 325.590 |
| | Image-side surface 62 | -7.867 | 1.054 | | | |
| Fifth Lens element 7 | Object-side surface 71 | -3.832 | 0.340 | 1.545 | 55.987 | -7.274 |
| | Image-side surface 72 | -111.165 | 0.400 | | | |
| Light filter 9 | Object-side surface 91 | Infinity | 0.210 | 1.517 | 64.167 | |
| | Image-side surface 92 | Infinity | 0.504 | | | |
| | Image plane 100 | Infinity | | | | |

FIG. 60

| Surface | K | $a_4$ | $a_6$ | $a_8$ | $a_{10}$ |
|---|---|---|---|---|---|
| 31 | 0.000000E+00 | -2.272817E-03 | 5.386787E-04 | 2.165309E-04 | 0.000000E+00 |
| 32 | 0.000000E+00 | 1.571325E-03 | 7.755814E-04 | -4.827006E-04 | 0.000000E+00 |
| 41 | 0.000000E+00 | 9.087831E-03 | -5.238002E-03 | 3.784036E-04 | 0.000000E+00 |
| 42 | 0.000000E+00 | 6.613124E-03 | -1.007879E-02 | 1.744615E-03 | 0.000000E+00 |
| 51 | 0.000000E+00 | -1.215285E-03 | -1.364831E-02 | 9.516238E-04 | 0.000000E+00 |
| 52 | 0.000000E+00 | 2.324498E-02 | -1.309444E-02 | 2.049048E-03 | 0.000000E+00 |
| 61 | 0.000000E+00 | 2.092627E-02 | -2.036080E-02 | 7.958409E-04 | 0.000000E+00 |
| 62 | 0.000000E+00 | 2.022441E-02 | -1.740567E-02 | 2.056609E-03 | 0.000000E+00 |
| 71 | 0.000000E+00 | -2.129800E-02 | 3.865251E-03 | -9.054282E-05 | -2.901162E-06 |
| 72 | 0.000000E+00 | -3.994243E-02 | 7.816812E-03 | -9.441040E-04 | 4.288580E-05 |
| Surface | $a_{12}$ | $a_{14}$ | $a_{16}$ | $a_{18}$ | $a_{20}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | 0.000000E+00 | 0.000000E+00 | 0.000000E+00 | 0.000000E+00 | 0.000000E+00 |
| 62 | 0.000000E+00 | 0.000000E+00 | 0.000000E+00 | 0.000000E+00 | 0.000000E+00 |
| 71 | 0.000000E+00 | 0.000000E+00 | 0.000000E+00 | 0.000000E+00 | 0.000000E+00 |
| 72 | 0.000000E+00 | 0.000000E+00 | 0.000000E+00 | 0.000000E+00 | 0.000000E+00 |

FIG. 61

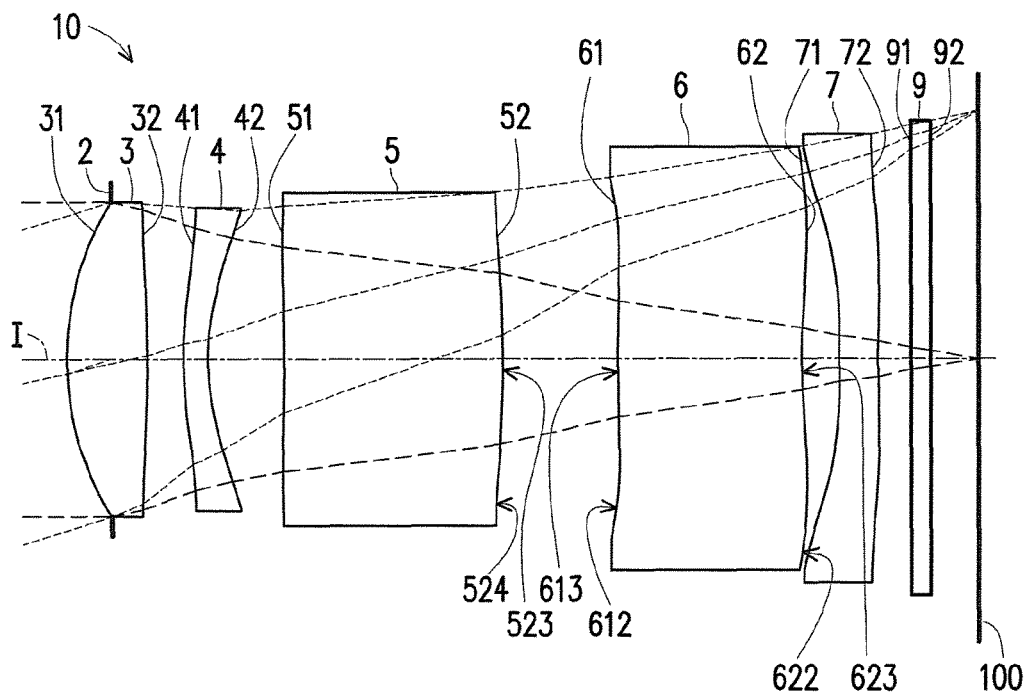
FIG. 62
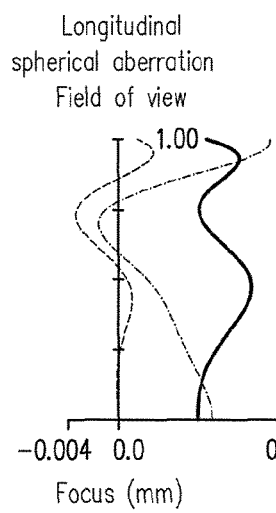
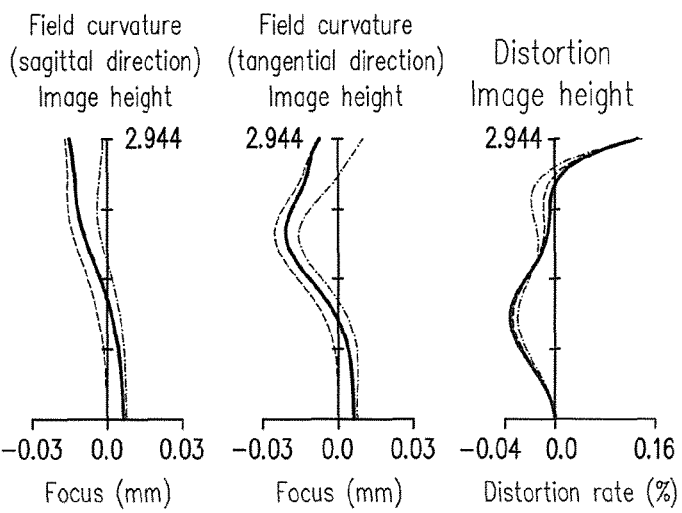
FIG. 63A  FIG. 63B  FIG. 63C  FIG. 63D

| Fifteenth embodiment ||||||
|---|---|---|---|---|---|
| Effective focal length=9.360 mm , Half field of view (HFOV)=17.438°, Fno=2.499, System length=10.753mm, Image height=2.944mm ||||||
| Lens element | Surface | Radius of curvature(mm) | Thickness(mm) | Refractive index | Dispersion coefficient | Focal length(mm) |
| Object | | Infinity | 1.000E+10 | | | |
| Aperture stop 2 | | Infinity | -0.509 | | | |
| First lens element 3 | Object-side surface 31 | 3.766 | 0.949 | 1.545 | 55.987 | 5.555 |
| | Image-side surface 32 | -14.234 | 0.428 | | | |
| Second lens element 4 | Object-side surface 41 | 5.419 | 0.296 | 1.642 | 22.409 | -10.062 |
| | Image-side surface 42 | 2.895 | 0.900 | | | |
| Third lens element 5 | Object-side surface 51 | -68.797 | 2.606 | 1.545 | 55.987 | 42.458 |
| | Image-side surface 52 | -17.578 | 1.358 | | | |
| Fourth lens element 6 | Object-side surface 61 | 16.915 | 2.191 | 1.661 | 20.401 | -28.712 |
| | Image-side surface 62 | 8.513 | 0.444 | | | |
| Fifth Lens element 7 | Object-side surface 71 | -27.493 | 0.455 | 1.535 | 55.690 | -16.630 |
| | Image-side surface 72 | 13.288 | 0.400 | | | |
| Light filter 9 | Object-side surface 91 | Infinity | 0.210 | 1.517 | 64.167 | |
| | Image-side surface 92 | Infinity | 0.516 | | | |
| | Image plane 100 | Infinity | | | | |

FIG. 64

| Surface | K | $a_4$ | $a_6$ | $a_8$ | $a_{10}$ |
|---|---|---|---|---|---|
| 31 | 0.000000E+00 | 1.496203E-03 | 2.072757E-04 | -1.131572E-04 | 2.682281E-05 |
| 32 | 0.000000E+00 | 1.138355E-02 | -3.516573E-03 | 7.122825E-04 | -5.387008E-05 |
| 41 | 0.000000E+00 | -1.379775E-02 | -3.121775E-03 | 1.646302E-03 | -2.487949E-04 |
| 42 | 0.000000E+00 | -2.629315E-02 | -2.985922E-04 | 1.400026E-03 | -2.801720E-04 |
| 51 | 1.225423E+03 | 6.778792E-04 | -8.445475E-05 | 4.212419E-04 | -6.259164E-05 |
| 52 | 4.298116E+01 | -2.726957E-03 | 1.983590E-03 | -2.913348E-04 | 4.768515E-05 |
| 61 | 1.545689E+01 | -1.412901E-02 | 1.473501E-03 | -3.086267E-04 | 3.225181E-05 |
| 62 | -2.761406E+01 | -9.630419E-03 | -8.133540E-04 | 3.264556E-04 | -2.245035E-05 |
| 71 | 8.726194E+01 | -2.927872E-02 | 4.423022E-03 | 5.622445E-05 | -3.970630E-05 |
| 72 | 1.710447E+01 | -3.115208E-02 | 7.310766E-03 | -9.400347E-04 | 6.711233E-05 |
| Surface | $a_{12}$ | $a_{14}$ | $a_{16}$ | $a_{18}$ | $a_{20}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | 0.000000E+00 | 0.000000E+00 | 0.000000E+00 | 0.000000E+00 | 0.000000E+00 |
| 62 | 0.000000E+00 | 0.000000E+00 | 0.000000E+00 | 0.000000E+00 | 0.000000E+00 |
| 71 | 1.514955E-06 | 0.000000E+00 | 0.000000E+00 | 0.000000E+00 | 0.000000E+00 |
| 72 | -2.301617E-06 | 0.000000E+00 | 0.000000E+00 | 0.000000E+00 | 0.000000E+00 |

FIG. 65

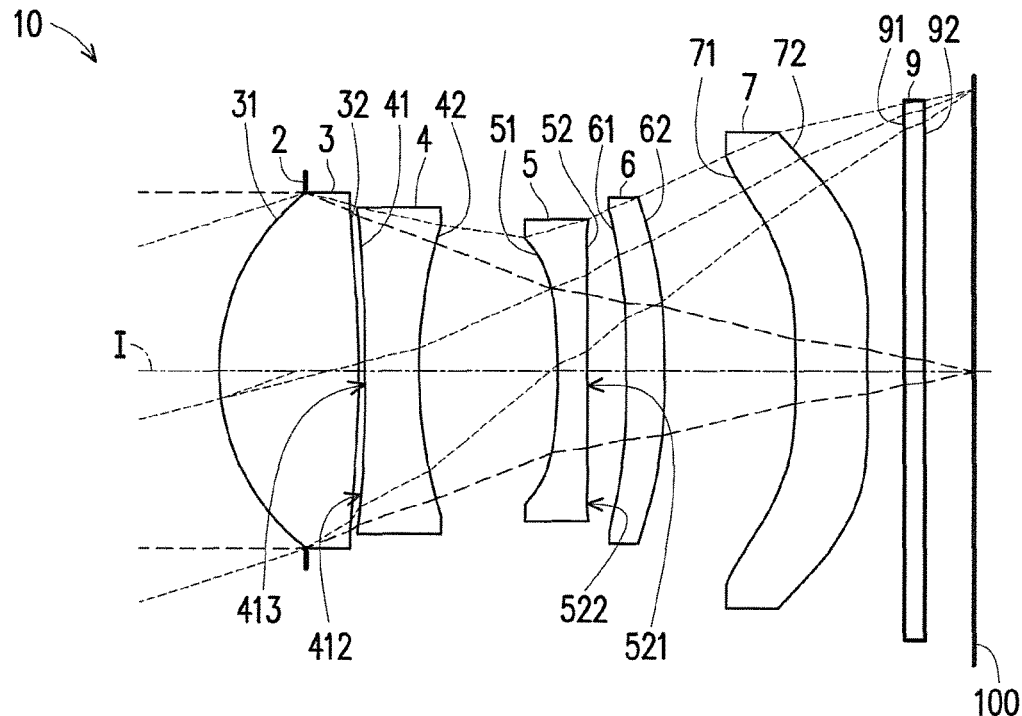
FIG. 66
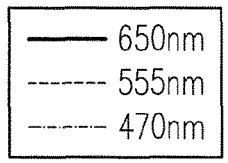
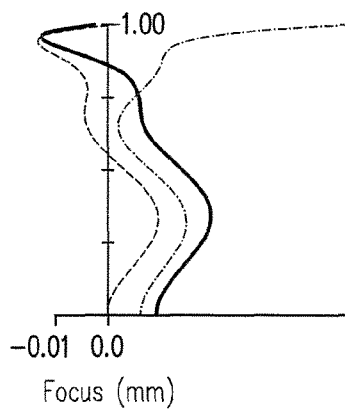
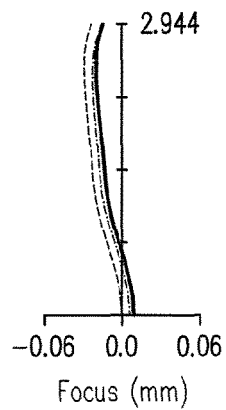
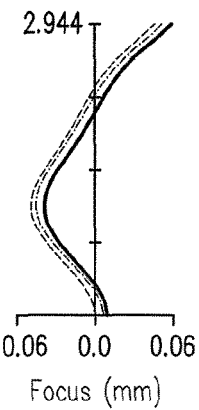
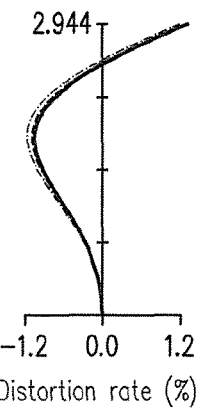
FIG. 67A    FIG. 67B  FIG. 67C  FIG. 67D

| Sixteenth embodiment | | | | | | |
|---|---|---|---|---|---|---|
| Effective focal length=9.000 mm, Half field of view (HFOV)=17.918°, Fno=2.389, System length=7.954mm, Image height=2.944mm | | | | | | |
| Lens element | Surface | Radius of curvature(mm) | Thickness(mm) | Refractive index | Dispersion coefficient | Focal length(mm) |
| Object | | Infinity | 1.000E+10 | | | |
| Aperture stop 2 | | Infinity | -0.899 | | | |
| First lens element 3 | Object-side surface 31 | 2.372 | 1.469 | 1.545 | 55.987 | 3.670 |
| | Image-side surface 32 | -10.120 | 0.066 | | | |
| Second lens element 4 | Object-side surface 41 | -28.513 | 0.567 | 1.642 | 22.409 | -5.930 |
| | Image-side surface 42 | 4.471 | 1.463 | | | |
| Third lens element 5 | Object-side surface 51 | -11.010 | 0.294 | 1.545 | 55.987 | -10.661 |
| | Image-side surface 52 | 12.481 | 0.425 | | | |
| Fourth lens element 6 | Object-side surface 61 | -18.999 | 0.404 | 1.661 | 20.401 | 45.302 |
| | Image-side surface 62 | -11.759 | 1.379 | | | |
| Fifth Lens element 7 | Object-side surface 71 | -10.909 | 0.744 | 1.535 | 55.690 | -12.327 |
| | Image-side surface 72 | 17.204 | 0.400 | | | |
| Light filter 9 | Object-side surface 91 | Infinity | 0.210 | 1.517 | 64.167 | |
| | Image-side surface 92 | Infinity | 0.533 | | | |
| | Image plane 100 | Infinity | | | | |

FIG. 68

| Surface | K | $a_4$ | $a_6$ | $a_8$ | $a_{10}$ |
|---|---|---|---|---|---|
| 31 | 0.000000E+00 | -2.440753E-03 | 1.067496E-03 | -2.965228E-04 | 3.657599E-05 |
| 32 | 0.000000E+00 | 8.369931E-03 | -1.440817E-03 | 3.302705E-04 | -3.740028E-05 |
| 41 | 0.000000E+00 | -8.232937E-03 | 1.341181E-03 | 2.522800E-04 | -5.632315E-05 |
| 42 | 0.000000E+00 | -2.074124E-02 | 7.975015E-03 | -2.141044E-03 | 5.552967E-04 |
| 51 | 5.662013E+01 | -5.315834E-02 | -1.279781E-02 | 1.468613E-02 | -4.212645E-03 |
| 52 | 4.905664E+01 | -4.404612E-02 | 5.361521E-03 | 6.955753E-03 | -1.997846E-03 |
| 61 | -4.642390E+02 | -3.940296E-02 | 1.011225E-02 | 5.390293E-04 | -4.136060E-04 |
| 62 | 3.285944E+01 | -3.173752E-02 | 9.396942E-03 | -7.419364E-04 | 4.528227E-05 |
| 71 | 1.292040E+00 | -5.170599E-02 | 5.153968E-03 | 5.008532E-04 | -2.382495E-05 |
| 72 | 3.533365E+01 | -5.942352E-02 | 7.876269E-03 | -9.646582E-04 | 1.102514E-04 |
| Surface | $a_{12}$ | $a_{14}$ | $a_{16}$ | $a_{18}$ | $a_{20}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | 0.000000E+00 | 0.000000E+00 | 0.000000E+00 | 0.000000E+00 | 0.000000E+00 |
| 62 | 0.000000E+00 | 0.000000E+00 | 0.000000E+00 | 0.000000E+00 | 0.000000E+00 |
| 71 | -5.145696E-06 | 0.000000E+00 | 0.000000E+00 | 0.000000E+00 | 0.000000E+00 |
| 72 | -5.926114E-06 | 0.000000E+00 | 0.000000E+00 | 0.000000E+00 | 0.000000E+00 |

FIG. 69

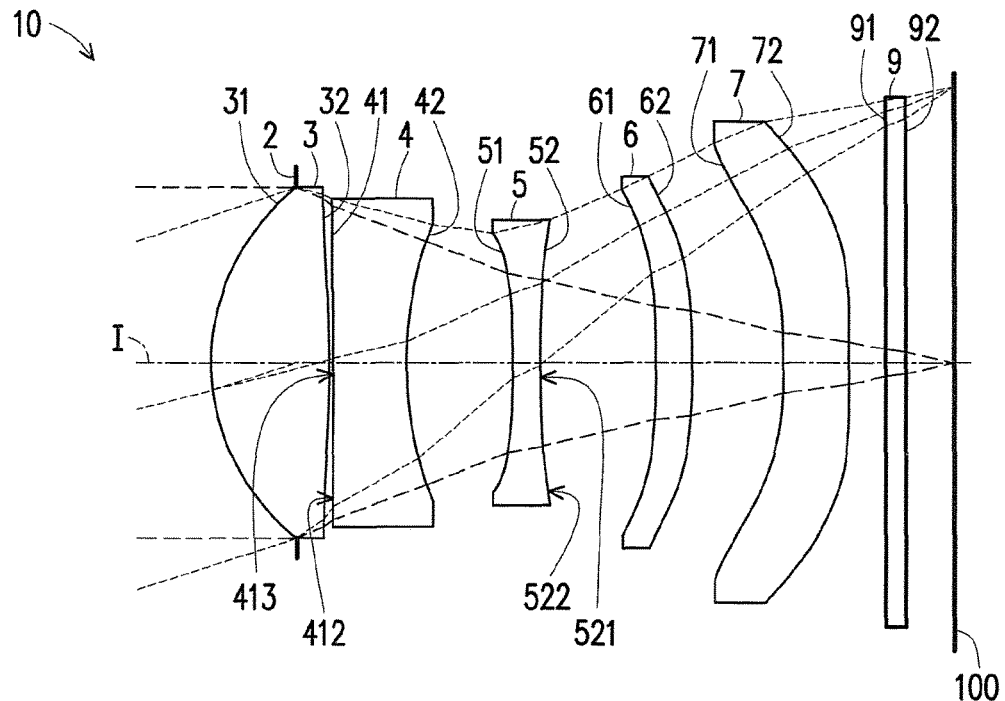
FIG. 70
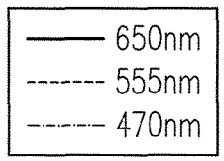
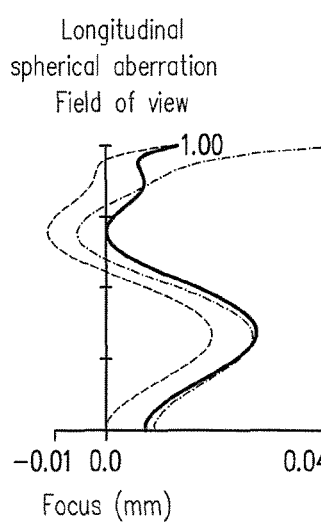
Longitudinal spherical aberration
Field of view
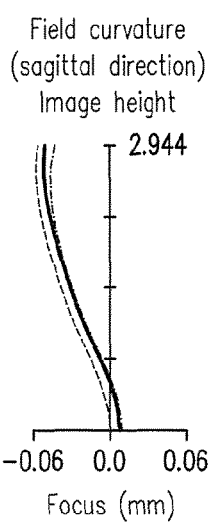
Field curvature (sagittal direction)
Image height
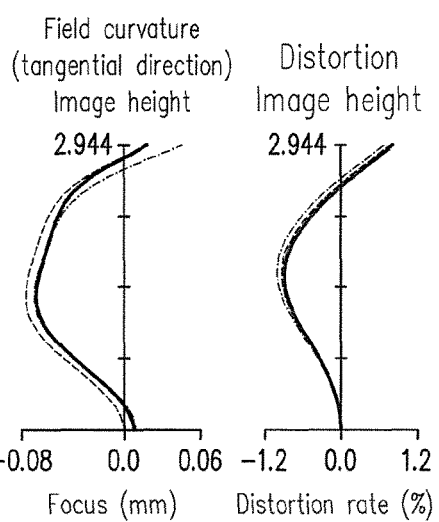
Field curvature (tangential direction)
Image height
Distortion
Image height
FIG. 71A   FIG. 71B   FIG. 71C   FIG. 71D

| Seventeenth embodiment | | | | | | |
|---|---|---|---|---|---|---|
| Effective focal length=9.000 mm , Half field of view (HFOV)=17.994°, Fno=2.393, System length=7.954mm, Image height=2.944mm | | | | | | |
| Lens element | Surface | Radius of curvature(mm) | Thickness(mm) | Refractive index | Dispersion coefficient | Focal length(mm) |
| Object | | Infinity | 1.000E+10 | | | |
| Aperture stop 2 | | Infinity | -0.913 | | | |
| First lens element 3 | Object-side surface 31 | 2.358 | 1.269 | 1.545 | 55.987 | 3.705 |
| | Image-side surface 32 | -11.578 | 0.045 | | | |
| Second lens element 4 | Object-side surface 41 | -194.018 | 0.787 | 1.642 | 22.409 | -6.006 |
| | Image-side surface 42 | 3.974 | 1.143 | | | |
| Third lens element 5 | Object-side surface 51 | -13.459 | 0.294 | 1.545 | 55.987 | -12.450 |
| | Image-side surface 52 | 13.856 | 1.235 | | | |
| Fourth lens element 6 | Object-side surface 61 | -21.921 | 0.388 | 1.661 | 20.401 | 50.557 |
| | Image-side surface 62 | -13.374 | 0.980 | | | |
| Fifth Lens element 7 | Object-side surface 71 | -7.257 | 0.700 | 1.535 | 55.690 | -11.612 |
| | Image-side surface 72 | 45.536 | 0.400 | | | |
| Light filter 9 | Object-side surface 91 | Infinity | 0.210 | 1.517 | 64.167 | |
| | Image-side surface 92 | Infinity | 0.501 | | | |
| | Image plane 100 | Infinity | | | | |

FIG. 72

| Surface | K | $a_4$ | $a_6$ | $a_8$ | $a_{10}$ |
|---|---|---|---|---|---|
| 31 | 0.000000E+00 | -2.183746E-03 | 1.309211E-03 | -4.369452E-04 | 5.932424E-05 |
| 32 | 0.000000E+00 | 1.050127E-02 | -1.597020E-03 | 3.852740E-04 | -5.552518E-05 |
| 41 | 0.000000E+00 | -2.715301E-03 | 1.535507E-03 | -6.779162E-05 | -3.726407E-05 |
| 42 | 0.000000E+00 | -1.384578E-02 | 8.200189E-03 | -1.936632E-03 | 4.285176E-04 |
| 51 | 8.752651E+01 | -1.858703E-02 | -8.895641E-03 | 1.134412E-02 | -4.597456E-03 |
| 52 | 5.541649E+01 | -1.353260E-02 | 1.122471E-02 | -7.150676E-04 | -8.049805E-04 |
| 61 | -1.531067E+02 | -3.340519E-02 | 4.107077E-04 | 9.606944E-04 | -1.011900E-04 |
| 62 | 3.626333E+01 | -3.333917E-02 | 3.512676E-03 | -2.629017E-04 | 1.211162E-04 |
| 71 | -1.441137E+00 | -4.641910E-02 | 6.623018E-03 | 1.962060E-04 | -5.115739E-05 |
| 72 | 1.647664E+02 | -5.306916E-02 | 9.022974E-03 | -1.077904E-03 | 8.421395E-05 |
| Surface | $a_{12}$ | $a_{14}$ | $a_{16}$ | $a_{18}$ | $a_{20}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | 0.000000E+00 | 0.000000E+00 | 0.000000E+00 | 0.000000E+00 | 0.000000E+00 |
| 62 | 0.000000E+00 | 0.000000E+00 | 0.000000E+00 | 0.000000E+00 | 0.000000E+00 |
| 71 | 4.475730E-07 | 0.000000E+00 | 0.000000E+00 | 0.000000E+00 | 0.000000E+00 |
| 72 | -3.201335E-06 | 0.000000E+00 | 0.000000E+00 | 0.000000E+00 | 0.000000E+00 |

FIG. 73

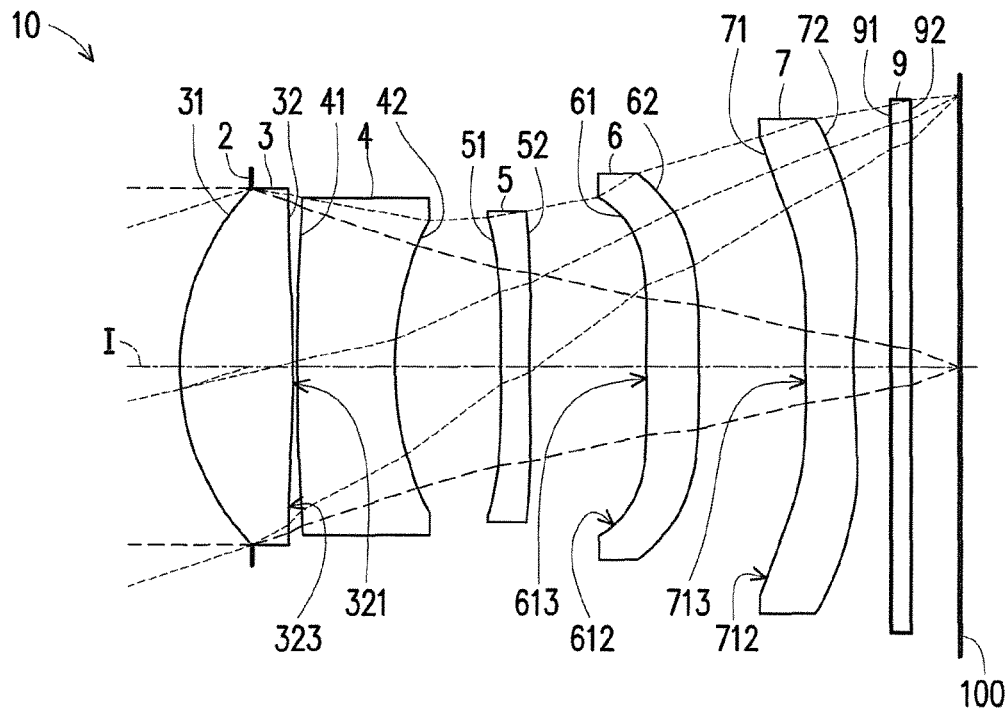
FIG. 74
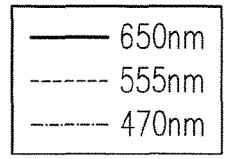
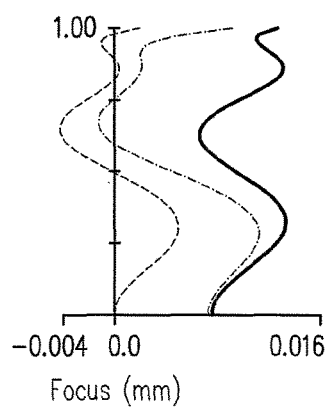
Longitudinal spherical aberration
Field of view
FIG. 75A
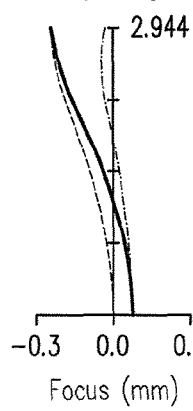
Field curvature (sagittal direction)
Image height
FIG. 75B
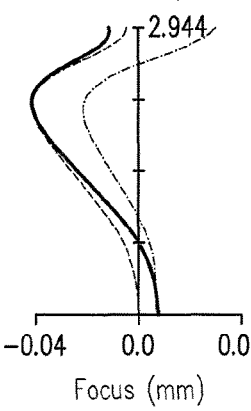
Field curvature (tangential direction)
Image height
FIG. 75C
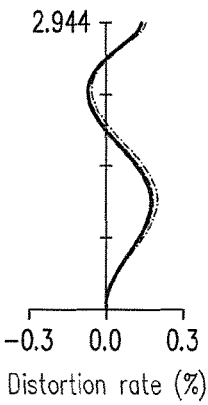
Distortion
Image height
FIG. 75D

| Eighteenth embodiment | | | | | | |
|---|---|---|---|---|---|---|
| Effective focal length=9.000 mm , Half field of view (HFOV)=18.089°, Fno=2.398, System length=8.596mm, Image height=2.944mm | | | | | | |
| Lens element | Surface | Radius of curvature(mm) | Thickness(mm) | Refractive index | Dispersion coefficient | Focal length(mm) |
| Object | | Infinity | 1.000E+10 | | | |
| Aperture stop 2 | | Infinity | -0.742 | | | |
| First lens element 3 | Object-side surface 31 | 2.694 | 1.187 | 1.545 | 55.987 | 4.294 |
| | Image-side surface 32 | -15.324 | 0.049 | | | |
| Second lens element 4 | Object-side surface 41 | 35.403 | 1.030 | 1.642 | 22.409 | -6.373 |
| | Image-side surface 42 | 3.653 | 1.119 | | | |
| Third lens element 5 | Object-side surface 51 | -914.531 | 0.299 | 1.545 | 55.987 | -25.325 |
| | Image-side surface 52 | 14.048 | 1.232 | | | |
| Fourth lens element 6 | Object-side surface 61 | 31.701 | 0.554 | 1.661 | 20.401 | 23.080 |
| | Image-side surface 62 | -29.663 | 1.121 | | | |
| Fifth Lens element 7 | Object-side surface 71 | 47.402 | 0.503 | 1.535 | 55.690 | -12.513 |
| | Image-side surface 72 | 5.860 | 0.400 | | | |
| Light filter 9 | Object-side surface 91 | Infinity | 0.210 | 1.517 | 64.167 | |
| | Image-side surface 92 | Infinity | 0.892 | | | |
| | Image plane 100 | Infinity | | | | |

FIG. 76

| Surface | K | $a_4$ | $a_6$ | $a_8$ | $a_{10}$ |
|---|---|---|---|---|---|
| 31 | 0.000000E+00 | -8.352807E-04 | 3.628819E-04 | -1.760813E-04 | 3.108967E-05 |
| 32 | 0.000000E+00 | 7.343795E-03 | -9.360751E-04 | 3.250297E-04 | -5.136563E-05 |
| 41 | 0.000000E+00 | 3.598524E-04 | 5.837759E-04 | 1.871550E-04 | -7.425110E-05 |
| 42 | 0.000000E+00 | -4.455245E-03 | 3.600991E-03 | 2.019105E-05 | -3.973480E-05 |
| 51 | -1.035769E-01 | -3.401733E-02 | 6.551880E-04 | 5.187708E-03 | -1.470573E-03 |
| 52 | 6.161360E+01 | -3.935275E-02 | 4.781060E-03 | 2.420633E-03 | -7.754898E-04 |
| 61 | 1.466540E+02 | -3.294170E-02 | -3.439507E-03 | -1.079019E-03 | 2.467207E-05 |
| 62 | -3.808682E+02 | -2.714322E-02 | -1.976597E-03 | -1.771593E-04 | 5.298978E-05 |
| 71 | 3.100459E+02 | -4.971765E-02 | 7.073719E-03 | 8.546225E-05 | -6.085988E-05 |
| 72 | 2.711177E+00 | -5.599207E-02 | 8.889524E-03 | -1.034050E-03 | 9.311273E-05 |
| Surface | $a_{12}$ | $a_{14}$ | $a_{16}$ | $a_{18}$ | $a_{20}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | 0.000000E+00 | 0.000000E+00 | 0.000000E+00 | 0.000000E+00 | 0.000000E+00 |
| 62 | 0.000000E+00 | 0.000000E+00 | 0.000000E+00 | 0.000000E+00 | 0.000000E+00 |
| 71 | 9.502287E-07 | 0.000000E+00 | 0.000000E+00 | 0.000000E+00 | 0.000000E+00 |
| 72 | -5.182045E-06 | 0.000000E+00 | 0.000000E+00 | 0.000000E+00 | 0.000000E+00 |

FIG. 77

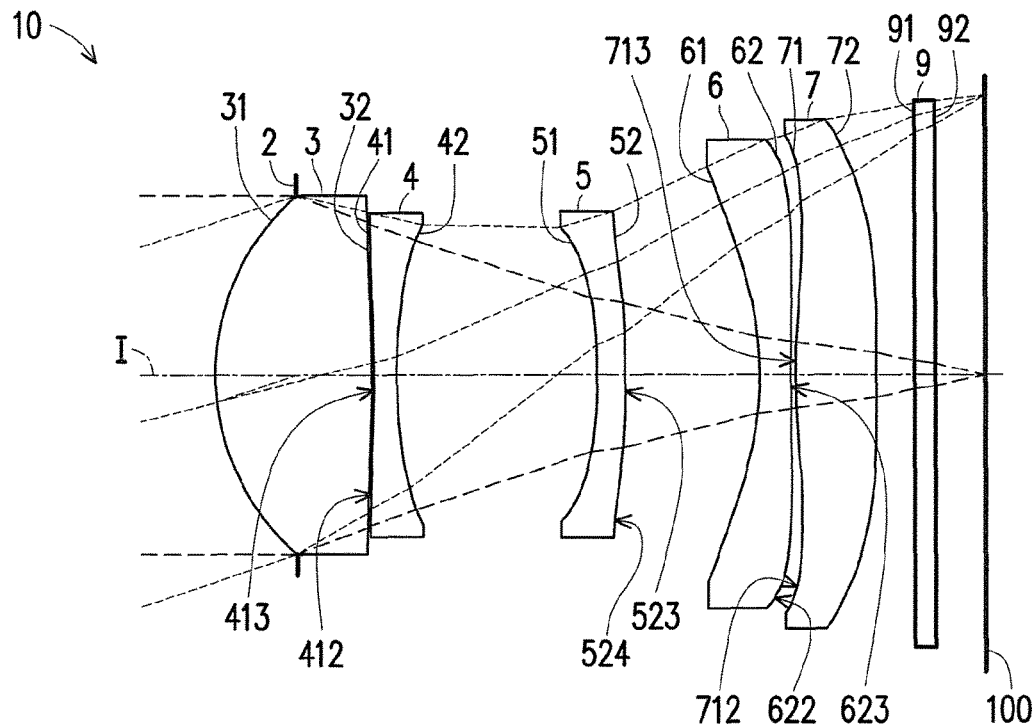
FIG. 78
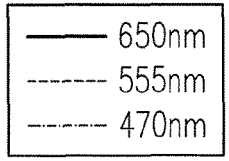
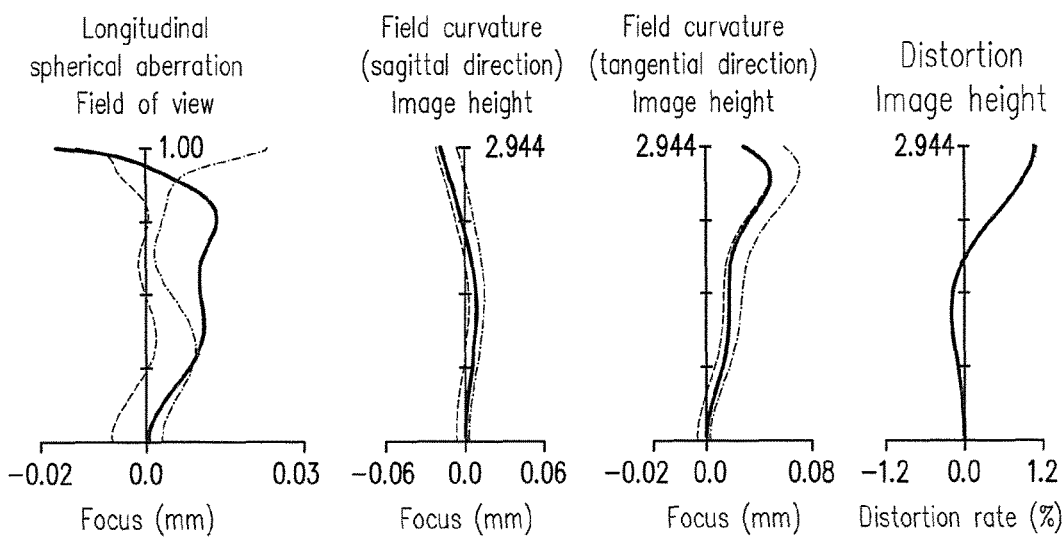
FIG. 79A  FIG. 79B  FIG. 79C  FIG. 79D

| Nineteenth embodiment |||||||
|---|---|---|---|---|---|---|
| Effective focal length=8.949 mm , Half field of view (HFOV)=18.004°, Fno=2.400, System length=8.145mm, Image height=2.944mm |||||||
| Lens element | Surface | Radius of curvature(mm) | Thickness(mm) | Refractive index | Dispersion coefficient | Focal length(mm) |
| Object | | Infinity | 1.000E+10 | | | |
| Aperture stop 2 | | Infinity | -0.836 | | | |
| First lens element 3 | Object-side surface 31 | 2.467 | 1.648 | 1.545 | 55.987 | 3.843 |
| | Image-side surface 32 | -10.773 | 0.019 | | | |
| Second lens element 4 | Object-side surface 41 | -13.140 | 0.239 | 1.642 | 22.409 | -6.441 |
| | Image-side surface 42 | 6.151 | 2.107 | | | |
| Third lens element 5 | Object-side surface 51 | -8.293 | 0.298 | 1.535 | 55.690 | -31.091 |
| | Image-side surface 52 | -16.695 | 1.404 | | | |
| Fourth lens element 6 | Object-side surface 61 | -3.577 | 0.330 | 1.545 | 55.987 | -5.644 |
| | Image-side surface 62 | 23.068 | 0.050 | | | |
| Fifth Lens element 7 | Object-side surface 71 | 6.629 | 0.843 | 1.642 | 22.409 | 11.640 |
| | Image-side surface 72 | 52.391 | 0.400 | | | |
| Light filter 9 | Object-side surface 91 | Infinity | 0.210 | 1.517 | 64.167 | |
| | Image-side surface 92 | Infinity | 0.599 | | | |
| | Image plane 100 | Infinity | | | | |

FIG. 80

| Surface | K | $a_4$ | $a_6$ | $a_8$ | $a_{10}$ |
|---|---|---|---|---|---|
| 31 | 0.000000E+00 | -5.213300E-04 | 6.533788E-05 | -1.109141E-04 | 5.485414E-05 |
| 32 | 0.000000E+00 | 1.503868E-02 | -1.499683E-03 | 2.249599E-04 | -1.045806E-04 |
| 41 | 0.000000E+00 | 1.060004E-02 | 1.390984E-03 | -1.097143E-03 | 1.527525E-04 |
| 42 | 0.000000E+00 | 3.939251E-03 | 2.206857E-03 | 8.695274E-05 | -2.545912E-05 |
| 51 | 0.000000E+00 | -5.164781E-02 | 1.328368E-02 | -4.500538E-03 | 1.182308E-03 |
| 52 | 0.000000E+00 | -3.329181E-02 | 1.279751E-02 | 9.634822E-04 | -1.188882E-03 |
| 61 | 7.535941E-01 | 4.673797E-03 | 2.410416E-03 | -5.933013E-05 | -2.989770E-05 |
| 62 | 0.000000E+00 | -1.102753E-02 | 9.406438E-04 | 5.703772E-05 | -3.796593E-05 |
| 71 | 4.349991E+00 | -3.000195E-02 | 4.319880E-03 | -4.189960E-04 | 5.699042E-06 |
| 72 | 0.000000E+00 | -2.487388E-02 | 3.563971E-03 | -3.091707E-04 | 5.322965E-06 |
| Surface | $a_{12}$ | $a_{14}$ | $a_{16}$ | $a_{18}$ | $a_{20}$ |
| 31 | -6.577309E-06 | 0.000000E+00 | 0.000000E+00 | 0.000000E+00 | 0.000000E+00 |
| 32 | -3.874962E-06 | 0.000000E+00 | 0.000000E+00 | 0.000000E+00 | 0.000000E+00 |
| 41 | 1.420079E-05 | -7.151518E-06 | 0.000000E+00 | 0.000000E+00 | 0.000000E+00 |
| 42 | -3.354693E-05 | 3.320151E-05 | 0.000000E+00 | 0.000000E+00 | 0.000000E+00 |
| 51 | -3.854720E-04 | 0.000000E+00 | 0.000000E+00 | 0.000000E+00 | 0.000000E+00 |
| 52 | 1.781904E-04 | 0.000000E+00 | 0.000000E+00 | 0.000000E+00 | 0.000000E+00 |
| 61 | 1.076548E-06 | 2.035325E-07 | 0.000000E+00 | 0.000000E+00 | 0.000000E+00 |
| 62 | 9.474409E-07 | -9.737818E-08 | 0.000000E+00 | 0.000000E+00 | 0.000000E+00 |
| 71 | 2.505851E-08 | -7.311012E-08 | -6.245270E-09 | 0.000000E+00 | 0.000000E+00 |
| 72 | 9.752983E-07 | -1.132321E-08 | -6.880711E-09 | 0.000000E+00 | 0.000000E+00 |

FIG. 81

| Twentieth embodiment |||||||
|---|---|---|---|---|---|---|
| Effective focal length=6.370 mm , Half field of view (HFOV)=24.803°, Fno=2.885, System length=7.071mm, Image height=2.944mm |||||||
| Lens element | Surface | Radius of curvature(mm) | Thickness(mm) | Refractive index | Dispersion coefficient | Focal length(mm) |
| Object | | Infinity | 1.000E+10 | | | |
| First lens element 3 | Object-side surface 31 | 2.621 | 1.101 | 1.545 | 55.987 | 3.599 |
| | Image-side surface 32 | -6.697 | 0.050 | | | |
| Aperture stop 2 | | Infinity | 0.152 | | | |
| Second lens element 4 | Object-side surface 41 | -15.184 | 0.816 | 1.642 | 22.409 | -5.516 |
| | Image-side surface 42 | 4.768 | 1.027 | | | |
| Third lens element 5 | Object-side surface 51 | 6.303 | 0.695 | 1.545 | 55.987 | -38.656 |
| | Image-side surface 52 | 4.665 | 0.305 | | | |
| Fourth lens element 6 | Object-side surface 61 | 6.518 | 0.644 | 1.642 | 22.409 | 15.233 |
| | Image-side surface 62 | 18.480 | 0.126 | | | |
| Fifth Lens element 7 | Object-side surface 71 | 18.100 | 0.947 | 1.545 | 55.987 | -8.850 |
| | Image-side surface 72 | 3.745 | 0.400 | | | |
| Light filter 9 | Object-side surface 91 | Infinity | 0.210 | 1.517 | 64.167 | |
| | Image-side surface 92 | Infinity | 0.597 | | | |
| | Image plane 100 | Infinity | | | | |

FIG. 84

| Surface | K | $a_4$ | $a_6$ | $a_8$ | $a_{10}$ |
|---|---|---|---|---|---|
| 31 | 0.000000E+00 | -7.196935E-03 | -2.301404E-03 | -1.052609E-03 | 0.000000E+00 |
| 32 | 0.000000E+00 | -2.675311E-03 | 3.200501E-04 | -3.068838E-04 | 0.000000E+00 |
| 41 | 0.000000E+00 | 6.160241E-03 | 6.043061E-03 | 1.179023E-03 | 0.000000E+00 |
| 42 | 0.000000E+00 | 4.363029E-03 | 4.248460E-03 | 2.722346E-03 | 0.000000E+00 |
| 51 | 0.000000E+00 | -3.283844E-02 | 8.086781E-03 | -3.210555E-03 | 0.000000E+00 |
| 52 | 0.000000E+00 | -6.597070E-02 | 1.561044E-02 | -2.626359E-03 | 0.000000E+00 |
| 61 | 0.000000E+00 | -4.578234E-02 | -6.280338E-03 | 9.237850E-04 | 0.000000E+00 |
| 62 | 0.000000E+00 | -2.196662E-02 | -7.611697E-03 | 1.085655E-03 | 0.000000E+00 |
| 71 | 0.000000E+00 | -6.786448E-02 | 8.878010E-03 | 1.813591E-04 | -1.319995E-04 |
| 72 | 0.000000E+00 | -6.060992E-02 | 9.059496E-03 | -8.113142E-04 | 2.187790E-05 |
| Surface | $a_{12}$ | $a_{14}$ | $a_{16}$ | $a_{18}$ | $a_{20}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | 0.000000E+00 | 0.000000E+00 | 0.000000E+00 | 0.000000E+00 | 0.000000E+00 |
| 62 | 0.000000E+00 | 0.000000E+00 | 0.000000E+00 | 0.000000E+00 | 0.000000E+00 |
| 71 | 0.000000E+00 | 0.000000E+00 | 0.000000E+00 | 0.000000E+00 | 0.000000E+00 |
| 72 | 0.000000E+00 | 0.000000E+00 | 0.000000E+00 | 0.000000E+00 | 0.000000E+00 |

FIG. 85

| Conditional expression | First embodiment | Second embodiment | Third embodiment | Fourth embodiment | Fifth embodiment |
|---|---|---|---|---|---|
| EFL | 7.070 | 7.070 | 7.070 | 7.070 | 7.070 |
| Fno | 2.390 | 2.390 | 2.386 | 2.394 | 2.395 |
| HFOV | 18.594 | 18.649 | 18.545 | 18.499 | 18.555 |
| T1 | 0.934 | 0.969 | 0.994 | 0.979 | 0.885 |
| G12 | 0.049 | 0.049 | 0.444 | 0.093 | 0.122 |
| T2 | 0.399 | 0.228 | 0.812 | 0.228 | 0.355 |
| G23 | 0.874 | 0.874 | 1.425 | 2.422 | 0.802 |
| T3 | 0.280 | 0.256 | 0.680 | 0.259 | 0.316 |
| G34 | 2.197 | 2.141 | 0.078 | 0.535 | 2.240 |
| T4 | 0.649 | 0.863 | 0.326 | 0.807 | 0.660 |
| G4f | 0.400 | 0.400 | 0.400 | 0.400 | 0.400 |
| TF | 0.210 | 0.210 | 0.210 | 0.210 | 0.210 |
| GFP | 0.390 | 0.390 | 1.014 | 0.447 | 0.391 |
| TTL | 6.380 | 6.380 | 6.381 | 6.380 | 6.381 |
| EFL/(G23+G34) | 2.303 | 2.345 | 4.705 | 2.391 | 2.324 |
| TTL/G23 | 7.304 | 7.300 | 4.479 | 2.634 | 7.960 |
| EFL/G23 | 8.093 | 8.089 | 4.963 | 2.919 | 8.820 |
| EFL/(G12+G23) | 7.661 | 7.660 | 3.784 | 2.811 | 7.654 |
| EFL/(G12+G23+G34) | 2.266 | 2.307 | 3.632 | 2.318 | 2.234 |
| TTL/(G12+G23) | 6.914 | 6.913 | 3.416 | 2.537 | 6.908 |
| TTL/(G23+G34) | 2.078 | 2.116 | 4.247 | 2.158 | 2.098 |
| TTL/(G12+G23+G34) | 2.045 | 2.082 | 3.279 | 2.092 | 2.017 |
| Fno/G23 | 2.736 | 2.735 | 1.675 | 0.989 | 2.989 |
| Fno/(G12+G23) | 2.590 | 2.590 | 1.277 | 0.952 | 2.593 |
| Fno/(G23+G34) | 0.778 | 0.793 | 1.588 | 0.810 | 0.788 |
| G2/(T2+T3) | 1.288 | 1.804 | 0.955 | 4.977 | 1.194 |
| (G12+G23)/(T1+T2) | 0.693 | 0.771 | 1.035 | 2.083 | 0.745 |
| (G12+G23)/(T2+T3) | 1.360 | 1.905 | 1.252 | 5.168 | 1.377 |
| G23/(T1+T2) | 0.656 | 0.730 | 0.789 | 2.006 | 0.646 |
| (G12+G23)/(T1+G12+T2) | 0.668 | 0.741 | 0.831 | 1.934 | 0.678 |
| (G12+G23+G34)/(T1+T2) | 2.341 | 2.559 | 1.078 | 2.526 | 2.552 |
| (G12+G23+G34)/(T2+T3) | 4.598 | 6.325 | 1.305 | 6.267 | 4.715 |
| G23/T1 | 0.936 | 0.902 | 1.434 | 2.473 | 0.906 |
| (G23+G34)/(T2+T3) | 4.526 | 6.224 | 1.007 | 6.076 | 4.533 |

FIG. 86

| Conditional expression | Sixth embodiment | Seventh embodiment | Eighth embodiment | Ninth embodiment | Tenth embodiment |
|---|---|---|---|---|---|
| EFL | 7.070 | 5.149 | 7.070 | 7.070 | 7.070 |
| Fno | 2.376 | 2.403 | 2.663 | 2.391 | 2.389 |
| HFOV | 18.728 | 24.839 | 18.661 | 18.681 | 18.639 |
| T1 | 0.910 | 0.593 | 0.969 | 0.971 | 0.945 |
| G12 | 0.050 | 0.198 | 0.228 | 0.239 | 0.074 |
| T2 | 0.322 | 0.366 | 0.225 | 0.229 | 0.230 |
| G23 | 2.529 | 0.631 | 2.313 | 2.518 | 2.605 |
| T3 | 0.277 | 0.285 | 0.243 | 0.275 | 0.774 |
| G34 | 0.568 | 1.390 | 0.450 | 0.197 | 0.219 |
| T4 | 0.725 | 1.116 | 0.875 | 0.886 | 0.329 |
| G4f | 0.400 | 0.400 | 0.400 | 0.400 | 0.400 |
| TF | 0.210 | 0.210 | 0.210 | 0.210 | 0.210 |
| GFP | 0.390 | 0.509 | 0.417 | 0.455 | 0.595 |
| TTL | 6.381 | 5.698 | 6.330 | 6.380 | 6.381 |
| EFL/(G23+G34) | 2.283 | 2.548 | 2.558 | 2.604 | 2.503 |
| TTL/G23 | 2.523 | 9.037 | 2.736 | 2.533 | 2.450 |
| EFL/G23 | 2.796 | 8.166 | 3.056 | 2.807 | 2.714 |
| EFL/(G12+G23) | 2.741 | 6.217 | 2.782 | 2.564 | 2.639 |
| EFL/(G12+G23+G34) | 2.247 | 2.321 | 2.363 | 2.393 | 2.440 |
| TTL/(G12+G23) | 2.474 | 6.881 | 2.491 | 2.314 | 2.382 |
| TTL/(G23+G34) | 2.061 | 2.820 | 2.291 | 2.350 | 2.259 |
| TTL/(G12+G23+G34) | 2.028 | 2.569 | 2.116 | 2.160 | 2.202 |
| Fno/G23 | 0.940 | 3.812 | 1.151 | 0.949 | 0.917 |
| Fno/(G12+G23) | 0.921 | 2.902 | 1.048 | 0.867 | 0.892 |
| Fno/(G23+G34) | 0.767 | 1.189 | 0.963 | 0.880 | 0.846 |
| G2/(T2+T3) | 4.220 | 0.968 | 4.940 | 4.993 | 2.595 |
| (G12+G23)/(T1+T2) | 2.094 | 0.863 | 2.128 | 2.297 | 2.280 |
| (G12+G23)/(T2+T3) | 4.304 | 1.271 | 5.426 | 5.466 | 2.669 |
| G23/(T1+T2) | 2.053 | 0.657 | 1.937 | 2.098 | 2.217 |
| (G12+G23)/(T1+G12+T2) | 2.011 | 0.716 | 1.787 | 1.916 | 2.145 |
| (G12+G23+G34)/(T1+T2) | 2.554 | 2.311 | 2.505 | 2.461 | 2.467 |
| (G12+G23+G34)/(T2+T3) | 5.251 | 3.405 | 6.388 | 5.857 | 2.887 |
| G23/T1 | 2.780 | 1.063 | 2.387 | 2.594 | 2.755 |
| (G23+G34)/(T2+T3) | 5.167 | 3.101 | 5.901 | 5.383 | 2.813 |

FIG. 87

| Conditional expression | Eleventh embodiment | Twelfth embodiment | Thirteenth embodiment | Fourteenth embodiment | Fifteenth embodiment |
|---|---|---|---|---|---|
| EFL | 9.000 | 9.000 | 8.137 | 8.160 | 9.360 |
| Fno | 2.401 | 2.394 | 2.860 | 2.801 | 2.499 |
| HFOV | 17.948 | 18.027 | 19.854 | 19.836 | 17.438 |
| T1 | 1.299 | 1.364 | 0.748 | 0.819 | 0.949 |
| G12 | 0.050 | 0.457 | 0.289 | 0.192 | 0.428 |
| T2 | 0.287 | 0.289 | 0.810 | 0.927 | 0.296 |
| G23 | 2.659 | 2.536 | 0.786 | 0.882 | 0.900 |
| T3 | 0.298 | 0.292 | 0.297 | 1.460 | 2.606 |
| G34 | 1.091 | 0.634 | 1.430 | 0.825 | 1.358 |
| T4 | 0.580 | 0.873 | 0.447 | 0.485 | 2.191 |
| G45 | 0.059 | 0.060 | 1.786 | 1.054 | 0.444 |
| T5 | 0.511 | 0.336 | 0.336 | 0.340 | 0.455 |
| G5f | 0.400 | 0.400 | 0.400 | 0.400 | 0.400 |
| TF | 0.210 | 0.210 | 0.210 | 0.210 | 0.210 |
| GFP | 0.510 | 0.503 | 0.556 | 0.504 | 0.516 |
| TTL | 7.953 | 7.953 | 8.095 | 8.098 | 10.753 |
| EFL/(G23+G34) | 2.400 | 2.839 | 3.671 | 4.780 | 4.144 |
| TTL/G23 | 2.991 | 3.136 | 10.297 | 9.183 | 11.948 |
| EFL/G23 | 3.385 | 3.548 | 10.351 | 9.253 | 10.400 |
| EFL/(G12+G23) | 3.323 | 3.007 | 7.571 | 7.600 | 7.049 |
| EFL/(G12+G23+G34) | 2.368 | 2.482 | 3.248 | 4.297 | 3.484 |
| TTL/(G12+G23) | 2.936 | 2.657 | 7.532 | 7.543 | 8.098 |
| TTL/(G23+G34) | 2.121 | 2.509 | 3.652 | 4.744 | 4.761 |
| TTL/(G12+G23+G34) | 2.093 | 2.193 | 3.231 | 4.265 | 4.003 |
| Fno/G23 | 0.903 | 0.944 | 3.639 | 3.176 | 2.777 |
| Fno/(G12+G23) | 0.887 | 0.800 | 2.662 | 2.609 | 1.882 |
| Fno/(G23+G34) | 0.640 | 0.755 | 1.290 | 1.641 | 1.107 |
| G23/(T2+T3) | 4.550 | 4.369 | 0.710 | 0.369 | 0.310 |
| (G12+G23)/(T1+T2) | 1.708 | 1.811 | 0.690 | 0.615 | 1.067 |
| (G12+G23)/(T2+T3) | 4.635 | 5.155 | 0.971 | 0.450 | 0.458 |
| G23/(T1+T2) | 1.677 | 1.535 | 0.505 | 0.505 | 0.723 |
| (G12+G23)/(T1+G12+T2) | 1.656 | 1.419 | 0.582 | 0.554 | 0.794 |
| (G12+G23+G34)/(T1+T2) | 2.396 | 2.195 | 1.608 | 1.087 | 2.159 |
| (G12+G23+G34)/(T2+T3) | 6.503 | 6.247 | 2.263 | 0.795 | 0.926 |
| G23/T1 | 2.047 | 1.860 | 1.051 | 1.076 | 0.949 |
| (G23+G34)/(T2+T3) | 6.417 | 5.460 | 2.002 | 0.715 | 0.778 |

FIG. 88

| Conditional expression | Sixteenth embodiment | Seventeenth embodiment | Eighteenth embodiment | Nineteenth embodiment | Twentieth embodiment |
|---|---|---|---|---|---|
| EFL | 9.000 | 9.000 | 9.000 | 8.949 | 6.370 |
| Fno | 2.389 | 2.393 | 2.398 | 2.400 | 2.885 |
| HFOV | 17.918 | 17.994 | 18.089 | 18.004 | 24.803 |
| T1 | 1.469 | 1.269 | 1.187 | 1.648 | 1.101 |
| G12 | 0.066 | 0.045 | 0.049 | 0.019 | 0.202 |
| T2 | 0.567 | 0.787 | 1.030 | 0.239 | 0.816 |
| G23 | 1.463 | 1.143 | 1.119 | 2.107 | 1.027 |
| T3 | 0.294 | 0.294 | 0.299 | 0.298 | 0.695 |
| G34 | 0.425 | 1.235 | 1.232 | 1.404 | 0.305 |
| T4 | 0.404 | 0.388 | 0.554 | 0.330 | 0.644 |
| G45 | 1.379 | 0.980 | 1.121 | 0.050 | 0.126 |
| T5 | 0.744 | 0.700 | 0.503 | 0.843 | 0.947 |
| G5f | 0.400 | 0.400 | 0.400 | 0.400 | 0.400 |
| TF | 0.210 | 0.210 | 0.210 | 0.210 | 0.210 |
| GFP | 0.533 | 0.501 | 0.892 | 0.599 | 0.597 |
| TTL | 7.954 | 7.954 | 8.596 | 8.145 | 7.071 |
| EFL/(G23+G34) | 4.766 | 3.784 | 3.828 | 2.549 | 4.781 |
| TTL/G23 | 5.437 | 6.958 | 7.678 | 3.866 | 6.882 |
| EFL/G23 | 6.153 | 7.873 | 8.039 | 4.247 | 6.200 |
| EFL/(G12+G23) | 5.889 | 7.576 | 7.700 | 4.210 | 5.182 |
| EFL/(G12+G23+G34) | 4.606 | 3.714 | 3.749 | 2.535 | 4.152 |
| TTL/(G12+G23) | 5.204 | 6.695 | 7.354 | 3.832 | 5.752 |
| TTL/(G23+G34) | 4.212 | 3.344 | 3.656 | 2.320 | 5.307 |
| TTL/(G12+G23+G34) | 4.071 | 3.282 | 3.581 | 2.307 | 4.609 |
| Fno/G23 | 1.633 | 2.094 | 2.142 | 1.139 | 2.808 |
| Fno/(G12+G23) | 1.563 | 2.015 | 2.051 | 1.129 | 2.347 |
| Fno/(G23+G34) | 1.265 | 1.006 | 1.020 | 0.684 | 2.166 |
| G23/(T2+T3) | 1.698 | 1.057 | 0.842 | 3.929 | 0.680 |
| (G12+G23)/(T1+T2) | 0.751 | 0.578 | 0.527 | 1.127 | 0.641 |
| (G12+G23)/(T2+T3) | 1.774 | 1.099 | 0.879 | 3.964 | 0.813 |
| G23/(T1+T2) | 0.718 | 0.556 | 0.505 | 1.117 | 0.536 |
| (G12+G23)/(T1+G12+T2) | 0.727 | 0.565 | 0.516 | 1.116 | 0.580 |
| (G12+G23+G34)/(T1+T2) | 0.959 | 1.179 | 1.083 | 1.872 | 0.800 |
| (G12+G23+G34)/(T2+T3) | 2.268 | 2.241 | 1.806 | 6.582 | 1.015 |
| G23/T1 | 0.996 | 0.900 | 0.943 | 1.279 | 0.933 |
| (G23+G34)/(T2+T3) | 2.191 | 2.200 | 1.769 | 6.547 | 0.881 |

FIG.89

OPTICAL LENS ASSEMBLY

CROSS-REFERENCE TO RELATED APPLICATION

This application claims the priority benefit of Chinese application serial no. 201610156925.4, filed on Mar. 18, 2016. The entirety of the above-mentioned patent application is hereby incorporated by reference herein and made a part of this specification.

BACKGROUND OF THE INVENTION

Field of the Invention

The invention relates to an optical lens, and particularly relates to an optical lens assembly.

Description of Related Art

In recent years, as use of portable electronic devices (e.g., mobile phones and digital cameras) becomes ubiquitous, techniques related to producing image modules have also been developed significantly, wherein the image module mainly includes an optical lens assembly, a module holder unit and a sensor, and the demand for minimized image module increases due to the compact and slim design of mobile phones and digital cameras. Moreover, as dimensions of a charged coupled device (CCD) and complementary metal-oxide semiconductor (CMOS) are reduced and significant progress is made in related technology, the length of optical lens assembly in the image module is correspondingly reduced. However, in order to avoid reduction in optical performance and quality, good optical properties should also be achieved while the length of optical lens assembly is shortened. Image quality and image volume are two of the most important characteristics for an optical lens assembly.

The specification of portable electronic products (such as cell phone, cameras, tablet PC, personal digital assistant, photographic device used in car, etc.) is ever-changing, and the key components, i.e. optical lens assembly, is also developed diversely, which is not only applied to image-taking and recording, but is also applied to telephotography, moreover, along with the advance of image sensing technology, consumers' demand for image quality also increases. The size of the conventional micro telephoto lens is over 50 millimeters and the f-number is up to 4 or more, so as to be obviously unable to meet the specification of the existing portable electronic products. Accordingly, not only does the design of the optical lens assembly used in telephotography need to meet the requirement for good image quality and small lens space but also improvement of aperture stop size should also be taken into consideration.

However, it is not possible to accomplish the design of optical lens assembly having good image quality and micro-size by simply scaling down a lens having good image quality, and the design process involves consideration about material characteristics and further involves consideration about producing, practical issues on the production line such as assembly yield, design applied to the camera module, so the technical difficulties in producing of the micro-sized lens is much higher than those of the conventional lens.

Therefore, how to produce an optical lens assembly that meets requirements of consumer electronic products and has an improved image quality is always a goal in the industry and academy.

SUMMARY OF THE INVENTION

The invention provides an optical lens assembly having a bigger aperture availability and having good optical properties while the length of lens system is shortened.

An embodiment of the invention provides an optical lens assembly including a first lens element, a second lens element, a third lens element, and a fourth lens element arranged in sequence from an object side to an image side along an optical axis, and each of the first lens element to the fourth lens element includes an object-side surface that faces the object side and allows imaging rays to pass through and an image-side surface that faces the image side and allows the imaging rays to pass through. The first lens element has positive refracting power, and the object-side surface of the first lens element has a convex portion in a vicinity of the optical axis and a convex portion in a vicinity of the periphery. The second lens element has negative refracting power. The object-side surface of the third lens element has a concave portion in a vicinity of the periphery. The image-side surface of the fourth lens element has a convex portion in a vicinity of the periphery. The optical lens assembly further includes an aperture stop, the aperture stop is located at the object-side surface of the first lens element or located between the first lens element and the second lens element. The optical lens assembly satisfies: HFOV≤25° and EFL/(G23+G34)≤4.8, wherein HFOV is a half field of view of the optical lens assembly, EFL is an effective focal length of the optical lens assembly, G23 is an air gap from the second lens element to the third lens element along the optical axis, and G34 is an air gap from the third lens element to the fourth lens element along the optical axis.

Based on the above, in the embodiments of the invention, the optical lens assembly can bring the following advantageous effect: with the concave and convex shape design and arrangement of the object-side surface or image-side surface of the lens elements, under the circumstances where the length of the lens system is shortened, the optical lens assembly has a bigger aperture availability, has good optical properties, and provide good image quality. Otherwise, the difficulty in design and producing the optical lens assembly is reduced.

In order to make the aforementioned and other features and advantages of the invention more comprehensible, embodiments accompanying figures are described in detail belows.

BRIEF DESCRIPTION OF THE DRAWINGS

FIG. 1 is a schematic view illustrating a surface structure of a lens element.

FIG. 2 is a schematic view illustrating a concave and convex surface structure of a lens element and a ray focal point.

FIG. 3 is a schematic view illustrating a surface structure of a lens element according to a first example.

FIG. 4 is a schematic view illustrating a surface structure of a lens element according to a second example.

FIG. 5 is a schematic view illustrating a surface structure of a lens element according to a third example.

FIG. 8 shows detailed optical data pertaining to the optical lens assembly according to the first embodiment of the invention.

FIG. 9 shows aspheric parameters pertaining to the optical lens assembly according to the first embodiment of the invention.

FIG. 10 is a schematic view illustrating an optical lens assembly according to a second embodiment of the invention.

FIGS. 11A to 11D are diagrams illustrating longitudinal spherical aberration and other aberrations of the optical lens assembly according to the second embodiment of the invention.

FIG. 12 shows detailed optical data pertaining to the optical lens assembly according to the second embodiment of the invention.

FIG. 13 shows aspheric parameters pertaining to the optical lens assembly according to the second embodiment of the invention.

FIG. 14 is a schematic view illustrating an optical lens assembly according to a third embodiment of the invention.

FIGS. 15A to 15D are diagrams illustrating longitudinal spherical aberration and other aberrations of the optical lens assembly according to the third embodiment of the invention.

FIG. 16 shows detailed optical data pertaining to the optical lens assembly according to the third embodiment of the invention.

FIG. 17 shows aspheric parameters pertaining to the optical lens assembly according to the third embodiment of the invention.

FIG. 18 is a schematic view illustrating an optical lens assembly according to a fourth embodiment of the invention.

FIGS. 19A to 19D are diagrams illustrating longitudinal spherical aberration and other aberrations of the optical lens assembly according to the fourth embodiment of the invention.

FIG. 20 shows detailed optical data pertaining to the optical lens assembly according to the fourth embodiment of the invention.

FIG. 21 shows aspheric parameters pertaining to the optical lens assembly according to the fourth embodiment of the invention.

FIG. 22 is a schematic view illustrating an optical lens assembly according to a fifth embodiment of the invention.

FIGS. 23A to 23D are diagrams illustrating longitudinal spherical aberration and other aberrations of the optical lens assembly according to the fifth embodiment of the invention.

FIG. 24 shows detailed optical data pertaining to the optical lens assembly according to the fifth embodiment of the invention.

FIG. 25 shows aspheric parameters pertaining to the optical lens assembly according to the fifth embodiment of the invention.

FIG. 26 is a schematic view illustrating an optical lens assembly according to a sixth embodiment of the invention.

FIGS. 27A to 27D are diagrams illustrating longitudinal spherical aberration and other aberrations of the optical lens assembly according to the sixth embodiment of the invention.

FIG. 28 shows detailed optical data pertaining to the optical lens assembly according to the sixth embodiment of the invention.

FIG. 29 shows aspheric parameters pertaining to the optical lens assembly according to the sixth embodiment of the invention.

FIG. 32 shows detailed optical data pertaining to the optical lens assembly according to the seventh embodiment of the invention.

FIG. 33 shows aspheric parameters pertaining to the optical lens assembly according to the seventh embodiment of the invention.

FIG. 34 is a schematic view illustrating an optical lens assembly according to an eighth embodiment of the invention.

FIGS. 35A to 35D are diagrams illustrating longitudinal spherical aberration and other aberrations of the optical lens assembly according to the eighth embodiment of the invention.

FIG. 36 shows detailed optical data pertaining to the optical lens assembly according to the eighth embodiment of the invention.

FIG. 37 shows aspheric parameters pertaining to the optical lens assembly according to the eighth embodiment of the invention.

FIG. 38 is a schematic view illustrating an optical lens assembly according to a ninth embodiment of the invention.

FIGS. 39A to 39D are diagrams illustrating longitudinal spherical aberration and other aberrations of the optical lens assembly according to the ninth embodiment of the invention.

FIG. 40 shows detailed optical data pertaining to the optical lens assembly according to the ninth embodiment of the invention.

FIG. 41 shows aspheric parameters pertaining to the optical lens assembly according to the ninth embodiment of the invention.

FIG. 42 is a schematic view illustrating an optical lens assembly according to a tenth embodiment of the invention.

FIGS. 43A to 43D are diagrams illustrating longitudinal spherical aberration and other aberrations of the optical lens assembly according to the tenth embodiment of the invention.

FIG. 44 shows detailed optical data pertaining to the optical lens assembly according to the tenth embodiment of the invention.

FIG. 45 shows aspheric parameters pertaining to the optical lens assembly according to the tenth embodiment of the invention.

FIG. 48 shows detailed optical data pertaining to the optical lens assembly according to the eleventh embodiment of the invention.

FIG. 49 shows aspheric parameters pertaining to the optical lens assembly according to the eleventh embodiment of the invention.

FIG. 52 shows detailed optical data pertaining to the optical lens assembly according to the twelfth embodiment of the invention.

FIG. 53 shows aspheric parameters pertaining to the optical lens assembly according to the twelfth embodiment of the invention.

FIG. 54 is a schematic view illustrating an optical lens assembly according to a thirteenth embodiment of the invention.

FIGS. 55A to 55D are diagrams illustrating longitudinal spherical aberration and other aberrations of the optical lens assembly according to the thirteenth embodiment of the invention.

FIG. 56 shows detailed optical data pertaining to the optical lens assembly according to the thirteenth embodiment of the invention.

FIG. 57 shows aspheric parameters pertaining to the optical lens assembly according to the thirteenth embodiment of the invention.

FIG. 60 shows detailed optical data pertaining to the optical lens assembly according to the fourteenth embodiment of the invention.

FIG. 61 shows aspheric parameters pertaining to the optical lens assembly according to the fourteenth embodiment of the invention.

FIG. 62 is a schematic view illustrating an optical lens assembly according to a fifteenth embodiment of the invention.

FIGS. 63A to 63D are diagrams illustrating longitudinal spherical aberration and other aberrations of the optical lens assembly according to the fifteenth embodiment of the invention.

FIG. 64 shows detailed optical data pertaining to the optical lens assembly according to the fifteenth embodiment of the invention.

FIG. 65 shows aspheric parameters pertaining to the optical ens assembly according to the fifteenth embodiment of the invention.

FIG. 66 is a schematic view illustrating an optical lens assembly according to a sixteenth embodiment of the invention.

FIGS. 67A to 67D are diagrams illustrating longitudinal spherical aberration and other aberrations of the optical lens assembly according to the sixteenth embodiment of the invention.

FIG. 68 shows detailed optical data pertaining to the optical lens assembly according to the sixteenth embodiment of the invention.

FIG. 69 shows aspheric parameters pertaining to the optical lens assembly according to the sixteenth embodiment of the invention.

FIG. 70 is a schematic view illustrating an optical lens assembly according to a seventeenth embodiment of the invention.

FIGS. 71A to 71D are diagrams illustrating longitudinal spherical aberration and other aberrations of the optical lens assembly according to the seventeenth embodiment of the invention.

FIG. 72 shows detailed optical data pertaining to the optical s assembly according to the seventeenth embodiment of the invention.

FIG. 73 shows aspheric parameters pertaining to the optical lens assembly according to the seventeenth embodiment of the invention.

FIG. 74 is a schematic view illustrating an optical lens assembly according to an eighteenth embodiment of the invention.

FIGS. 75A to 75D are diagrams illustrating longitudinal spherical aberration and other aberrations of the optical lens assembly according to the eighteenth embodiment of the invention.

FIG. 76 shows detailed optical data pertaining to the optical lens assembly according to the eighteenth embodiment of the invention.

FIG. 77 shows aspheric parameters pertaining to the optical lens assembly according to the eighteenth embodiment of the invention.

FIG. 78 is a schematic view illustrating an optical lens assembly according to a nineteenth embodiment of the invention.

FIGS. 79A to 79D are diagrams illustrating longitudinal spherical aberration and other aberrations of the optical lens assembly according to the nineteenth embodiment of the invention.

FIG. 80 shows detailed optical data pertaining to the optical lens assembly according to the nineteenth embodiment of the invention.

FIG. 81 shows aspheric parameters pertaining to the optical lens assembly according to the nineteenth embodiment of the invention.

FIG. 84 shows detailed optical data pertaining to the optical lens assembly according to the twentieth embodiment of the invention.

FIG. 85 shows aspheric parameters pertaining to the optical lens assembly according to the twentieth embodiment of the invention.

FIG. 86 shows important parameters and relation values thereof pertaining to the optical lens assembly according to the first through the fifth embodiments of the invention.

FIG. 87 shows important parameters and relation values thereof pertaining to the optical lens assembly according to the sixth through the tenth embodiments of the invention.

FIG. 88 shows important parameters and relation values thereof pertaining to the optical lens assembly according to the eleventh through the fifteenth embodiments of the invention.

FIG. 89 shows important parameters and relation values thereof pertaining to the optical lens assembly according to the sixteenth through the twentieth embodiments of the invention.

DESCRIPTION OF THE EMBODIMENTS

Figure 6:
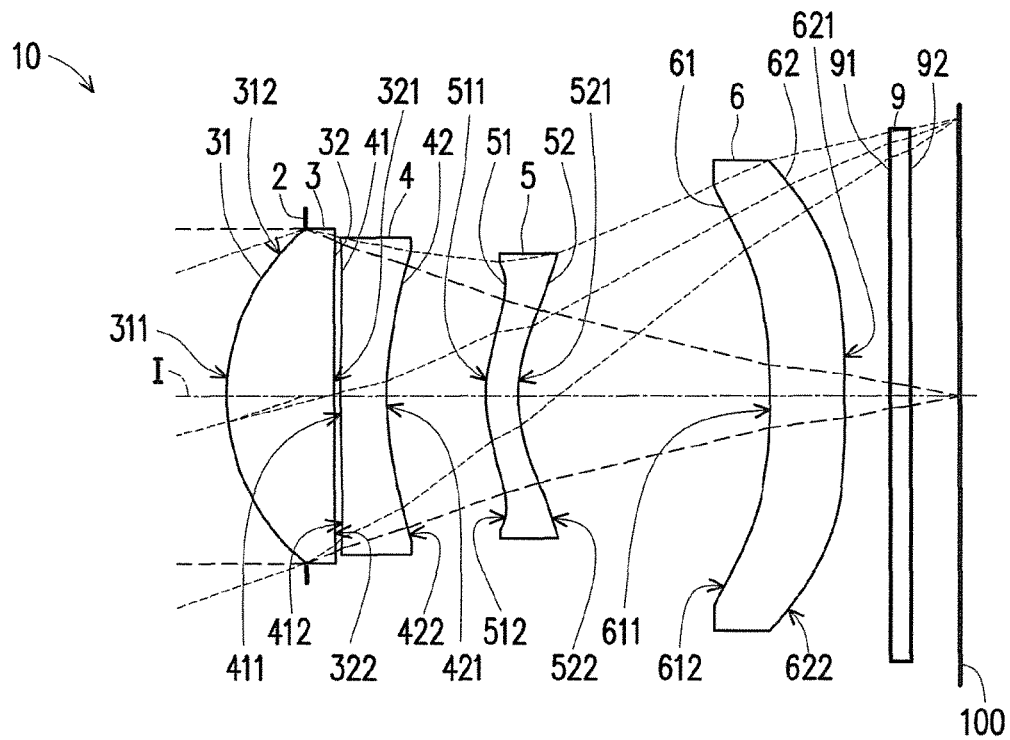
FIG. 6 is a schematic view illustrating an optical lens assembly according to a first embodiment of the invention.

In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

1. FIG. 1 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first transition point and a second transition point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second transition point (portion II).

Referring to a third example depicted in FIG. 5, no transition point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

FIG. 6 is a schematic view illustrating an optical lens assembly according to a first embodiment of the invention, and FIGS. 7A to 7D are diagrams illustrating longitudinal spherical aberration and other aberrations of the optical lens assembly according to the first embodiment of the invention. Referring to FIG. 6, an optical lens assembly 10 in the first embodiment of the invention includes an aperture stop 2, a first lens element 3, a second lens element 4, a third lens element 5, a fourth lens element 6, and a light filter 9 arranged in sequence from an object side to an image side along an optical axis I of the optical lens assembly 10. When a ray emitted from an object to be shot enters the optical lens assembly 10, the ray passes through the aperture stop 2, first lens element 3, second lens element 4, third lens element 5, fourth lens element 6, and light filter 9, so as to form an image on an image plane 100. The light filter 9 is, for example, an infrared cut filter (IR cut filter) configured for preventing the part of the ray in infrared band from being transmitted to the image plane 100 and affecting the image quality. It should be added that the object side is a side facing the object to be shot, and the image side is a side facing the image plane 100.

The first lens element 3, the second lens element 4, the third lens element 5, the fourth lens element 6, and the light filter 9 respectively have object-side surfaces 31, 41, 51, 61, and 91 facing the object side and allowing imaging rays to pass through, and respectively have image-side surfaces 32, 42, 52, 62, and 92 facing the image side and allowing the imaging rays to pass through.

In addition, in order to meet the requirement of consumers for lightweight product, the first lens element 3 through the fourth lens element 6 have refractive power and are formed of plastic material; however, the invention provides no limitation to the material of the first lens element 3 through the fourth lens element 6.

The first lens element 3 has positive refractive power. The object-side surface 31 of the first lens element 3 is a convex surface, and has a convex portion 311 in the vicinity of the optical axis I and a convex portion 312 in the vicinity of the periphery. The image-side surface 32 of the first lens element 3 has a convex portion 321 in the vicinity of the optical axis I and a concave portion 322 in the vicinity of the periphery. In the present embodiment, the object-side surface 31 and the image-side surface 32 of the first lens element 3 are both aspheric surfaces.

The second lens element 4 has negative refractive power. The object-side surface 41 of the second lens element 4 has a convex portion 411 in the vicinity of the optical axis I and a concave portion 412 in the vicinity of the periphery. The image-side surface 42 of the second lens element 4 is a concave surface, and has a concave portion 421 in the vicinity of the optical axis I and a concave portion 422 in the vicinity of the periphery. In the present embodiment, the object-side surface 41 and the image-side surface 42 of the second lens element 4 are both aspheric surfaces.

The third lens element 5 has negative refractive power. The object-side surface 51 of the third lens element 5 has a convex portion 511 in the vicinity of the optical axis I and a concave portion 512 in the vicinity of the periphery. The image-side surface 52 of the third lens element 5 is a concave surface, and has a concave portion 521 in the vicinity of the optical axis I and a concave portion 522 in the vicinity of the periphery. In the present embodiment, the object-side surface 51 and the image-side surface 52 of the third lens element 5 are both aspheric surfaces.

The fourth lens element 6 has negative refractive power. The object-side surface 61 of the fourth lens element 6 is a concave surface, and has a concave portion 611 in the vicinity of the optical axis I and a concave portion 612 in the vicinity of the periphery. The image-side surface 62 of the fourth lens element 6 is a convex surface, and has a convex portion 621 in the vicinity of the optical axis I and a convex portion 622 in the vicinity of the periphery. In the present embodiment, the object-side surface 61 and the image-side surface 62 of the fourth lens element 6 are both aspheric surfaces.

The detailed optical data in the first embodiment is described in FIG. 8. In the first embodiment, the effective focal length (EFL) of the total system is 7.070 mm, the half field of view (HFOV) thereof is 18.594°, the f-number (Fno) thereof is 2.390, the system length of the total system is 6.380 mm, and the image height thereof is 2.4 mm. Wherein, the system length refers to a distance from the object-side surface 31 of the first lens element 3 to the image plane 100 along the optical axis I.

In addition, in the embodiment, a total of eight surfaces, namely the object-side surfaces 31, 41, 51, and 61 and the image-side surfaces 32, 42, 52, and 62 of the first lens element 3, the second lens element 4, the third lens element 5, and the fourth lens element 6 are aspheric surfaces. The aspheric surfaces are defined by the following formula.

$$Z(Y) = \frac{Y^2}{R}\left(1 + \sqrt{1-(1+K)\frac{Y^2}{R^2}}\right) + \sum_{i=1}^{n} a_i \times Y^i \qquad (1)$$

wherein:
Y: a distance from a point on an aspheric curve to the optical axis I;
Z: a depth of the aspheric surface (i.e. a perpendicular distance between the point on the aspheric surface that is spaced by the distance Y from the optical axis I and a tangent plane tangent to a vertex of the aspheric surface on the optical axis I);
R: radius of curvature of the surface of the lens element near the optical axis I;
K: conic constant;
$a_i$: ith aspheric coefficient.
The aspheric coefficients of the object-side surface 31 of the first lens element 3 through the image-side surface 62 of the fourth lens element 6 in the formula (1) are shown in FIG. 9. Wherein the column reference number 31 in FIG. 9 represents the aspheric coefficient of the object-side surface 31 of the first lens element 3 and so forth.

In addition, the relations among important parameters pertaining to the optical lens assembly 10 in the first embodiment are shown in FIG. 86.

wherein,

T1 represents the thickness of the first lens element 3 along the optical axis I;

T2 represents the thickness of the second lens element 4 along the optical axis I;

T3 represents the thickness of the third lens element 5 along the optical axis I;

T4 represents the thickness of the fourth lens element 6 along the optical axis I;

G12 represents an air gap between the first lens element 3 and the second lens element 4 along the optical axis I;

G23 represents an air gap between the second lens element 4 and the third lens element 5 along the optical axis I;

G34 represents an air gap between the third lens element 5 and the fourth lens element 6 along the optical axis I;

G4f represents an air gap between the fourth lens element 6 and the light filter 9 along the optical axis I;

GAA represents a sum of the air gaps from the first lens element 3 to the last lens element along the optical axis I;

ALT represents a sum of the thickness of the lens elements of the optical lens assembly along the optical axis I;

TTL represents a distance from the object-side surface 31 of the first lens element 3 to the image plane 100 along the optical axis I;

TL represents a distance from the object-side surface 31 of the first lens element 3 to the last lens element along the optical axis I;

BFL represents a distance from the image-side surface of the last lens element to the image plane 100 along the optical axis I;

EFL represents an effective focal length of the optical lens assembly 10.

In addition, it is defined that:

GLF represents an air gap between the last lens element and the light filter 9 along the optical axis I;

TF represents a thickness of the light filter 9 along the optical axis I;

GFP represents an air gap between the light filter 9 and the image plane 100 along the optical axis I;

f1 is a focal length of the first lens element 3;

f2 is a focal length of the second lens element 4;

f3 is a focal length of the third lens element 5;

f4 is a focal length of the fourth lens element 6;

n1 is a refractive index of the first lens element 3;

n2 is a refractive index of the second lens element 4;

n3 is a refractive index of the third lens element 5;

n4 is a refractive index of the fourth lens element 6;

$\upsilon 1$ is an Abbe number of the first lens element 3;

$\upsilon 2$ is an Abbe number of the second lens element 4;

$\upsilon 3$ is an Abbe number of the third lens element 5; and $\upsilon 4$ is an Abbe number of the fourth lens element 6.

Figure 7A:
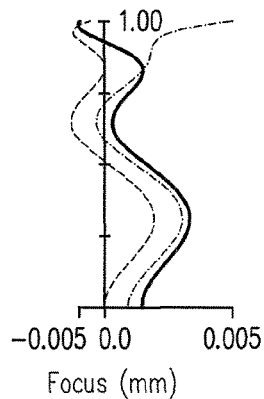
FIGS. 7A to 7D are diagrams illustrating longitudinal spherical aberration and other aberrations of the optical lens assembly according to the first embodiment of the invention.
Figure 7B:
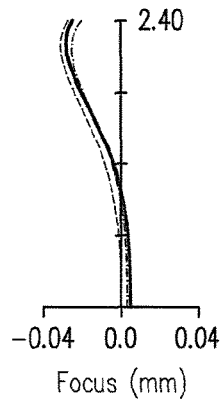
Figure 7C:
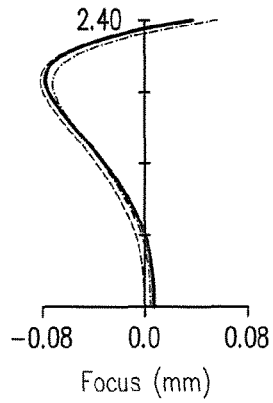
Figure 7D:
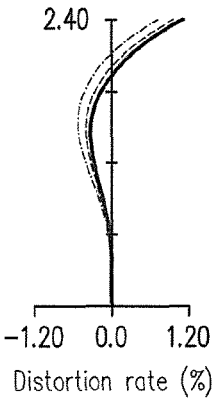

Further referring to FIGS. 7A to 7D, FIG. 7A illustrates the longitudinal spherical aberration of the first embodiment, FIGS. 7B to 7C are diagrams respectively illustrating field curvature aberration regarding sagittal direction on the image plane 100 and field curvature aberration regarding the tangential direction on the image plane 100 in the first embodiment, and FIG. 7D is a diagram illustrating distortion aberration on the image plane 100 in the first embodiment. The longitudinal spherical aberration of the first embodiment shown in FIG. 7A is simulated in the condition that the pupil radius is 1.4729 mm. Otherwise, in FIG. 7A which describes the longitudinal spherical aberration in the first embodiment, the curve of each wavelength is close to one another and near the middle position, which shows that the off-axis ray of each wavelength at different heights are focused near the imaging point. The skew margin of the curve of each wavelength shows that the imaging point deviation of the off-axis ray at different heights is controlled within ±0.03 mm. Accordingly, it is evident that the embodiment can significantly improve the spherical aberration of the same wavelength. In addition, the curves of the three representative wavelengths: red, green, and blue are close to one another, which represents that the imaging positions of the rays with different wavelengths are concentrated, therefore, the chromatic aberration can be significantly improved.

In FIGS. 7B and 7C which illustrate two diagrams of field curvature aberration, the focal length variation of the three representative wavelengths in the entire field of view falls within ±0.100 mm, which represents that the optical system in the first embodiment can effectively eliminate aberration. In FIG. 7D, the diagram of distortion aberration shows that the distortion aberration in the first embodiment can be maintained within ±1.2%, which shows that the distortion aberration in the first embodiment can meet the image quality requirement of the optical system. Based on the above, it is shown that the first embodiment can provide better image quality compared with existing optical lens under the condition where the system length of the optical lens is shortened to about 6.380 mm. Therefore, the first embodiment can have shorter lens length and broader shooting angle while maintaining good optical properties to realize slim design of product with broadened view angle.

FIG. 10 is a schematic view illustrating an optical lens assembly according to a second embodiment of the invention, FIGS. 11A to 11D are diagrams illustrating longitudinal spherical aberration and other aberrations of the optical lens assembly according to the second embodiment of the invention. Referring to FIG. 10, the second embodiment of the optical lens assembly 10 of the invention is similar to the first embodiment, and the difference lies in optical data, aspheric coefficients and the parameters of the lens elements 3, 4, 5, and 6. It should be noted that, in order to show the view clearly, some numerals which are the same as those used for the concave portion and convex portion in the first embodiment are omitted in FIG. 10.

The detailed optical data pertaining to the optical lens assembly 10 is shown in FIG. 12, and the effective focal length of the total system in the second embodiment is 7.070 mm, the HFOV thereof is 18.649°, Fno thereof is 2.390, the system length thereof is 6.380 min, and the image height thereof is 2.4 mm.

FIG. 13 shows the aspheric coefficients used in the formula (1) of the object-side surface 31 of the first lens element 3 through the image-side surface 62 of the fourth lens element 6 in the second embodiment.

In addition, the relations among important parameters pertaining to the optical lens assembly 10 in the second embodiment are shown in FIG. 86.

The longitudinal spherical aberration of the second embodiment shown in FIG. 11A is simulated in the condition that the pupil radius is 1.4729 mm. According to the longitudinal spherical aberration diagram of the second embodiment shown in FIG. 11A, a deviation of the imaging points of the off-axis rays of different heights is controlled within a range of ±0.03 mm. According to the two field curvature aberration diagrams of FIG. 11B and FIG. 11C, a focal length variation of the three representative wavelengths in the whole field of view falls within ±0.08 mm. According to the distortion aberration diagram of FIG. 11D, a distortion aberration of the second embodiment is maintained within the range of ±0.8%. Therefore, compared to the existing optical lens, the second embodiment may also achieve the good optical performance under a condition that the system length is reduced to about 6.380 mm.

According to the above description, compared to the first embodiment, the advantage of the second embodiment is that the HFOV of the second embodiment is greater than the HFOV of the first embodiment. In addition, the range of field curvature aberration regarding the tangential direction in the second embodiment is smaller than the range of field curvature aberration regarding the tangential direction in the first embodiment. The range of distortion aberration in the second embodiment is smaller than the range of distortion aberration in the first embodiment, and the optical lens assembly of the second embodiment is easier to be fabricated compared to that of the first embodiment, so that a production yield is relatively high.

FIG. 14 is a schematic view illustrating an optical lens assembly according to a third embodiment of the invention, FIGS. 15A to 15D are diagrams illustrating longitudinal spherical aberration and other aberrations of the optical lens assembly according to the third embodiment of the invention. Referring to FIG. 14, the third embodiment of the optical lens assembly 10 of the invention is similar to the first embodiment, and the difference lies in optical data, aspheric coefficients and the parameters of the lens elements 3, 4, 5, and 6. In the third embodiment, the object-side surface 41 of the second lens element 4 is a concave surface, and has a concave portion 413 in the vicinity of the optical axis I and the concave portion 412 in the vicinity of the periphery. The third lens element 5 has positive refractive power. The object-side surface 51 of the third lens element 5 is a concave surface, and has a concave portion 513 in the vicinity of the optical axis I and the concave portion 512 in the vicinity of the periphery. The image-side surface 52 of the third lens element 5 is a convex surface, and has a convex portion 523 in the vicinity of the optical axis I and a convex portion 524 in the vicinity of the periphery. It should be noted that, in order to show the view clearly, some numerals which the same as those used for the concave portion and convex portion in the first embodiment are omitted from FIG. 14.

The detailed optical data pertaining to the optical lens assembly 10 is shown in FIG. 16, and the effective focal length of the total system in the third embodiment is 7.070 mm, the HFOV thereof is 18.545°, Fno thereof is 2.386, the system length thereof is 6.381 mm, and the image height thereof is 2.4 mm.

FIG. 17 shows the aspheric coefficients used in the formula (1) of the object-side surface 31 of the first lens element 3 through the image-side surface 62 of the fourth lens element 6 in the third embodiment.

In addition, the relations among important parameters pertaining to the optical lens assembly 10 in the third embodiment are shown in FIG. 86.

The longitudinal spherical aberration of the third embodiment shown in FIG. 15A is simulated in the condition that the pupil radius is 1.4729 mm. According to the longitudinal spherical aberration diagram of the third embodiment shown in FIG. 15A, a deviation of the imaging points of the off-axis rays of different heights is controlled within a range of ±0.045 mm. According to the two field curvature aberration diagrams of FIG. 15B and FIG. 15C, a focal length variation of the three representative wavelengths in the whole field of view falls within ±0.12 mm. According to the distortion aberration diagram of FIG. 15D, a distortion aberration of the third embodiment is maintained within the range of ±1.6%. Therefore, compared to the existing optical lens, the third embodiment may also achieve the good optical performance under a condition that the system length is reduced to about 6.381 mm.

Based on the above, it can be obtained that the advantage of the third embodiment relative to the first embodiment lies in that the third embodiment can be manufactured more easily than the first embodiment; therefore, a higher yield rate can be achieved.

FIG. 18 is a schematic view illustrating an optical lens assembly according to a fourth embodiment of the invention, and FIGS. 19A to 19D are diagrams illustrating longitudinal spherical aberration and other aberrations of the optical lens assembly according to the fourth embodiment of the invention. Referring to FIG. 18, the fourth embodiment of the optical lens assembly 10 of the invention is similar to the first embodiment, and the difference lies in optical data, aspheric coefficients and the parameters of the lens elements 3, 4, 5, and 6. In the fourth embodiment, the image-side surface 32 of the first lens element 3 is a convex surface, and has the convex portion 321 in the vicinity of the optical axis I and a convex portion 323 in the vicinity of the periphery. The object-side surface 41 of the second lens element 4 is a convex surface, and has the convex portion 411 in the vicinity of the optical axis I and a convex portion 413 in the vicinity of the periphery. The object-side surface 51 of the third lens element 5 is a concave surface, and has the concave portion 513 in the vicinity of the optical axis I and the concave portion 512 in the vicinity of the periphery. The image-side surface 52 of the third lens element 5 has the concave portion 521 in the vicinity of the optical axis I and the convex portion 523 in the vicinity of the periphery. The fourth lens element 6 has positive refractive power. The object-side surface 61 of the fourth lens element 6 is a convex surface, and has a convex portion 613 in the vicinity of the optical axis I and a convex portion 614 in the vicinity of the periphery. The image-side surface 62 of the fourth lens element 6 has a concave portion 623 in the vicinity of the optical axis I and the convex portion 622 in the vicinity of the periphery. It should be noted that, in order to show the view clearly, some numerals which the same as those used for the concave portion and convex portion in the first embodiment are omitted from FIG. 18.

The detailed optical data pertaining to the optical lens assembly 10 is shown in FIG. 20, and the effective focal length of the total system in the fourth embodiment is 7.070 mm, the HFOV thereof is 18.498°, Fno thereof is 2.395, the system length thereof is 6.380 mm, and the image height thereof is 2.4 mm.

FIG. 21 shows the aspheric coefficients used in the formula (1) of the object-side surface 31 of the first lens element 3 through the image-side surface 62 of the fourth lens element 6 in the fourth embodiment.

In addition, the relations among important parameters pertaining to the optical lens assembly 10 in the fourth embodiment are shown in FIG. 86.

The longitudinal spherical aberration of the fourth embodiment shown in FIG. 19A is simulated in the condition that the pupil radius is 1.4729 mm. According to the longitudinal spherical aberration diagram of the fourth embodiment shown in FIG. 19A, a deviation of the imaging points of the off-axis rays of different heights is controlled within a range of ±0.020 mm. According to the two field curvature aberration diagrams of FIG. 19B and FIG. 19C, a focal length variation of the three representative wavelengths in the whole field of view falls within ±0.030 mm. According to the distortion aberration diagram of FIG. 19D, a distortion aberration of the fourth embodiment is maintained within the range of ±1.6%. Therefore, compared to the existing optical lens, the fourth embodiment may also achieve the good optical performance under a condition that the system length is reduced to about 6.380 mm.

According to the above description, compared to the first embodiment, the advantage of the fourth embodiment is that the range of the longitudinal spherical aberration in the fourth embodiment is smaller than the range of the longitudinal spherical aberration in the first embodiment. In addition, the range of field curvature aberration regarding sagittal direction in the fourth embodiment is smaller than the range of field curvature aberration regarding sagittal direction in the first embodiment, the range of field curvature aberration regarding the tangential direction in the fourth embodiment is smaller than the range of field curvature aberration regarding the tangential direction in the first embodiment, and the fourth embodiment can be manufactured more easily than the first embodiment; therefore, a higher yield rate can be achieved.

FIG. 22 is a schematic view illustrating an optical lens assembly according to a fifth embodiment of the invention, and FIGS. 23A to 23D are diagrams illustrating longitudinal spherical aberration and other aberrations of the optical lens assembly according to the fifth embodiment of the invention. Referring to FIG. 22, the fifth embodiment of the optical lens assembly 10 of the invention is similar to the first embodiment, and the difference lies in optical data, aspheric coefficients and the parameters of the lens elements 3, 4, 5, and 6. In the fifth embodiment, the image-side surface 32 of the first lens element 3 is a concave surface, and has a concave portion 324 in the vicinity of the optical axis I and the concave portion 322 in the vicinity of the periphery. The object-side surface 41 of the second lens element 4 is a concave surface, and has a concave portion 414 in the vicinity of the optical axis I and the concave portion 412 in the vicinity of the periphery. The image-side surface 62 of the fourth lens element 6 has a concave portion 624 in the vicinity of the optical axis I and the convex portion 622 in the vicinity of the periphery. It should be noted that, in order to show the view clearly, some numerals which the same as those used for the concave portion and convex portion in the first embodiment are omitted from FIG. 22.

The detailed optical data pertaining to the optical lens assembly 10 is shown in FIG. 24, and the effective focal length of the total system in the fifth embodiment is 7.070 mm, the HFOV thereof is 18.555°, Fno thereof is 2.395, the system length thereof is 6.381 mm, and the image height thereof is 2.4 mm.

FIG. 25 shows the aspheric coefficients used in the formula (1) of the object-side surface 31 of the first lens element 3 through the image-side surface 62 of the fourth lens element 6 in the fifth embodiment.

In addition, the relations among important parameters pertaining to the optical lens assembly 10 in the fifth embodiment are shown in FIG. 86.

The longitudinal spherical aberration of the fifth embodiment shown in FIG. 23A is simulated in the condition that the pupil radius is 1.4729 mm. According to the longitudinal spherical aberration diagram of the fifth embodiment shown in FIG. 23A, a deviation of the imaging points of the off-axis rays of different heights is controlled within a range of ±0.030 mm. According to the two field curvature aberration diagrams of FIG. 23B and FIG. 23C, a focal length variation of the three representative wavelengths in the whole field of view falls within ±0.080 mm. According to the distortion aberration diagram of FIG. 23D, a distortion aberration of the fifth embodiment is maintained within the range of ±1.6%. Therefore, compared to the existing optical lens, the fifth embodiment may also achieve the good optical performance under a condition that the system length is reduced to about 6.381 mm.

Based on the above, it can be obtained that the advantages of the fifth embodiment relative to the first embodiment are that the range of field curvature aberration regarding the tangential direction in the fifth embodiment is smaller than the range of field curvature aberration regarding the tangential direction in the first embodiment, and the fifth embodiment can be manufactured more easily than the first embodiment, therefore, a higher yield rate can be achieved.

FIG. 26 is a schematic view illustrating an optical lens assembly according to a sixth embodiment of the invention, FIGS. 27A to 27D are diagrams illustrating longitudinal spherical aberration and other aberrations of the optical lens assembly according to the sixth embodiment of the invention. Referring to FIG. 26, the sixth embodiment of the optical lens assembly 10 of the invention is similar to the first embodiment, and the difference lies in optical data, aspheric coefficients and the parameters of the lens elements 3, 4, 5, and 6. In the sixth embodiment, the image-side surface 32 of the first lens element 3 is a convex surface, and has the convex portion 321 in the vicinity of the optical axis I and a convex portion 324 in the vicinity of the periphery. The object-side surface 41 of the second lens element 4 is a concave surface, and has a concave portion 414 in the vicinity of the optical axis I and the concave portion 412 in the vicinity of the periphery. The object-side surface 51 of the third lens element 5 is a concave surface, and has the concave portion 513 in the vicinity of the optical axis I and the concave portion 512 in the vicinity of the periphery. The image-side surface 52 of the third lens element 5 is a convex surface, and has the convex portion 523 in the vicinity of the optical axis I and the convex portion 524 in the vicinity of the periphery. It should be noted that, in order to show the view clearly, some numerals which the same as those used for the concave portion and convex portion in the first embodiment are omitted from FIG. 26.

The detailed optical data pertaining to the optical lens assembly 10 is shown in FIG. 28, and the effective focal length of the total system in the sixth embodiment is 7.070 mm, the HFOV thereof is 18.728°, Fno thereof is 2.376, the system length thereof is 6.381 mm, and the image height thereof is 2.4 mm.

FIG. 29 shows the aspheric coefficients used in the formula (1) of the object-side surface 31 of the first lens element 3 through the image-side surface 62 of the fourth lens element 6 in the sixth embodiment.

In addition, the relations among important parameters pertaining to the optical lens assembly 10 in the sixth embodiment are shown in FIG. 87.

The longitudinal spherical aberration of the sixth embodiment shown in FIG. 27A is simulated in the condition that the pupil radius is 1.4729 mm. According to the longitudinal spherical aberration diagram of the sixth embodiment shown in FIG. 27A, a deviation of the imaging points of the off-axis rays of different heights is controlled within a range of ±0.030 mm. According to the two field curvature aberration diagrams of FIG. 27B and FIG. 27C, a focal length variation of the three representative wavelengths in the whole field of view falls within ±0.040 mm. According to the distortion aberration diagram of FIG. 27D, a distortion aberration of the sixth embodiment is maintained within the range of ±0.6%. Therefore, compared to the existing optical lens, the sixth embodiment may also achieve the good optical performance under a condition that the system length is reduced to about 6.381 mm.

Based on the above, it can be obtained that the advantage of the sixth embodiment relative to the first embodiment lies in that the f-number of the sixth embodiment is smaller than the f-number of the first embodiment, in other words, the aperture of the sixth embodiment is larger than the aperture of the first embodiment. In addition, the HFOV of the sixth embodiment is greater than the HFOV of the first embodiment. The range of field curvature aberration regarding sagittal direction in the sixth embodiment is smaller than the range of field curvature aberration regarding sagittal direction in the first embodiment. The range of field curvature aberration regarding the tangential direction in the sixth embodiment is smaller than the range of field curvature aberration regarding the tangential direction in the first embodiment. The range of distortion aberration in the sixth embodiment is smaller than the range of distortion aberration in the first embodiment, and the optical lens assembly of the sixth embodiment is easier to be fabricated compared to that of the first embodiment, so that a production yield is relatively high.

Figure 30:
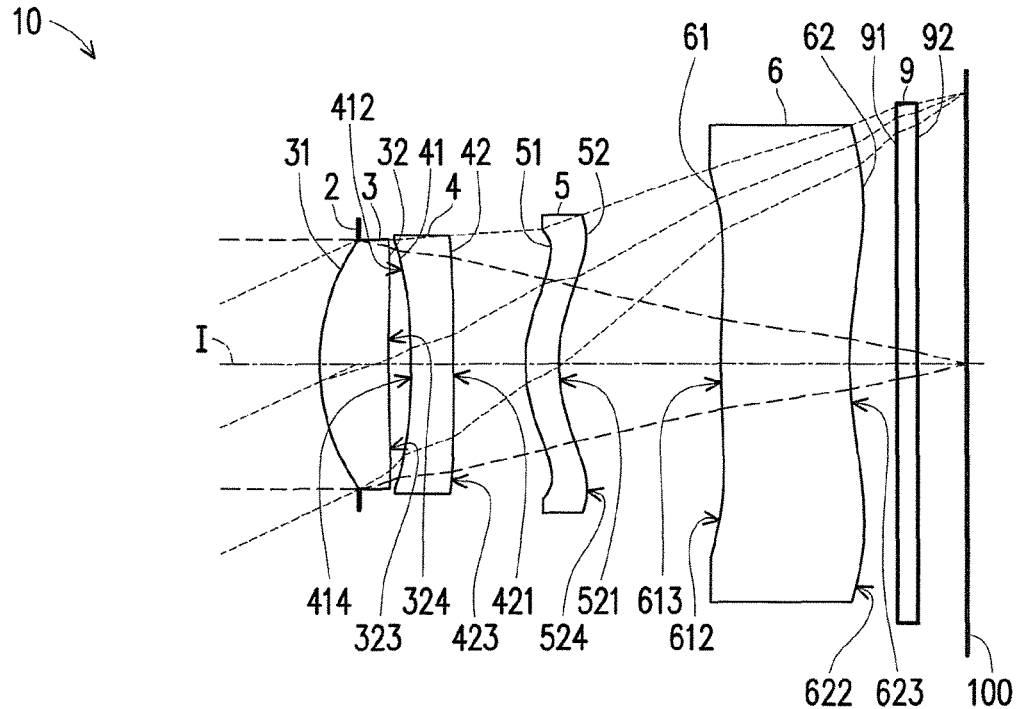
FIG. 30 is a schematic view illustrating an optical lens assembly according to a seventh embodiment of the invention.

FIG. 30 is a schematic view illustrating an optical lens assembly according to a seventh embodiment of the invention, and FIGS. 31A to 31D are diagrams illustrating longitudinal spherical aberration and other aberrations of the optical lens assembly according to the seventh embodiment of the invention. Referring to FIG. 30, the seventh embodiment of the optical lens assembly 10 of the invention is similar to the first embodiment, and the difference lies in optical data, aspheric coefficients and the parameters of the lens elements 3, 4, 5, and 6. In the seventh embodiment, the image-side surface 32 of the first lens element 3 has the concave portion 324 in the vicinity of the optical axis I and the convex portion 323 in the vicinity of the periphery. The object-side surface 41 of the second lens element 4 is a concave surface, and has a concave portion 414 in the vicinity of the optical axis I and the concave portion 412 in the vicinity of the periphery. The image-side surface 42 of the second lens element 4 has the concave portion 421 in the vicinity of the optical axis I and a convex portion 423 in the vicinity of the periphery. The third lens element 5 has positive refractive power. The image-side surface 52 of the third lens element 5 has the concave portion 521 in the vicinity of the optical axis I and the convex portion 524 in the vicinity of the periphery. The object-side surface 61 of the fourth lens element 6 has the convex portion 613 in the vicinity of the optical axis I and the concave portion 612 in the vicinity of the periphery. The image-side surface 62 of the fourth lens element 6 has the concave portion 623 in the vicinity of the optical axis I and the convex portion 622 in the vicinity of the periphery. It should be noted that, in order to show the view clearly, some numerals which the same as those used for the concave portion and convex portion in the first embodiment are omitted from FIG. 30.

The detailed optical data pertaining to the optical lens assembly 10 is shown in FIG. 32, and the effective focal length of the total system in the seventh embodiment is 5.149 mm, the HFOV thereof is 24.839°, Fno thereof is 2.403, the system length thereof is 5.698 mm, and the image height thereof is 2.4 mm.

FIG. 33 shows the aspheric coefficients used in the formula (1) of the object-side surface 31 of the first lens element 3 through the image-side surface 62 of the fourth lens element 6 in the seventh embodiment.

In addition, the relations among important parameters pertaining to the optical lens assembly 10 in the seventh embodiment are shown in FIG. 87.

Figures 31A, 31B, 31C, 31D:
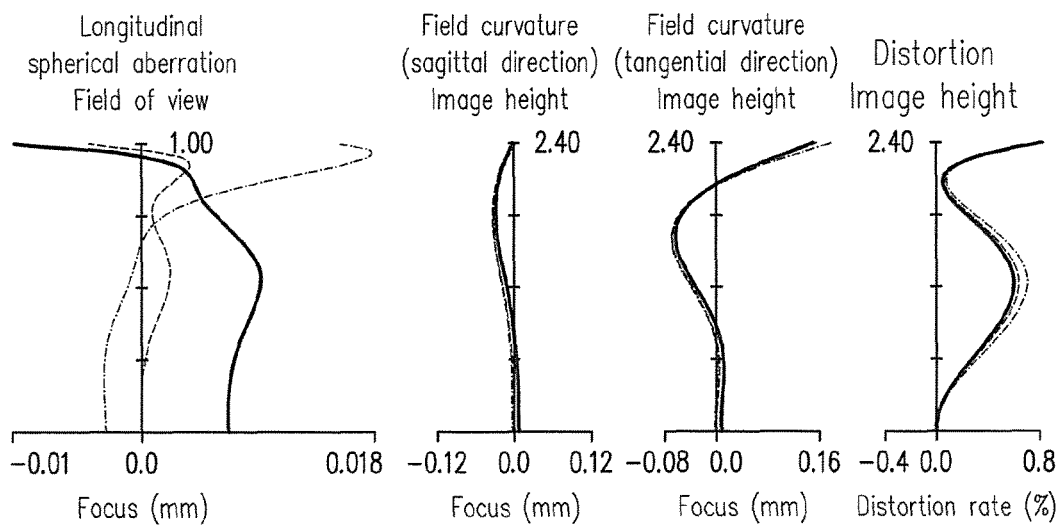
FIGS. 31A to 31D are diagrams illustrating longitudinal spherical aberration and other aberrations of the optical lens assembly according to the seventh embodiment of the invention.

The longitudinal spherical aberration of the seventh embodiment shown in FIG. 31A is simulated in the condition that the pupil radius is 1.0727 mm. According to the longitudinal spherical aberration diagram of the seventh embodiment shown in FIG. 31A, a deviation of the imaging points of the off-axis rays of different heights is controlled within a range of ±0.020 mm. According to the two field curvature aberration diagrams of FIG. 31B and FIG. 31C, a focal length variation of the three representative wavelengths in the whole field of view falls within ±0.080 mm. According to the distortion aberration diagram of FIG. 31D, a distortion aberration of the seventh embodiment is maintained within the range of ±1.0%. Therefore, compared to the existing optical lens, the seventh embodiment may also achieve the good optical performance under a condition that the system length is reduced to about 5.698 mm.

According to the above description, compared to the first embodiment, the advantage of the seventh embodiment is that the system length of the seventh embodiment is shorter than the system length of the first embodiment. In addition, the HFOV of the seventh embodiment is greater than the HFOV of the first embodiment. The range of the longitudinal spherical aberration in the seventh embodiment is smaller than the range of the longitudinal spherical aberration in the first embodiment. The range of field curvature aberration regarding sagittal direction in the seventh embodiment is smaller than the range of field curvature aberration regarding sagittal direction in the first embodiment. The range of field curvature aberration regarding the tangential direction in the seventh embodiment is smaller than the range of field curvature aberration regarding the tangential direction in the first embodiment. The range of distortion aberration in the seventh embodiment is smaller than the range of distortion aberration in the first embodiment, and the optical lens assembly of the seventh embodiment is easier to be fabricated compared to that of the first embodiment, so that a production yield is relatively high.

FIG. 34 is a schematic view illustrating an optical lens assembly according to an eighth embodiment of the invention, and FIGS. 35A to 35D are diagrams illustrating longitudinal spherical aberration and other aberrations of the optical lens assembly according to the eighth embodiment of the invention. Referring to FIG. 34, the eighth embodiment of the optical lens assembly 10 of the invention is similar to the first embodiment, and the difference lies in optical data, aspheric coefficients and the parameters of the lens elements 3, 4, 5, and 6. In the eighth embodiment, an optical lens assembly 10 includes a first lens element 3, an aperture stop 2, a second lens element 4, a third lens element 5, a fourth lens element 6, and a light filter 9 arranged in sequence from an object side to an image side along an optical axis I of the optical lens assembly 10. An object-side surface 41 of the second lens element 4 has the concave portion 414 in the vicinity of the optical axis I and the convex portion 413 in the vicinity of the periphery. The image-side surface 52 of the third lens element 5 has the concave portion 521 in the vicinity of the optical axis I and the convex portion 524 in the vicinity of the periphery. The fourth lens element 6 has positive refractive power. The object-side surface 61 of the fourth lens element 6 is a convex surface, and has the convex portion 613 in the vicinity of the optical axis I and the convex portion 614 in the vicinity of the periphery. The image-side surface 62 of the fourth lens element 6 has the concave portion 623 in the vicinity of the optical axis I and the convex portion 622 in the vicinity of the periphery. It should be noted that, in order to show the view clearly, some numerals which the same as those used for the concave portion and convex portion in the first embodiment are omitted from FIG. 34.

The detailed optical data pertaining to the optical lens assembly 10 is shown in FIG. 36, and the effective focal length of the total system in the eighth embodiment is 7.070 mm, the HFOV thereof is 18.661°, Fno thereof is 2.663, the system length thereof is 6.330 mm, and the image height thereof is 2.4 mm.

FIG. 37 shows the aspheric coefficients used in the formula (1) of the object-side surface 31 of the first lens element 3 through the image-side surface 62 of the fourth lens element 6 in the eighth embodiment.

In addition, the relations among important parameters pertaining to the optical lens assembly 10 in the eighth embodiment are shown in FIG. 87.

The longitudinal spherical aberration of the eighth embodiment shown in FIG. 35A is simulated in the condition that the pupil radius is 1.4729 mm. According to the longitudinal spherical aberration diagram of the eighth embodiment shown in FIG. 35A, a deviation of the imaging points of the off-axis rays of different heights is controlled within a range of ±0.014 mm. According to the two field curvature aberration diagrams of FIG. 35B and FIG. 35C, a focal length variation of the three representative wavelengths in the whole field of view falls within ±0.030 mm. According to the distortion aberration diagram of FIG. 35D, a distortion aberration of the eighth embodiment is maintained within the range of ±0.8%. Therefore, compared to the existing optical lens, the eighth embodiment may also achieve the good optical performance under a condition that the system length is reduced to about 6.330 mm.

According to the above description, compared to the first embodiment, the advantage of the eighth embodiment is that the system length of the eighth embodiment is shorter than the system length of the first embodiment. In addition, the HFOV of the eighth embodiment is greater than the HFOV of the first embodiment. The range of the longitudinal spherical aberration in the eighth embodiment is smaller than the range of the longitudinal spherical aberration in the first embodiment. The range of field curvature aberration regarding sagittal direction in the eighth embodiment is smaller than the range of field curvature aberration regarding sagittal direction in the first embodiment. The range of field curvature aberration regarding the tangential direction in the eighth embodiment is smaller than the range of field curvature aberration regarding the tangential direction in the first embodiment. The range of distortion aberration in the eighth embodiment is smaller than the range of distortion aberration in the first embodiment, and the optical lens assembly of the eighth embodiment is easier to be fabricated compared to that of the first embodiment, so that a production yield is relatively high.

FIG. 38 is a schematic view illustrating an optical lens assembly according to a ninth embodiment of the invention, and FIGS. 39A to 39D are diagrams illustrating longitudinal spherical aberration and other aberrations of the optical lens assembly according to the ninth embodiment of the invention. Referring to FIG. 38, the ninth embodiment of the optical lens assembly 10 of the invention is similar to the first embodiment, and the difference lies in optical data, aspheric coefficients and the parameters of the lens elements 3, 4, 5, and 6. The image-side surface 32 of the first lens element 3 is a convex surface, and has the convex portion 321 in the vicinity of the optical axis I and the convex portion 323 in the vicinity of the periphery. The object-side surface 41 of the second lens element 4 is a convex surface, and has the convex portion 411 in the vicinity of the optical axis I and the convex portion 413 in the vicinity of the periphery. The image-side surface 42 of the second lens element 4 has the concave portion 421 in the vicinity of the optical axis I and the convex portion 423 in the vicinity of the periphery. The image-side surface 52 of the third lens element 5 has the concave portion 521 in the vicinity of the optical axis I and the convex portion 524 in the vicinity of the periphery. The fourth lens element 6 has positive refractive power. The object-side surface 61 of the fourth lens element 6 is a convex surface, and has the convex portion 613 in the vicinity of the optical axis I and the convex portion 614 in the vicinity of the periphery. The image-side surface 62 of the fourth lens element 6 has the concave portion 623 in the vicinity of the optical axis I and the convex portion 622 in the vicinity of the periphery. It should be noted that, in order to show the view clearly, some numerals which the same as those used for the concave portion and convex portion in the first embodiment are omitted from FIG. 38.

The detailed optical data pertaining to the optical lens assembly 10 is shown in FIG. 40, and the effective focal length of the total system in the ninth embodiment is 7.070 mm, the HFOV thereof is 18.681°, Fno thereof is 2.391, the system length thereof is 6.380 mm, and the image height thereof is 2.4 mm.

FIG. 41 shows the aspheric coefficients used in the formula (1) of the object-side surface 31 of the first lens element 3 through the image-side surface 62 of the fourth lens element 6 in the ninth embodiment.

In addition, the relations among important parameters pertaining to the optical lens assembly 10 in the ninth embodiment are shown in FIG. 87.

The longitudinal spherical aberration of the ninth embodiment shown in FIG. 39A is simulated in the condition that the pupil radius is 1.4729 mm. According to the longitudinal spherical aberration diagram of the ninth embodiment shown in FIG. 39A, a deviation of the imaging points of the off-axis rays of different heights is controlled within a range of ±0.012 mm. According to the two field curvature aberration diagrams of FIG. 39B and FIG. 39C, a focal length variation of the three representative wavelengths in the whole field of view falls within ±0.030 mm. According to the distortion aberration diagram of FIG. 39D, a distortion aberration of the ninth embodiment is maintained within the range of ±0.8%. Therefore, compared to the existing optical lens, the ninth embodiment may also achieve the good optical performance under a condition that the system length is reduced to about 6.380 mm.

According to the above description, compared to the first embodiment, the advantage of the ninth embodiment is that the HFOV of the ninth embodiment is greater than the HFOV of the first embodiment. In addition, the range of the longitudinal spherical aberration in the ninth embodiment is smaller than the range of the longitudinal spherical aberration in the first embodiment. The range of field curvature aberration regarding sagittal direction in the ninth embodiment is smaller than the range of field curvature aberration regarding sagittal direction in the first embodiment. The range of field curvature aberration regarding the tangential direction in the ninth embodiment is smaller than the range of field curvature aberration regarding the tangential direction in the first embodiment. The range of distortion aberration in the ninth embodiment is smaller than the range of distortion aberration in the first embodiment, and the optical lens assembly of the ninth embodiment is easier to be fabricated compared to that of the first embodiment, so that a production yield is relatively high.

FIG. 42 is a schematic view illustrating an optical lens assembly according to a tenth embodiment of the invention, and FIGS. 43A to 43D are diagrams illustrating longitudinal spherical aberration and other aberrations of the optical lens assembly according to the tenth embodiment of the invention. Referring to FIG. 42, the tenth embodiment of the optical lens assembly 10 of the invention is similar to the first embodiment, and the difference lies in optical data, aspheric coefficients and the parameters of the lens elements 3, 4, 5, and 6. The object-side surface 41 of the second lens element 4 is a convex surface, and has the convex portion 411 in the vicinity of the optical axis I and the convex portion 413 in the vicinity of the periphery. The third lens element 5 has positive refractive power. The object-side surface 51 of the third lens element 5 is a concave surface, and has the concave portion 513 in the vicinity of the optical axis I and the concave portion 512 in the vicinity of the periphery. The image-side surface 52 of the third lens element 5 is a convex surface, and has the convex portion 523 in the vicinity of the optical axis I and the convex portion 524 in the vicinity of the periphery. It should be noted that, in order to show the view clearly, some numerals which the same as those used for the concave portion and convex portion in the first embodiment are omitted from FIG. 42.

The detailed optical data pertaining to the optical lens assembly 10 is shown in FIG. 44, and the effective focal length of the total system in the tenth embodiment is 7.070 mm, the HFOV thereof is 18.639°, Fno thereof is 2.389, the system length thereof is 6.381 mm, and the image height thereof is 2.4 mm.

FIG. 45 shows the aspheric coefficients used in the formula (1) of the object-side surface 31 of the first lens element 3 through the image-side surface 62 of the fourth lens element 6 in the tenth embodiment.

In addition, the relations among important parameters pertaining to the optical lens assembly 10 in the tenth embodiment are shown in FIG. 87.

The longitudinal spherical aberration of the tenth embodiment shown in FIG. 43A is simulated in the condition that the pupil radius is 1.4728 mm. According to the longitudinal spherical aberration diagram of the tenth embodiment shown in FIG. 43A, a deviation of the imaging points of the off-axis rays of different heights is controlled within a range of ±0.016 mm. According to the two field curvature aberration diagrams of FIG. 43B and FIG. 43C, a focal length variation of the three representative wavelengths in the whole field of view falls within ±0.16 mm. According to the distortion aberration diagram of FIG. 43D, a distortion aberration of the tenth embodiment is maintained within the range of ±0.8%. Therefore, compared to the existing optical lens, the tenth embodiment may also achieve the good optical performance under a condition that the system length is reduced to about 6.381 mm.

According to the above description, compared to the first embodiment, the advantage of the tenth embodiment is that the HFOV of the tenth embodiment is greater than the HFOV of the first embodiment. In addition, the range of the longitudinal spherical aberration in the tenth embodiment is smaller than the range of the longitudinal spherical aberration in the first embodiment. The range of field curvature aberration regarding sagittal direction in the tenth embodiment is smaller than the range of field curvature aberration regarding sagittal direction in the first embodiment. The range of distortion aberration in the tenth embodiment is smaller than the range of distortion aberration in the first embodiment, and the optical lens assembly of the tenth embodiment is easier to be fabricated compared to that of the first embodiment, so that a production yield is relatively high.

Figure 46:
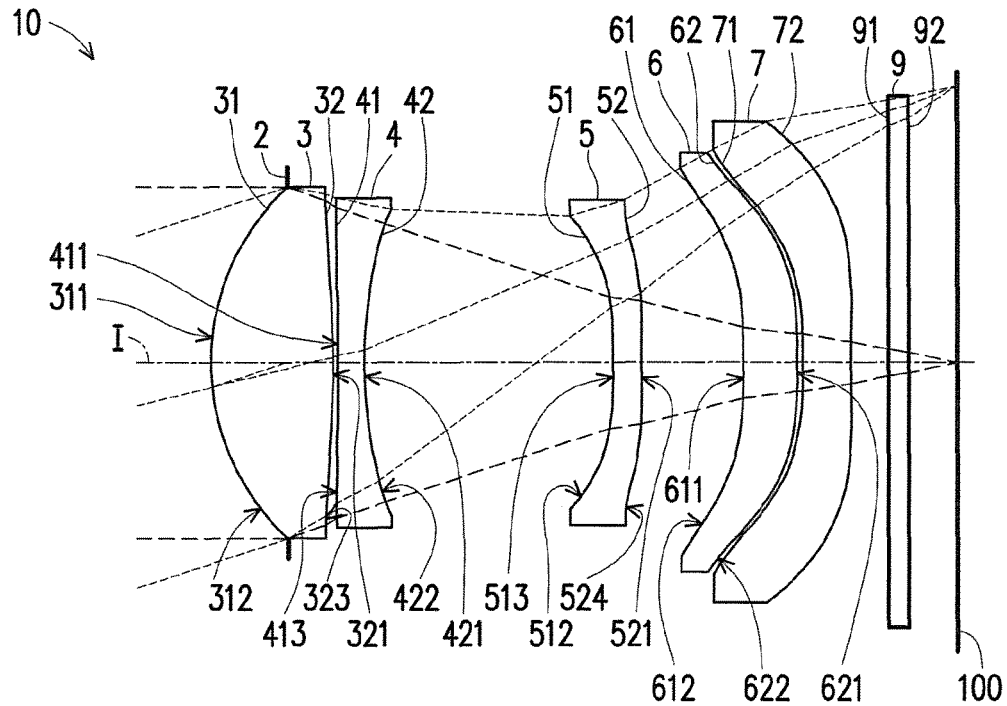
FIG. 46 is a schematic view illustrating an optical lens assembly according to an eleventh embodiment of the invention.

FIG. 46 is a schematic view illustrating an optical lens assembly according to an eleventh embodiment of the invention, and FIGS. 47A to 47D are diagrams illustrating longitudinal spherical aberration and other aberrations of the optical lens assembly according to the eleventh embodiment of the invention. Referring to FIG. 46, an optical lens assembly 10 in the eleventh embodiment of the invention includes an aperture stop 2, a first lens element 3, a second lens element 4, a third lens element 5, a fourth lens element 6, a fifth lens element 7, and a light filter 9 arranged in sequence from an object side to an image side along an optical axis I of the optical lens assembly 10. When a ray emitted from an object to be shot enters the optical lens assembly 10, the ray sequentially passes through the aperture stop 2, the first lens element 3, the second lens element 4, the third lens element 5, the fourth lens element 6, the fifth lens element 7, and the light filter 9, so as to form an image on an image plane 100. The light filter 9 is, for example, an infrared cut filter (IR cut filter) configured for preventing the part of the ray in infrared band from being transmitted to the image plane 100 and affecting the image quality. It should be added that the object side is a side facing the object to be shot, and the image side is a side facing the image plane 100.

The first lens element 3, second lens element 4, third lens element 5, fourth lens element 6, fifth lens element 7 and light filter 9 respectively have object-side surfaces 31, 41, 51, 61, 71 and 91 facing the object side and allowing imaging rays to pass through, and respectively have image-side surfaces 32, 42, 52, 62, 72 and 92 facing the image side and allowing the imaging rays to pass through.

In addition, in order to meet the requirement of consumers for lightweight product, the first lens element 3 through the fifth lens element 7 have refractive power and are formed of plastic material; however, the invention provides no limitation to the material of the first lens element 3 through the fifth lens element 7.

The first lens element 3 has positive refractive power. The object-side surface 31 of the first lens element 3 is a convex surface, and has the convex portion 311 in the vicinity of the optical axis I and the convex portion 312 in the vicinity of the periphery. The image-side surface 32 of the first lens element 3 is a convex surface, and has the convex portion 321 in the vicinity of the optical axis I and the convex portion 323 in the vicinity of the periphery. In the eleventh embodiment, the object-side surface 31 and the image-side surface 32 of the first lens element 3 are both aspheric surfaces.

The second lens element 4 has negative refractive power. The object-side surface 41 of the second lens element 4 is a convex surface, and has the convex portion 411 in the vicinity of the optical axis I and the convex portion 413 in the vicinity of the periphery. The image-side surface 42 of the second lens element 4 is a concave surface, and has the concave portion 421 in the vicinity of the optical axis I and the concave portion 422 in the vicinity of the periphery. In the eleventh embodiment, the object-side surface 41 and the image-side surface 42 of the second lens element 4 are both aspheric surfaces.

The third lens element 5 has negative refractive power. The object-side surface 51 of the third lens element 5 is a concave surface, and has the concave portion 513 in the vicinity of the optical axis I and the concave portion 512 in the vicinity of the periphery. The image-side surface 52 of the third lens element 5 has the concave portion 521 in the vicinity of the optical axis I and the convex portion 524 in the vicinity of the periphery. In the eleventh embodiment, the object-side surface 51 and the image-side surface 52 of the third lens element 5 are both aspheric surfaces.

The fourth lens element 6 has negative refractive power. The object-side surface 61 of the fourth lens element 6 is a concave surface, and has the concave portion 611 in the vicinity of the optical axis I and the concave portion 612 in the vicinity of the periphery. The image-side surface 62 of the fourth lens element 6 is a convex surface, and has the convex portion 621 in the vicinity of the optical axis I and the convex portion 622 in the vicinity of the periphery. In the eleventh embodiment, the object-side surface 61 and the image-side surface 62 of the fourth lens element 6 are both aspheric surfaces.

The fifth lens element 7 has negative refractive power. The object-side surface 71 of the fifth lens element 7 is a concave surface, and has a concave portion 711 in the vicinity of the optical axis I and a concave portion 712 in the vicinity of the periphery. The image-side surface 72 of the fifth lens element 7 has a concave portion 721 in the vicinity of the optical axis I and a convex portion 722 in the vicinity of the periphery. In the eleventh embodiment, the object-side surface 71 and the image-side surface 72 of the fifth lens element 7 are both aspheric surfaces.

The detailed optical data in the eleventh embodiment is described in FIG. 48. In the eleventh embodiment, the effective focal length (EFL) of the total system is 9.000 mm, the half field of view (HFOV) thereof is 17.948°, the f-number (Fno) thereof is 2.401, the system length of the total system is 7.953 mm, and the image height thereof is 2.944 mm. Wherein, the system length refers to a distance from the object-side surface 31 of the first lens element 3 to the image plane 100 along the optical axis I.

In addition, in the eleventh embodiment, a total of ten surfaces, namely the object-side surfaces 31, 41, 51, 61 and 71 and image-side surfaces 32, 42, 52, 62 and 72 of the first lens element 3, the second lens element 4, the third lens element 5, the fourth lens element 6 and the fifth lens element 7 are aspheric surfaces. The aspheric surfaces are defined by the formula (1) and will not repeated hereinafter. The aspheric coefficients used in the formula (1) of the object-side surface 31 of the first lens element 3 through the image-side surface 72 of the fifth lens element 7 are shown in FIG. 49. Wherein the column reference number 31 in FIG. 49 represents the aspheric coefficient of the object-side surface 31 of the first lens element 3 and so forth.

In addition, the relations among important parameters pertaining to the optical lens assembly 10 in the eleventh embodiment are shown in FIG. 88.

The parameter definitions of the first lens element 3, the second lens element 4, the third lens element 5, the fourth lens element 6, and the fifth lens element 7 in the eleventh embodiment may refer to the parameter definitions in the first embodiment, the difference is that:

wherein,

T5 represents the thickness of the fifth lens element 7 along the optical axis I;

G45 represents an air gap between the fourth lens element 6 and the fifth lens element 7 along the optical axis I;

G5f represents an air gap between the fifth lens element 7 and the light filter 9 along the optical axis I;

f5 is a focal length of the fifth lens element 7;

n5 is a refractive index of the fifth lens element 7; and

υ5 is an Abbe number of the fifth lens element 7.

Figures 47A, 47B, 47C, 47D:
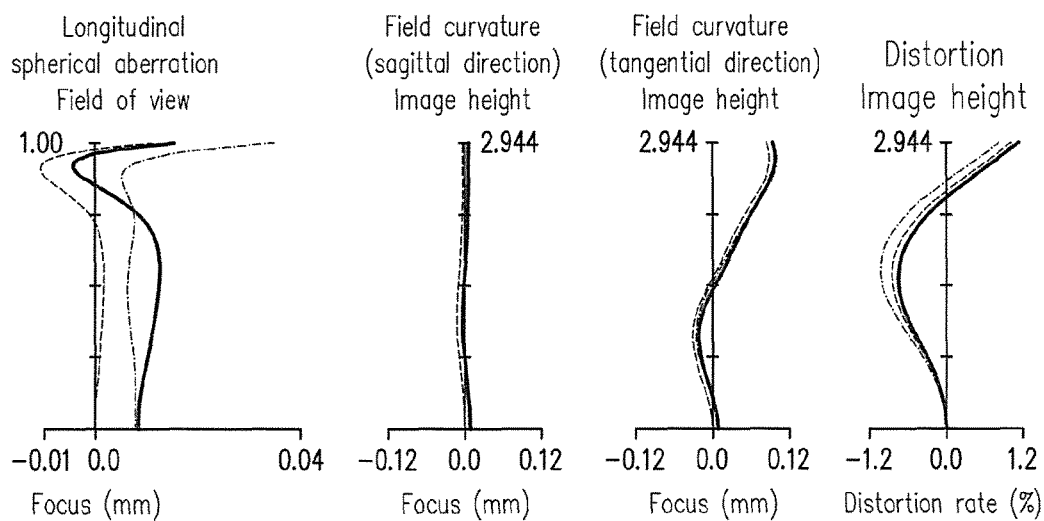
FIGS. 47A to 47D are diagrams illustrating longitudinal spherical aberration and other aberrations of the optical lens assembly according to the eleventh embodiment of the invention.

The longitudinal spherical aberration of the eleventh embodiment shown in FIG. 47A is simulated in the condition that the pupil radius is 1.8750 mm. According to the longitudinal spherical aberration diagram of the eleventh embodiment shown in FIG. 47A, a deviation of the imaging points of the off-axis rays of different heights is controlled within a range of ±0.04 mm. According to the two field curvature aberration diagrams of FIG. 47B and FIG. 47C, a focal length variation of the three representative wavelengths in the whole field of view falls within ±0.12 mm. According to the distortion aberration diagram of FIG. 47D, a distortion aberration of the eleventh embodiment is maintained within the range of ±1.2%. Therefore, compared to the existing optical lens, the eleventh embodiment may also achieve the good optical performance under a condition that the system length is reduced to about 7.953 mm.

Based on the above, it can be obtained that the advantages of the eleventh embodiment relative to the first embodiment are that the range of field curvature aberration regarding the sagittal direction in the eleventh embodiment is smaller than the range of field curvature aberration regarding the sagittal direction in the first embodiment, and the eleventh embodiment can be manufactured more easily than the first embodiment, therefore, a higher yield rate can be achieved.

Figure 50:
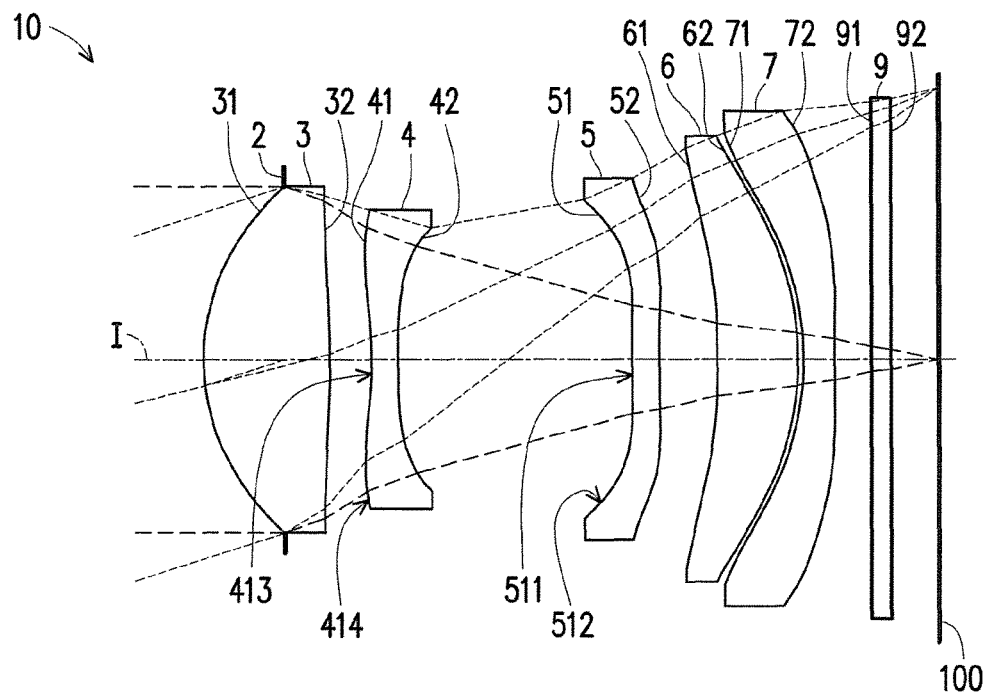
FIG. 50 is a schematic view illustrating an optical lens assembly according to a twelfth embodiment of the invention.

FIG. 50 is a schematic view illustrating an optical lens assembly according to a twelfth embodiment of the invention, and FIGS. 51A to 51D are diagrams illustrating longitudinal spherical aberration and other aberrations of the optical lens assembly according to the twelfth embodiment of the invention. Referring to FIG. 50, the twelfth embodiment of the optical lens assembly 10 of the invention is similar to the eleventh embodiment, and the difference lies in optical data, aspheric coefficients and the parameters of the lens elements 3, 4, 5, 6 and 7. An object-side surface 41 of the second lens element 4 has the concave portion 413 in the vicinity of the optical axis I and a convex portion 414 in the vicinity of the periphery. The object-side surface 51 of the third lens element 5 has the convex portion 511 in the vicinity of the optical axis I and the concave portion 512 in the vicinity of the periphery. The fourth lens element 6 has positive refractive power. It should be noted that, in order to show the view clearly, some numerals which the same as those used for the concave portion and convex portion in the first embodiment are omitted from FIG. 50.

The detailed optical data pertaining to the optical lens assembly 10 is shown in FIG. 52, and the effective focal length of the total system in the twelfth embodiment is 9.000 mm, the HFOV thereof is 18.027°, Fno thereof is 2.394, the system length thereof is 7.953 mm, and the image height thereof is 2.944 mm.

FIG. 53 shows the aspheric coefficients used in the formula (1) of the object-side surface 31 of the first lens element 3 through the image-side surface 72 of the fifth lens element 7 in the twelfth embodiment.

In addition, the relations among important parameters pertaining to the optical lens assembly 10 in the twelfth embodiment are shown in FIG. 88.

Figures 51A, 51B, 51C, 51D:
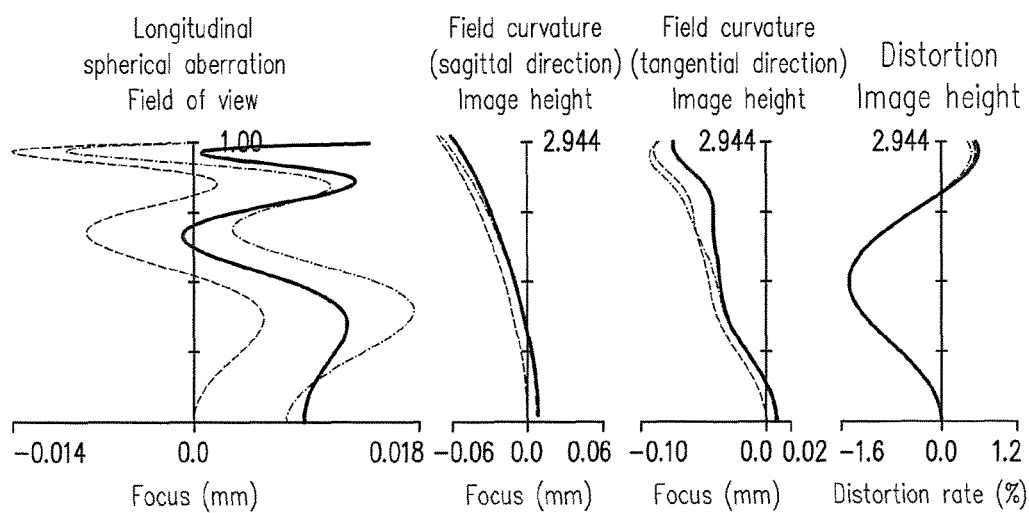
FIGS. 51A to 51D are diagrams illustrating longitudinal spherical aberration and other aberrations of the optical lens assembly according to the twelfth embodiment of the invention.

The longitudinal spherical aberration of the twelfth embodiment shown in FIG. 51A is simulated in the condition that the pupil radius is 1.8750 mm. According to the longitudinal spherical aberration diagram of the twelfth embodiment shown in FIG. 51A, a deviation of the imaging points of the off-axis rays of different heights is controlled within a range of ±0.018 mm. According to the two field curvature aberration diagrams of FIG. 51B and FIG. 51C, a focal length variation of the three representative wavelengths in the whole field of view falls within ±0.10 mm. According to the distortion aberration diagram of FIG. 51D, a distortion aberration of the twelfth embodiment is maintained within the range of ±1.6%. Therefore, compared to the existing optical lens, the twelfth embodiment may also achieve the good optical performance under a condition that the system length is reduced to about 7.953 mm.

Based on the above, it can be obtained that the advantages of the twelfth embodiment relative to the first embodiment are that the range of longitudinal spherical aberration in the twelfth embodiment is smaller than the range of longitudinal spherical aberration in the first embodiment, and the twelfth embodiment can be manufactured more easily than the first embodiment, therefore, a higher yield rate can be achieved.

FIG. 54 is a schematic view illustrating an optical lens assembly according to a thirteenth embodiment of the invention, and FIGS. 55A to 55D are diagrams illustrating longitudinal spherical aberration and other aberrations of the optical lens assembly according to the thirteenth embodiment of the invention. Referring to FIG. 54, the thirteenth embodiment of the optical lens assembly 10 of the invention is similar to the eleventh embodiment, and the difference lies in optical data, aspheric coefficients and the parameters of the lens elements 3, 4, 5, 6 and 7. The object-side surface 41 of the second lens element 4 is a concave surface, and has the concave portion 413 in the vicinity of the optical axis I and the concave portion 412 in the vicinity of the periphery. The object-side surface 51 of the third lens element 5 has the convex portion 511 in the vicinity of the optical axis I and the concave portion 512 in the vicinity of the periphery. The image-side surface 52 of the third lens element 5 is a concave surface, and has the concave portion 521 in the vicinity of the optical axis I and the concave portion 522 in the vicinity of the periphery. The fourth lens element 6 has positive refractive power. It should be noted that, in order to show the view clearly, some numerals which the same as those used for the concave portion and convex portion in the first embodiment are omitted from FIG. 54.

The detailed optical data pertaining to the optical lens assembly 10 is shown in FIG. 56, and the effective focal length of the total system in the thirteenth embodiment is 8.137 mm, the HFOV thereof is 19.854°, Fno thereof is 2.860, the system length thereof is 8.095 mm, and the image height thereof is 2.944 mm.

FIG. 57 shows the aspheric coefficients used in the formula (1) of the object-side surface 31 of the first lens element 3 through the image-side surface 72 of the fifth lens element 7 in the thirteenth embodiment.

In addition, the relations among important parameters pertaining to the optical lens assembly 10 in the thirteenth embodiment are shown in FIG. 88.

The longitudinal spherical aberration of the thirteenth embodiment shown in FIG. 55A is simulated in the condition that the pupil radius is 1.4530 mm. According to the longitudinal spherical aberration diagram of the thirteenth embodiment shown in FIG. 55A, a deviation of the imaging points of the off-axis rays of different heights is controlled within a range of ±0.08 mm. According to the two field curvature aberration diagrams of FIG. 55B and FIG. 55C, a focal length variation of the three representative wavelengths in the whole field of view falls within ±0.10 mm. According to the distortion aberration diagram of FIG. 55D, a distortion aberration of the thirteenth embodiment is maintained within the range of ±0.5%. Therefore, compared to the existing optical lens, the thirteenth embodiment may also achieve the good optical performance under a condition that the system length is reduced to about 8.095 mm.

According to the above description, compared to the first embodiment, the advantage of the thirteenth embodiment is that the HFOV of the thirteenth embodiment is greater than the HFOV of the first embodiment. In addition, the range of distortion aberration in the thirteenth embodiment is smaller than the range of distortion aberration in the first embodiment, and the optical lens assembly of the thirteenth embodiment is easier to be fabricated compared to that of the first embodiment, so that a production yield is relatively high.

Figure 58:
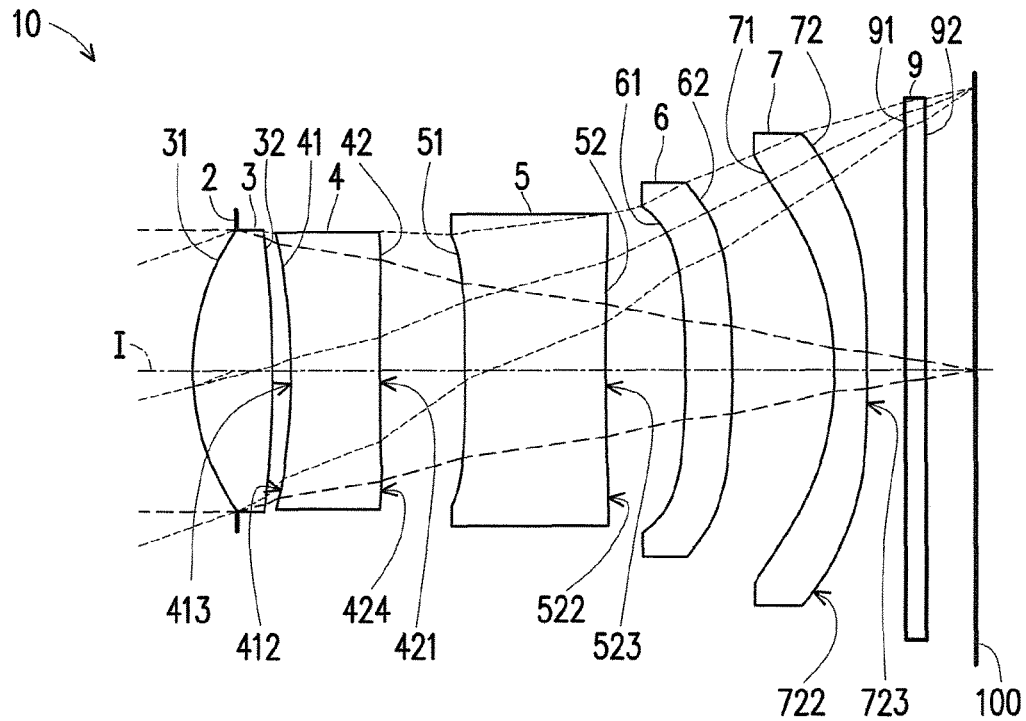
FIG. 58 is a schematic view illustrating an optical lens assembly according to a fourteenth embodiment of the invention.
Figures 59A, 59B, 59C, 59D:
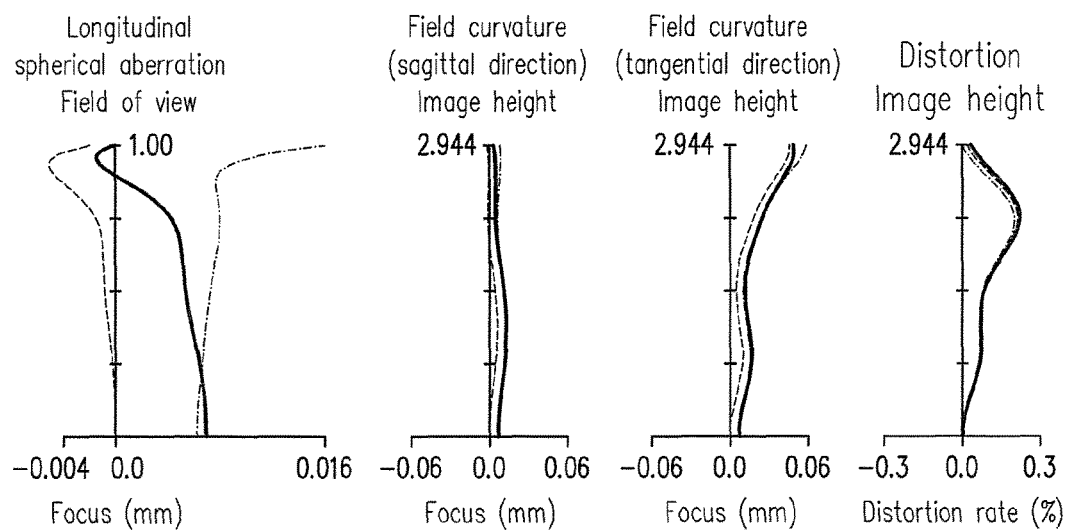
FIGS. 59A to 59D are diagrams illustrating longitudinal spherical aberration and other aberrations of the optical lens assembly according to the fourteenth embodiment of the invention.

FIG. 58 is a schematic view illustrating an optical lens assembly according to a fourteenth embodiment of the invention, and FIGS. 59A to 55D are diagrams illustrating longitudinal spherical aberration and other aberrations of the optical lens assembly according to the fourteenth embodiment of the invention. Referring to FIG. 58, the fourteenth embodiment of the optical lens assembly 10 of the invention is similar to the eleventh embodiment, and the difference lies in optical data, aspheric coefficients and the parameters of the lens elements 3, 4, 5, 6 and 7. The object-side surface 41 of the second lens element 4 is a concave surface, and has the concave portion 413 in the vicinity of the optical axis I and the concave portion 412 in the vicinity of the periphery. The image-side surface 42 of the second lens element 4 has the concave portion 421 in the vicinity of the optical axis I and a convex portion 424 in the vicinity of the periphery. The image-side surface 52 of the third lens element 5 has the convex portion 523 in the vicinity of the optical axis I and the concave portion 522 in the vicinity of the periphery. The fourth lens element 6 has positive refractive power. The image-side surface 72 of the fifth lens element 7 is a convex surface, and has a convex portion 723 in the vicinity of the optical axis I and the convex portion 722 in the vicinity of the periphery. It should be noted that, in order to show the view clearly, some numerals which the same as those used for the concave portion and convex portion in the first embodiment are omitted from FIG. 58.

The detailed optical data pertaining to the optical lens assembly 10 is shown in FIG. 60, and the effective focal length of the total system in the fourteenth embodiment is 8.160 mm, the HFOV thereof is 19.836% Fno thereof is 2.801, the system length thereof is 8.098 mm, and the image height thereof is 2.944 mm.

FIG. 61 shows the aspheric coefficients used in the formula (1) of the object-side surface 31 of the first lens element 3 through the image-side surface 72 of the fifth lens element 7 in the fourteenth embodiment.

In addition, the relations among important parameters pertaining to the optical lens assembly 10 in the fourteenth embodiment are shown in FIG. 88.

The longitudinal spherical aberration of the fourteenth embodiment shown in FIG. 59A is simulated in the condition that the pupil radius is 1.4751 mm. According to the longitudinal spherical aberration diagram of the fourteenth embodiment shown in FIG. 59A, a deviation of the imaging points of the off-axis rays of different heights is controlled within a range of ±0.018 mm. According to the two field curvature aberration diagrams of FIG. 59B and FIG. 59C, a focal length variation of the three representative wavelengths in the whole field of view falls within ±0.06 mm. According to the distortion aberration diagram of FIG. 59D, a distortion aberration of the fourteenth embodiment is maintained within the range of ±0.3%. Therefore, compared to the existing optical lens, the fourteenth embodiment may also achieve the good optical performance under a condition that the system length is reduced to about 8.098 mm.

According to the above description, compared to the first embodiment, the advantage of the fourteenth embodiment is that the HFOV of the fourteenth embodiment is greater than the HFOV of the first embodiment. In addition, the range of the longitudinal spherical aberration in the fourteenth embodiment is smaller than the range of the longitudinal spherical aberration in the first embodiment. The range of field curvature aberration regarding sagittal direction in the fourteenth embodiment is smaller than the range of field curvature aberration regarding sagittal direction in the first embodiment. The range of field curvature aberration regarding the tangential direction in the fourteenth embodiment is smaller than the range of field curvature aberration regarding the tangential direction in the first embodiment. The range of distortion aberration in the fourteenth embodiment is smaller than the range of distortion aberration in the first embodiment, and the optical lens assembly of the fourteenth embodiment is easier to be fabricated compared to that of the first embodiment, so that a production yield is relatively high.

FIG. 62 is a schematic view illustrating an optical lens assembly according to a fifteenth embodiment of the invention, and FIGS. 63A to 63D are diagrams illustrating longitudinal spherical aberration and other aberrations of the optical lens assembly according to the fifteenth embodiment of the invention. Referring to FIG. 62, the fifteenth embodiment of the optical lens assembly 10 of the invention is similar to the eleventh embodiment, and the difference lies in optical data, aspheric coefficients and the parameters of the lens elements 3, 4, 5, 6 and 7. The third lens element 5 has positive refractive power. The image-side surface 52 of the third lens element 5 is a convex surface, and has the convex portion 523 in the vicinity of the optical axis I and the convex portion 524 in the vicinity of the periphery. The object-side surface 61 of the fourth lens element 6 has the convex portion 613 in the vicinity of the optical axis I and the concave portion 612 in the vicinity of the periphery. The image-side surface 62 of the fourth lens element 6 has the concave portion 623 in the vicinity of the optical axis I and the convex portion 622 in the vicinity of the periphery. It should be noted that, in order to show the view clearly, some numerals which the same as those used for the concave portion and convex portion in the first embodiment are omitted from FIG. 62.

The detailed optical data pertaining to the optical lens assembly 10 is shown in FIG. 64, and the effective focal length of the total system in the fifteenth embodiment is 9.360 mm, the HFOV thereof is 17.438% Fno thereof is 2.499, the system length thereof is 10.753 mm, and the image height thereof is 2.944 mm.

FIG. 65 shows the aspheric coefficients used in the formula (1) of the object-side surface 31 of the first lens element 3 through the image-side surface 72 of the fifth lens element 7 in the fifteenth embodiment.

In addition, the relations among important parameters pertaining to the optical lens assembly 10 in the fifteenth embodiment are shown in FIG. 88.

The longitudinal spherical aberration of the fifteenth embodiment shown in FIG. 63A is simulated in the condition that the pupil radius is 1.8750 mm. According to the longitudinal spherical aberration diagram of the fifteenth embodiment shown in FIG. 63A, a deviation of the imaging points of the off-axis rays of different heights is controlled within a range of ±0.014 mm. According to the two field curvature aberration diagrams of FIG. 63B and FIG. 63C, a focal length variation of the three representative wavelengths in the whole field of view falls within ±0.03 mm. According to the distortion aberration diagram of FIG. 63D, a distortion aberration of the fifteenth embodiment is maintained within the range of ±0.16%. Therefore, compared to the existing optical lens, the fifteenth embodiment may also achieve the good optical performance under a condition that the system length is reduced to about 10.753 mm.

According to the above description, compared to the first embodiment, the advantage of the fifteenth embodiment is that the range of the longitudinal spherical aberration in the fifteenth embodiment is smaller than the range of the longitudinal spherical aberration in the first embodiment. The range of field curvature aberration regarding sagittal direction in the fifteenth embodiment is smaller than the range of field curvature aberration regarding sagittal direction in the first embodiment. The range of field curvature aberration regarding the tangential direction in the fifteenth embodiment is smaller than the range of field curvature aberration regarding the tangential direction in the first embodiment. The range of distortion aberration in the fifteenth embodiment is smaller than the range of distortion aberration in the first embodiment, and the optical lens assembly of the fifteenth embodiment is easier to be fabricated compared to that of the first embodiment, so that a production yield is relatively high.

FIG. 66 is a schematic view illustrating an optical lens assembly according to a sixteenth embodiment of the invention, and FIGS. 67A to 67D are diagrams illustrating longitudinal spherical aberration and other aberrations of the optical lens assembly according to the sixteenth embodiment of the invention. Referring to FIG. 66, the sixteenth embodiment of the optical lens assembly 10 of the invention is similar to the eleventh embodiment, and the difference lies in optical data, aspheric coefficients and the parameters of the lens elements 3, 4, 5, 6 and 7. The object-side surface 41 of the second lens element 4 is a concave surface, and has the concave portion 413 in the vicinity of the optical axis I and the concave portion 412 in the vicinity of the periphery. The image-side surface 52 of the third lens element 5 is a concave surface, and has the concave portion 521 in the vicinity of the optical axis I and the concave portion 522 in the vicinity of the periphery. The fourth lens element 6 has positive refractive power. It should be noted that, in order to show the view clearly, some numerals which the same as those used for the concave portion and convex portion in the first embodiment are omitted from FIG. 66.

The detailed optical data pertaining to the optical lens assembly 10 is shown in FIG. 68, and the effective focal length of the total system in the sixteenth embodiment is 9.000 mm, the HFOV thereof is 17.918°, Fno thereof is 2.389, the system length thereof is 7.954 mm, and the image height thereof is 2.944 mm.

FIG. 69 shows the aspheric coefficients used in the formula (1) of the object-side surface 31 of the first lens element 3 through the image-side surface 72 of the fifth lens element 7 in the sixteenth embodiment.

In addition, the relations among important parameters pertaining to the optical lens assembly 10 in the sixteenth embodiment are shown in FIG. 89.

The longitudinal spherical aberration of the sixteenth embodiment shown in FIG. 67A is simulated in the condition that the pupil radius is 1.8749 mm. According to the longitudinal spherical aberration diagram of the sixteenth embodiment shown in FIG. 67A, a deviation of the imaging points of the off-axis rays of different heights is controlled within a range of ±0.05 mm. According to the two field curvature aberration diagrams of FIG. 67B and FIG. 67C, a focal length variation of the three representative wavelengths in the whole field of view falls within ±0.06 mm. According to the distortion aberration diagram of FIG. 67D, a distortion aberration of the sixteenth embodiment is maintained within the range of ±1.6%. Therefore, compared to the existing optical lens, the sixteenth embodiment may also achieve the good optical performance under a condition that the system length is reduced to about 7.954 mm.

Based on the above, it can be obtained that the advantage of the sixteenth embodiment relative to the first embodiment lies in that the range of field curvature aberration regarding the sagittal direction in the sixteenth embodiment is smaller than the range of field curvature aberration regarding the sagittal direction in the first embodiment. The range of field curvature aberration regarding the tangential direction in the sixteenth embodiment is smaller than the range of field curvature aberration regarding the tangential direction in the first embodiment. The range of distortion aberration in the sixteenth embodiment is smaller than the range of distortion aberration in the first embodiment, and the optical lens assembly of the sixteenth embodiment is easier to be fabricated compared to that of the first embodiment, so that a production yield is relatively high.

FIG. 70 is a schematic view illustrating an optical lens assembly according to a seventeenth embodiment of the invention, and FIGS. 71A to 71D are diagrams illustrating longitudinal spherical aberration and other aberrations of the optical lens assembly according to the seventeenth embodiment of the invention. Referring to FIG. 70, the seventeenth embodiment of the optical lens assembly 10 of the invention is similar to the eleventh embodiment, and the difference lies in optical data, aspheric coefficients and the parameters of the lens elements 3, 4, 5, 6 and 7. The object-side surface 41 of the second lens element 4 is a concave surface, and has the concave portion 413 in the vicinity of the optical axis I and the concave portion 412 in the vicinity of the periphery. The image-side surface 52 of the third lens element 5 is a concave surface, and has the concave portion 521 in the vicinity of the optical axis I and the concave portion 522 in the vicinity of the periphery. The fourth lens element 6 has positive refractive power. It should be noted that, order to show the view clearly, some numerals which the same as those used for the concave portion and convex portion in the first embodiment are omitted from FIG. 70.

The detailed optical data pertaining to the optical lens assembly 10 is shown in FIG. 72, and the effective focal length of the total system in the seventeenth embodiment is 9.000 mm, the HFOV thereof is 17.994°, Fno thereof is 2.393, the system length thereof is 7.954 mm, and the image height thereof is 2.944 mm.

FIG. 73 shows the aspheric coefficients used in the formula (1) of the object-side surface 31 of the first lens element 3 through the image-side surface 72 of the fifth lens element 7 in the seventeenth embodiment.

In addition, the relations among important parameters pertaining to the optical lens assembly 10 in the seventeenth embodiment are shown in FIG. 89.

The longitudinal spherical aberration of the seventeenth embodiment shown in FIG. 71A is simulated in the condition that the pupil radius is 1.8750 mm. According to the longitudinal spherical aberration diagram of the seventeenth embodiment shown in FIG. 71A, a deviation of the imaging points of the off-axis rays of different heights is controlled within a range of ±0.045 mm. According to the two field curvature aberration diagrams of FIG. 71B and FIG. 71C, a focal length variation of the three representative wavelengths in the whole field of view falls within ±0.08 mm. According to the distortion aberration diagram of FIG. 71D, a distortion aberration of the seventeenth embodiment is maintained within the range of ±1.2%. Therefore, compared to the existing optical lens, the seventeenth embodiment may also achieve the good optical performance under a condition that the system length is reduced to about 7.954 mm.

Based on the above, it can be obtained that the advantages of the seventeenth embodiment relative to the first embodiment are that the range of field curvature aberration regarding the tangential direction in the seventeenth embodiment is smaller than the range of field curvature aberration regarding the tangential direction in the first embodiment, and the seventeenth embodiment can be manufactured more easily than the first embodiment, therefore, a higher yield rate can be achieved.

FIG. 74 is a schematic view illustrating an optical lens assembly according to an eighteenth embodiment of the invention, and FIGS. 75A to 71D are diagrams illustrating longitudinal spherical aberration and other aberrations of the optical lens assembly according to the eighteenth embodiment of the invention. Referring to FIG. 74, the eighteenth embodiment of the optical lens assembly 10 of the invention is similar to the eleventh embodiment, and the difference lies in optical data, aspheric coefficients and the parameters of the lens elements 3, 4, 5, 6 and 7. The image-side surface 32 of the first lens element 3 is a convex surface, and has the convex portion 321 in the vicinity of the optical axis I and the convex portion 323 in the vicinity of the periphery. The fourth lens element 6 has positive refractive power. The object-side surface 61 of the fourth lens element 6 has the convex portion 613 in the vicinity of the optical axis I and the concave portion 612 in the vicinity of the periphery. The object-side surface 71 of the fifth lens element 7 has a convex portion 713 in the vicinity of the optical axis I and the concave portion 712 in the vicinity of the periphery. It should be noted that, in order to show the view clearly, some numerals which the same as those used for the concave portion and convex portion in the first embodiment are omitted from FIG. 74.

The detailed optical data pertaining to the optical lens assembly 10 is shown in FIG. 76, and the effective focal length of the total system in the eighteenth embodiment is 9.000 mm, the HFOV thereof is 18.089°, Fno thereof is 2.398, the system length thereof is 8.596 mm, and the image height thereof is 2.944 mm.

FIG. 77 shows the aspheric coefficients used in the formula (1) of the object-side surface 31 of the first lens element 3 through the image-side surface 72 of the fifth lens element 7 in the eighteenth embodiment.

In addition, the relations among important parameters pertaining to the optical lens assembly 10 in the eighteenth embodiment are shown in FIG. 89.

The longitudinal spherical aberration of the eighteenth embodiment shown in FIG. 75A is simulated in the condition that the pupil radius is 1.8750 mm. According to the longitudinal spherical aberration diagram of the eighteenth embodiment shown in FIG. 75A, a deviation of the imaging points of the off-axis rays of different heights is controlled within a range of ±0.014 mm. According to the two field curvature aberration diagrams of FIG. 75B and FIG. 75C, a focal length variation of the three representative wavelengths in the whole field of view falls within ±0.05 mm. According to the distortion aberration diagram of FIG. 75D, a distortion aberration of the eighteenth embodiment is maintained within the range of ±0.3%. Therefore, compared to the existing optical lens, the eighteenth embodiment may also achieve the good optical performance under a condition that the system length is reduced to about 8.596 mm.

According to the above description, compared to the first embodiment, the advantage of the eighteenth embodiment is that the range of the longitudinal spherical aberration in the eighteenth embodiment is smaller than the range of the longitudinal spherical aberration in the first embodiment. In addition, the range of field curvature aberration regarding sagittal direction in the eighteenth embodiment is smaller than the range of field curvature aberration regarding sagittal direction in the first embodiment. The range of field curvature aberration regarding the tangential direction in the eighteenth embodiment is smaller than the range of field curvature aberration regarding the tangential direction in the first embodiment. The range of distortion aberration in the eighteenth embodiment is smaller than the range of distortion aberration in the first embodiment, and the optical lens assembly of the eighteenth embodiment is easier to be fabricated compared to that of the first embodiment, so that a production yield is relatively high.

FIG. 78 is a schematic view illustrating an optical lens assembly according to a nineteenth embodiment of the invention, and FIGS. 79A to 79D are diagrams illustrating longitudinal spherical aberration and other aberrations of the optical lens assembly according to the nineteenth embodiment of the invention. Referring to FIG. 78, the nineteenth embodiment of the optical lens assembly 10 of the invention is similar to the eleventh embodiment, and the difference lies in optical data, aspheric coefficients and the parameters of the lens elements 3, 4, 5, 6 and 7. The object-side surface 41 of the second lens element 4 is a concave surface, and has the concave portion 413 in the vicinity of the optical axis I and the concave portion 412 in the vicinity of the periphery. The image-side surface 52 of the third lens element 5 is a convex surface, and has the convex portion 523 in the vicinity of the optical axis I and the convex portion 524 in the vicinity of the periphery. The image-side surface 62 of the fourth lens element 6 has the concave portion 623 in the vicinity of the optical axis I and the convex portion 622 in the vicinity of the periphery. The fourth lens element 7 has positive refractive power. The object-side surface 71 of the fifth lens element 7 has the convex portion 713 in the vicinity of the optical axis I and the concave portion 712 in the vicinity of the periphery. It should be noted that, in order to show the view clearly, some numerals which the same as those used for the concave portion and convex portion in the first embodiment are omitted from FIG. 78.

The detailed optical data pertaining to the optical lens assembly 10 is shown in FIG. 80, and the effective focal length of the total system in the nineteenth embodiment is 8.949 mm, the HFOV thereof is 18.004°, Fno thereof is 2.400, the system length thereof is 8.145 mm, and the image height thereof is 2.944 mm.

FIG. 81 shows the aspheric coefficients used in the formula (1) of the object-side surface 31 of the first lens element 3 through the image-side surface 72 of the fifth lens element 7 in the nineteenth embodiment.

In addition, the relations among important parameters pertaining to the optical lens assembly 10 in the nineteenth embodiment are shown in FIG. 89.

The longitudinal spherical aberration of the nineteenth embodiment shown in FIG. 79A is simulated in the condition that the pupil radius is 1.8644 mm. According to the longitudinal spherical aberration diagram of the nineteenth embodiment shown in FIG. 79A, a deviation of the imaging points of the off-axis rays of different heights is controlled within a range of ±0.025 mm. According to the two field curvature aberration diagrams of FIG. 79B and FIG. 79C, a focal length variation of the three representative wavelengths in the whole field of view falls within ±0.08 mm. According to the distortion aberration diagram of FIG. 79D, a distortion aberration of the nineteenth embodiment is maintained within the range of ±1.2%. Therefore, compared to the existing optical lens, the nineteenth embodiment may also achieve the good optical performance under a condition that the system length is reduced to about 8.145 mm.

According to the above description, compared to the first embodiment, the advantage of the nineteenth embodiment is that the range of the longitudinal spherical aberration in the nineteenth embodiment is smaller than the range of the longitudinal spherical aberration n the first embodiment. In addition, the range of field curvature aberration regarding sagittal direction in the nineteenth embodiment is smaller than the range of field curvature aberration regarding sagittal direction in the first embodiment. The range of field curvature aberration regarding the tangential direction in the nineteenth embodiment is smaller than the range of field curvature aberration regarding the tangential direction in the first embodiment, and the optical lens assembly of the nineteenth embodiment is easier to be fabricated compared to that of the first embodiment, so that a production yield is relatively high.

Figure 82:
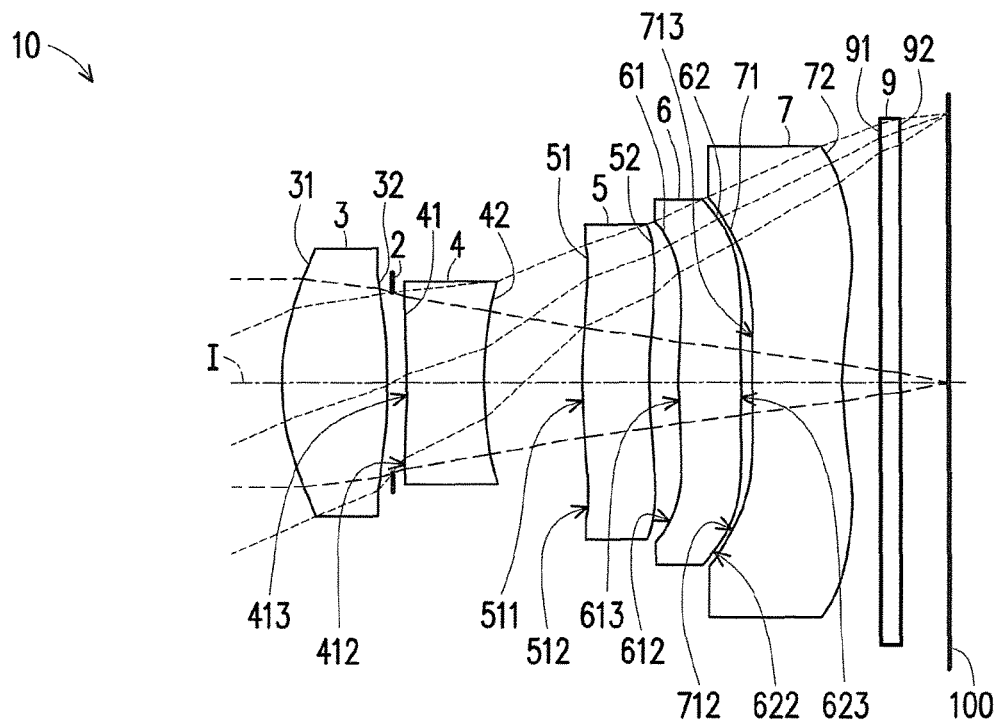
FIG. 82 is a schematic view illustrating an optical lens assembly according to a twentieth embodiment of the invention.

FIG. 82 is a schematic view illustrating an optical lens assembly according to a twentieth embodiment of the invention, and FIGS. 83A to 83D are diagrams illustrating longitudinal spherical aberration and other aberrations of the optical lens assembly according to the twentieth embodiment of the invention. Referring to FIG. 82, the twentieth embodiment of the optical lens assembly 10 of the invention is similar to the eleventh embodiment, and the difference lies in optical data, aspheric coefficients and the parameters of the lens elements 3, 4, 5, 6 and 7. In the twentieth embodiment, an optical lens assembly 10 includes a first lens element 3, an aperture stop 2, a second lens element 4, a third lens element 5, a fourth lens element 6, a fifth lens element 7, and a light filter 9 arranged in sequence from an object side to an image side along an optical axis I of the optical lens assembly 10. The object-side surface 41 of the second lens element 4 is a concave surface, and has the concave portion 413 in the vicinity of the optical axis I and the concave portion 412 in the vicinity of the periphery. The object-side surface 51 of the third lens element 5 has the convex portion 511 in the vicinity of the optical axis I and the concave portion 512 in the vicinity of the periphery. The object-side surface 61 of the fourth lens element 6 has the convex portion 613 in the vicinity of the optical axis I and the concave portion 612 in the vicinity of the periphery. The image-side surface 62 of the fourth lens element 6 has the concave portion 623 in the vicinity of the optical axis I and the convex portion 622 in the vicinity of the periphery. The object-side surface 71 of the fifth lens element 7 has the convex portion 713 in the vicinity of the optical axis I and the concave portion 712 in the vicinity of the periphery. It should be noted that, in order to show the view clearly, some numerals which the same as those used for the concave portion and convex portion in the first embodiment are omitted from FIG. 82.

The detailed optical data pertaining to the optical lens assembly 10 is shown in FIG. 84, and the effective focal length of the total system in the twentieth embodiment is 6.370 mm, the HFOV thereof is 24.803°, Fno thereof is 2.885, the system length thereof is 7.071 mm, and the image height thereof is 2.944 mm.

FIG. 85 shows the aspheric coefficients used in the formula (1) of the object-side surface 31 of the first lens element 3 through the image-side surface 72 of the fifth lens element 7 in the twentieth embodiment.

In addition, the relations among important parameters pertaining to the optical lens assembly 10 in the twentieth embodiment are shown in FIG. 89.

Figures 83A, 83B, 83C, 83D:
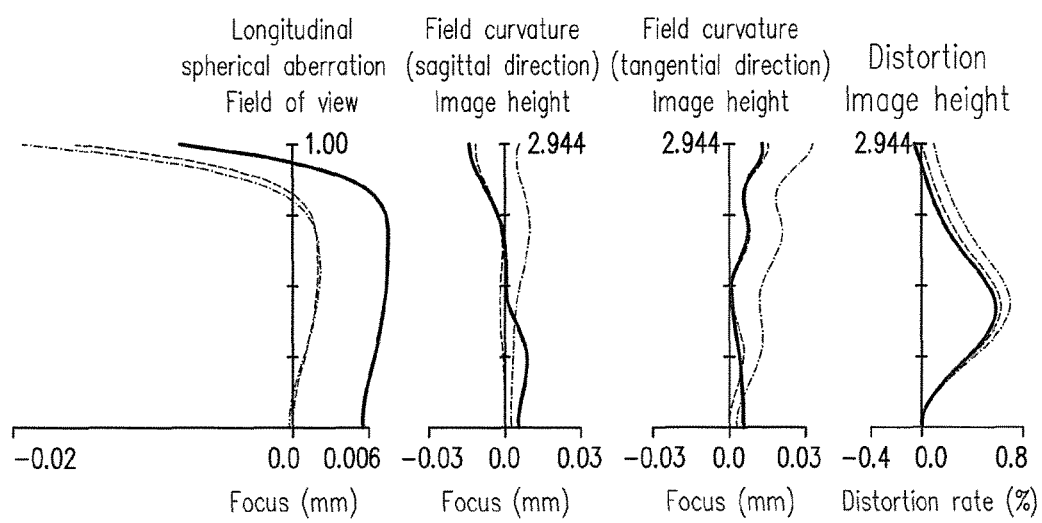
FIGS. 83A to 83D are diagrams illustrating longitudinal spherical aberration and other aberrations of the optical lens assembly according to the twentieth embodiment of the invention.

The longitudinal spherical aberration of the twentieth embodiment shown in FIG. 83A is simulated in the condition that the pupil radius is 1.1375 mm. According to the longitudinal spherical aberration diagram of the twentieth embodiment shown in FIG. 83A, a deviation of the imaging points of the off-axis rays of different heights is controlled within a range of ±0.020 mm. According to the two field curvature aberration diagrams of FIG. 83B and FIG. 83C, a focal length variation of the three representative wavelengths in the whole field of view falls within ±0.04 mm. According to the distortion aberration diagram of FIG. 83D, a distortion aberration of the twentieth embodiment is maintained within the range of ±0.8%. Therefore, compared to the existing optical lens, the twentieth embodiment may also achieve the good optical performance under a condition that the system length is reduced to about 7.071 mm.

According to the above description, compared to the first embodiment, the advantage of the twentieth embodiment is that the HFOV of the twentieth embodiment is greater than the HFOV of the first embodiment. In addition, the range of the longitudinal spherical aberration in the twentieth embodiment is smaller than the range of the longitudinal spherical aberration in the first embodiment. The range of field curvature aberration regarding sagittal direction in the twentieth embodiment is smaller than the range of field curvature aberration regarding sagittal direction in the first embodiment. The range of field curvature aberration regarding the tangential direction in the twentieth embodiment is smaller than the range of field curvature aberration regarding the tangential direction in the first embodiment. The range of distortion aberration in the twentieth embodiment is smaller than the range of distortion aberration in the first embodiment, and the optical lens assembly of the twentieth embodiment is easier to be fabricated compared to that of the first embodiment, so that a production yield is relatively high.

Referring to FIG. 86 and FIG. 89. FIG. 86 is a table diagram of optical parameters of each of the above-mentioned first through the fifth embodiments, FIG. 87 is a table diagram of optical parameters of each of the above-mentioned sixth through the tenth embodiments, FIG. 88 is a table diagram of optical parameters of each of the above-mentioned eleventh through the fifteenth embodiments, and FIG. 89 is a table diagram of optical parameters of each of the above-mentioned sixteenth through the twentieth embodiments of the invention. When the relation of the optical parameters of the optical lens assembly 10 in the embodiments of the invention satisfies at least one of following conditional expressions, it assists a designer to design a technically feasible optical imaging lens having good optical properties and having a total length that is effectively reduced.

1. When the conditional expression HFOV≤25° is satisfied, it is easier to increase the image quality in telephotography, such that the image brightness is more uniform, and the difficulty in design and producing the optical lens is reduced.

2. When the value limitations in the following conditional expressions are satisfied, the ratio of the effective focal length of the lens to the length of the lens is kept at a suitable value, so as to prevent the parameters becoming too small so that it not easy to pick up an image of a long-distance object by the lens, or to prevent the parameters becoming too large so that the length of the lens is too long:

$TTL/G23 \leq 12.5$, preferably $2.4 \leq TTL/G23 \leq 12.5$; or $TTL/(G12+G23) \leq 8.1$, preferably $2.3 \leq TTL/(G12+G23) \leq 8.1$; or $TTL/(G23+G34) \leq 6.5$, preferably $2 \leq TTL/(G23+G34) \leq 6.5$; or $TTL/(G12+G23+G34) \leq 6.1$, preferably $2 \leq TTL/(G12+G23+G34) \leq 6.1$; or 3. When the value limitations in the following conditional expressions are satisfied, by limiting the relation between the effective focal length and the air gap from the second lens element to the third lens element along the optical axis, it is easier to increase the imaging quality, such that the image brightness is more uniform and the imaging deformation is easily controlled, and the difficulty in design and producing the optical lens is reduced:

$EFL/G23 \leq 10.4$, preferably $2.7 \leq EFL/G23 \leq 10.4$.

4. When the value limitations in the following conditional expressions are satisfied, by limiting the relation between the thickness of the first lens element and the air gap from the second lens element to the third lens element along the optical axis, T1 is not too small or too large, so the difficulty in design and producing the optical lens is reduced:

$0.9 \leq G23/T1$, preferably $0.9 \leq G23/T1 \leq 7.6$.

5. In order to shorten the length of the lens system, the thickness of the lens elements and the air gaps among the lens elements in the embodiments of the invention are suitably shortened, though considering a difficulty level of an assembling process of the lens elements and under the premise that the imaging quality has to be ensured, the thickness of the lens elements and the air gaps among the lens elements have to be suitably adjusted, so as to keep the thickness of and the space for each lens at a suitable value to prevent any of the parameters being too large to make the miniaturization of the entire optical lens assembly 10 difficult or to prevent any of the parameters being too small to affect assembly or to increase the difficulty in production, so under the circumstance that the value limitations in the following conditional expressions are satisfied, the optical imaging system may achieve better configuration:

$EFL/(G12+G23) \leq 7.7$, preferably $2.5 \leq EFL/(G12+G23) \leq 7.7$;

$EFL/(G12+G23+G34) \leq 5.3$, preferably $2.2 \leq EFL/(G12+G23+G34) \leq 5.3$;

$Fno/G23 \leq 4.6$, preferably $0.9 \leq Fno/G23 \leq 4.6$;

$Fno/(G12+G23) \leq 4.3$, preferably $0.8 \leq Fno/(G12+G23) \leq 4.3$;

$Fno/(G23+G34) \leq 2.5$, preferably $0.6 \leq Fno/(G23+G34) \leq 2.5$;

$0.3 \leq G23/(T2+T3)$, preferably $0.3 \leq G23/(T2+T3) \leq 5$;

$0.5 \leq ((G12+G23)/(T1+T2)$, preferably $0.5 \leq (G12+G23)/(T1+T2) \leq 2.3$;

$0.4 \leq (G12+G23)/(T2+T3)$, preferably $0.4 \leq (G12+G23)/(T2+T3) \leq 5.5$;

$0.5 \leq G23/(T1+T2)$, preferably $0.5 \leq G23/(T1+T2) \leq 2.3$;

$0.5 \leq (G12+G23)/(T1+G12+T2)$, preferably $0.5 \leq (G12+G23)/(T1+G12+T2) \leq 2.2$;

$0.8 \leq (G12+G23+G34)/(T1+T2)$, preferably $0.8 \leq (G12+G23+G34)/(T1+T2) \leq 2.6$;

$0.7 \leq (G12+G23+G34)/(T2+T3)$, preferably $0.7 \leq (G12+G23+G34)/(T2+T3) \leq 6.6$;

$0.7 \leq (G23+G34)/(T2+T3)$, preferably $0.7 \leq (G23+G34)/(T2+T3) \leq 6.6$.

However, due to the unpredictability in the design of an optical system, with the framework of the embodiments of the invention, under the circumstances where the above-described conditions are satisfied, the lens according to the embodiments of the invention with shorter length, bigger aperture availability, increased field of angle, improved image quality or better yield rate can be preferably achieved so as to improve the shortcoming of prior art.

In addition, the above-limited relation is provided in an exemplary sense and can be randomly and selectively combined and applied to the embodiments of the invention in different manners; the invention should not be limited to the above examples. In implementation of the invention, apart from the above-described relations, it is also possible to add additional detailed structure such as more concave and convex curvatures arrangement of a specific lens element or a plurality of lens elements so as to enhance control of system property and/or resolution. For example, it is optional to form an additional concave portion in the vicinity of the optical axis or an additional concave portion in the vicinity of the periphery on the image-side surface of the second lens element. It should be noted that the above-described details can be optionally combined and applied to the other embodiments of the invention under the condition where they are not in conflict with one another.

Based on the above, the optical lens assembly 10 in the embodiment of the invention may achieve the following effects and advantages.

1. The longitudinal spherical aberrations, astigmatism aberrations and distortion aberrations of each of the embodiments of the invention are all complied with usage specifications. Moreover, the off-axis rays of different heights of the three representative wavelengths 650 nm, 555 nm and 470 nm are all gathered around imaging points, and according to a deviation range of each curve, it can be seen that deviations of the imaging points of the off-axis rays of different heights are all controlled to achieve a good capability to suppress spherical aberration, astigmatism aberration and distortion aberration. Referring to the imaging quality data, distances among the three representative wavelengths 650 nm, 555 nm and 470 nm are fairly close, which represents that the optical lens assembly of the embodiments of the invention have a good concentration of rays with different wavelengths and under different states, and have an excellent capability to suppress dispersion, so it is learned that the optical lens assembly of the embodiments of the invention have good optical properties.

2. The first lens element 3 in the optical lens assembly 10 of the embodiment of the invention has the convex surface on the object-side and in the vicinity of the optical axis, which facilitates rays to focus. In addition, the second lens element 4 has negative refractive power so that it is easy to correct the main aberration generated by the first lens element 3. Because the third lens element 5 has a concave surface on the object side and in the vicinity of the periphery and the fourth lens element 6 has a convex surface on the image side and in the vicinity of the periphery, it is easy to correct the main aberration generated by the two previous lens elements, so as to increase the imaging quality. Moreover, the aperture stop 2 is disposed between the object-side surface 31 of the first lens element 3 or the first lens element 3 and the second lens element 4 and disposed in compliance with the other lens elements, such that it is easier to increase the aperture availability and to reduce the f-number (Fno).

Although the invention has been disclosed with reference to the aforesaid embodiments, they are not intended to limit the invention. It will be apparent to one of ordinary skill in the art that modifications and variations to the described embodiments may be made without departing from the spirit and the scope of the invention. Accordingly, the scope of the invention will be defined by the attached claims and not by the above detailed descriptions.

What is claimed is:

1. An optical lens assembly, comprising a first lens element, a second lens element, a third lens element, and a fourth lens element arranged in sequence from an object side to an image side along an optical axis, and each of the first lens element to the fourth lens element comprising an object-side surface facing the object side and allowing imaging rays to pass through and an image-side surface facing the image side and allowing the imaging rays to pass through;

the first lens element being a first lens having a refracting power and sequentially counted from the object side to the image side, the second lens element being a second lens having a refracting power and sequentially counted from the object side to the image side, the third lens element being a third lens having a refracting power and sequentially counted from the object side to the image side, and the fourth lens element being a fourth lens having a refracting power and sequentially counted from the object side to the image side;

the first lens element having a positive refracting power, and the object-side surface of the first lens element having a convex portion in a vicinity of the optical axis and a convex portion in a vicinity of a periphery;

the second lens element having a negative refracting power;

the third lens element having a negative refracting power, and the object-side surface of the third lens element having a concave portion in a vicinity of a periphery;

the image-side surface of the fourth lens element having a convex portion in a vicinity of the optical axis, and the image-side surface of the fourth lens element having a convex portion in a vicinity of a periphery;

the optical lens assembly further comprising an aperture stop, the aperture stop being located at the object-side surface of the first lens element or being located between the first lens element and the second lens element, wherein the optical lens assembly satisfies:

$HFOV \leq 25°$;

$EFL/(G23+G34) \leq 4.8$;

$0.7 \leq (G23+G34)/(T2+T3)$, wherein, HFOV is a half field of view of the optical lens assembly, EFL is an effective focal length of the optical lens assembly, G23 is an air gap from the second lens element to the third lens element along the optical axis, G34 is an air gap from the third lens element to the fourth lens element along the optical axis, T2 is a thickness of the second lens element along the optical axis, and T3 is a thickness of the third lens element along the optical axis, and wherein the optical lens assembly further satisfies: TTL/G23≤12.5, wherein TTL is a distance from the object-side surface of the first lens element to an image plane along the optical axis.

2. The optical lens assembly as recited in claim 1, wherein the optical lens assembly further satisfies: EFL/G23≤10.4.

3. The optical lens assembly as recited in claim 1, wherein the optical lens assembly further satisfies: EFL/(G12+G23)≤7.7, wherein G12 is an air gap from the first lens element to the second lens element along the optical axis.

4. The optical lens assembly as recited in claim 1, wherein the optical lens assembly further satisfies: EFL/(G12+G23+G34)≤5.3, wherein G12 is an air gap from the first lens element to the second lens element along the optical axis.

5. The optical lens assembly as recited in claim 1, wherein the optical lens assembly further satisfies: TTL/(G12+G23)≤8.1, wherein G12 is an air gap from the first lens element to the second lens element along the optical axis.

6. The optical lens assembly as recited in claim 1, wherein the optical lens assembly further satisfies: TTL/(G23+G34)≤6.5.

7. The optical lens assembly as recited in claim 1, wherein the optical lens assembly further satisfies: TTL/(G12+G23+G34)≤6.1, wherein G12 is an air gap from the first lens element to the second lens element along the optical axis.

8. The optical lens assembly as recited in claim 1, wherein the optical lens assembly further satisfies: Fno/G23≤4.6 mm−1, wherein Fno is a f-number of the optical lens assembly.

9. The optical lens assembly as recited in claim 1, wherein the optical lens assembly further satisfies: Fno/(G12+G23)≤4.3 mm−1, wherein Fno is a f-number of the optical lens assembly, and G12 is an air gap from the first lens element to the second lens element along the optical axis.

10. The optical lens assembly as recited in claim 1, wherein the optical lens assembly further satisfies: Fno/(G23+G34)≤2.5 mm$^{-1}$, wherein Fno is a f-number of the optical lens assembly.

11. The optical lens assembly as recited in claim 1, wherein the optical lens assembly further satisfies: 0.3≤G23/(T2+T3).

12. The optical lens assembly as recited in claim 1, wherein the optical lens assembly further satisfies: 0.5≤(G12+G23)/(T1+T2), wherein G12 is an air gap from the first lens element to the second lens element along the optical axis, T1 is a thickness of the first lens element along the optical axis.

13. The optical lens assembly as recited in claim 1, wherein the optical lens assembly further satisfies: 0.4≤(G12+G23)/(T2+T3), wherein G12 is an air gap from the first lens element to the second lens element along the optical axis.

14. The optical lens assembly as recited in claim 1, wherein the optical lens assembly further satisfies: 0.5≤G23/(T1+T2), wherein T1 is a thickness of the first lens element along the optical axis.

15. The optical lens assembly as recited in claim 1, wherein the optical lens assembly further satisfies: 0.5≤(G12+G23)/(T1+G12+T2), wherein G12 is an air gap from the first lens element to the second lens element along the optical axis, and T1 is a thickness of the first lens element along the optical axis.

16. The optical lens assembly as recited in claim 1, wherein the optical lens assembly further satisfies: 0.8≤(G12+G23+G34)/(T1+T2), wherein G12 is an air gap from the first lens element to the second lens element along the optical axis, and T1 is a thickness of the first lens element along the optical axis.

17. The optical lens assembly as recited in claim 1, wherein the optical lens assembly further satisfies: 0.7≤(G12+G23+G34)/(T2+T3), wherein G12 is an air gap from the first lens element to the second lens element along the optical axis.

18. The optical lens assembly as recited in claim 1, wherein the optical lens assembly further satisfies: 0.9≤G23/T1, wherein T1 is a thickness of the first lens element along the optical axis.

* * * * *